United States Patent
Wuerfel

(10) Patent No.: US 10,569,349 B2
(45) Date of Patent: Feb. 25, 2020

(54) PROCESS FOR GEAR MANUFACTURING MACHINING

(71) Applicant: Liebherr-Verzahntechnik GmbH, Kempten (DE)

(72) Inventor: Robert Wuerfel, Kempten (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 0 days.

(21) Appl. No.: 15/499,629

(22) Filed: Apr. 27, 2017

(65) Prior Publication Data

US 2018/0161896 A1 Jun. 14, 2018

(30) Foreign Application Priority Data

Apr. 28, 2016 (DE) .......................... 10 2016 005 257

(51) Int. Cl.
*B23F 5/02* (2006.01)
*B23F 1/02* (2006.01)
(Continued)

(52) U.S. Cl.
CPC .................. *B23F 5/04* (2013.01); *B23F 1/02* (2013.01); *B23F 5/02* (2013.01); *B23F 19/002* (2013.01);
(Continued)

(58) Field of Classification Search
CPC ...... B23F 5/02; B23F 5/04; B23F 1/02; B23F 19/00; B23F 19/002; B23F 21/026;
(Continued)

(56) References Cited

U.S. PATENT DOCUMENTS 2,351,842 A * 6/1944 Seibold .................. B23F 19/04
409/49
2,395,544 A * 2/1946 Galloway ............... B23F 9/025
125/11.16
(Continued)

FOREIGN PATENT DOCUMENTS

DE 10131060 A1 1/2003
DE 10208531 A1 9/2003
(Continued)

OTHER PUBLICATIONS

Korean Intellectual Property Office, Office Action Issued in Application No. 10-2017-0055771, dated Jan. 23, 2019, Korea, 27 pages.
Japanese Patent Office, Office Action Issued in Application No. 2017-085375, dated Jul. 2, 2019, 9 pages.

*Primary Examiner* — Eileen P Morgan
(74) *Attorney, Agent, or Firm* — McCoy Russell LLP

(57) ABSTRACT

The present invention shows a process for gear manufacturing machining a workpiece by a tool on a gear manufacturing machine, wherein the workpiece is machined by a generating machining process in which the tool for gear manufacturing machining rolls off on the workpiece at a predefined center distance and axial cross angle, wherein the gear manufacturing machining preferably takes place on two flanks, with a desired tooth trace shape and/or tooth thickness of the gearing being generated by the generating machining process. The process is characterized in that an additional condition is predefinable and in that the center distance and the axial cross angle are determined in dependence on the desired tooth trace shape and/or tooth thickness of the gearing and on the additional condition.

17 Claims, 26 Drawing Sheets

(51) Int. Cl.
*B23F 19/00* (2006.01)
*B23F 23/00* (2006.01)
*G05B 19/29* (2006.01)
*B23F 5/04* (2006.01)
*G05B 19/18* (2006.01)
*B23F 23/12* (2006.01)
*B23F 21/02* (2006.01)
*G01B 5/008* (2006.01)
*G05B 19/4093* (2006.01)

(52) U.S. Cl.
CPC .......... *B23F 21/026* (2013.01); *B23F 23/006* (2013.01); *B23F 23/1225* (2013.01); *G01B 5/008* (2013.01); *G05B 19/186* (2013.01); *G05B 19/29* (2013.01); *G05B 19/40937* (2013.01); *G05B 2219/35035* (2013.01); *G05B 2219/36198* (2013.01)

(58) Field of Classification Search
CPC .... B23F 23/006; B23F 23/1225; G01B 5/008; G05B 19/186; G05B 19/29; G05B 19/40937; G05B 19/41; G05B 2219/36198
USPC ...................................................... 451/21, 47
See application file for complete search history.

(56) References Cited

U.S. PATENT DOCUMENTS

| | | | | |
|---|---|---|---|---|
| 2,404,573 | A * | 7/1946 | Graf | B23F 5/02 451/275 |
| 2,486,020 | A * | 10/1949 | Graf | B23F 5/02 451/275 |
| 3,928,944 | A * | 12/1975 | Kedrinsky | B23F 5/08 451/123 |
| 8,087,331 | B2 * | 1/2012 | Thompson | B23C 3/00 29/558 |
| 9,440,299 | B2 * | 9/2016 | Winkel | B23F 23/1218 |
| 2003/0166377 | A1 * | 9/2003 | Schmid | B23F 5/04 451/5 |
| 2005/0064794 | A1 * | 3/2005 | Blasberg | B23F 9/025 451/5 |
| 2015/0338201 | A1 | 11/2015 | Wuerfel | |
| 2016/0214197 | A1 | 7/2016 | Wuerfel | |
| 2017/0008106 | A1 | 1/2017 | Wuerfel | |

FOREIGN PATENT DOCUMENTS

| | | |
|---|---|---|
| DE | 102012015846 A1 | 10/2013 |
| DE | 102014007646 A1 | 11/2015 |
| DE | 102015000907 A1 | 7/2016 |
| DE | 102015008956 A1 | 1/2017 |
| JP | 2011042016 A | 3/2011 |
| KR | 20100036346 A | 4/2010 |

* cited by examiner

Allowance distribution, flank, root

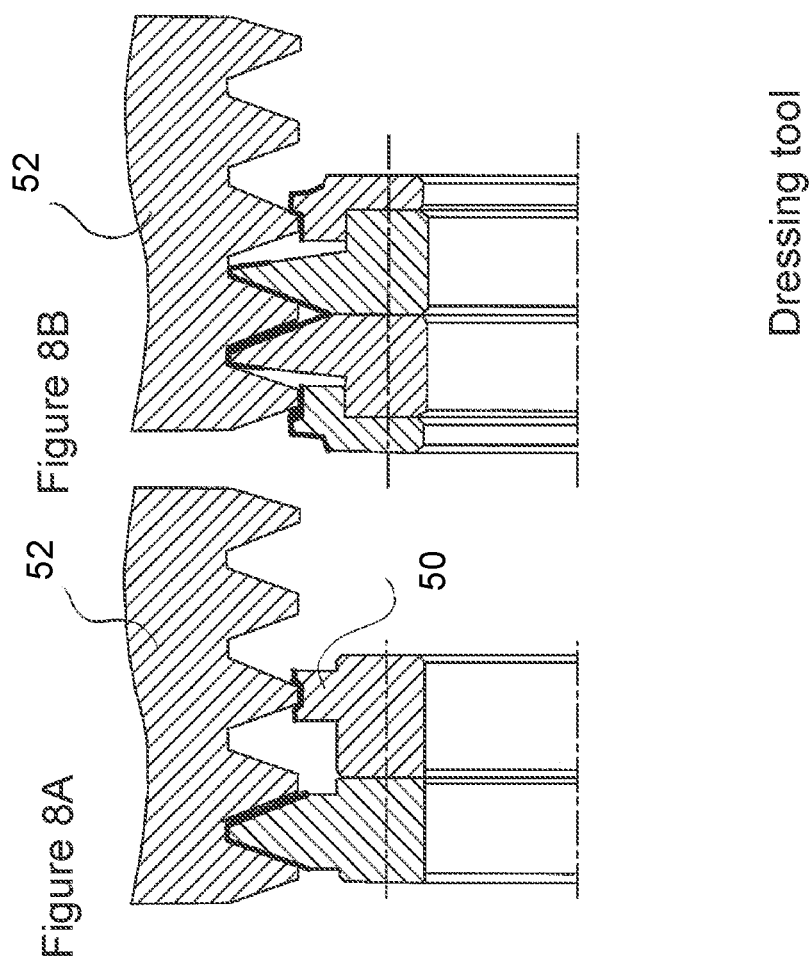

Tip dressing tool, multi-ribbed

Tip dressing tool, multi-ribbed

Dressing tool, pivoted

Dressing tool head

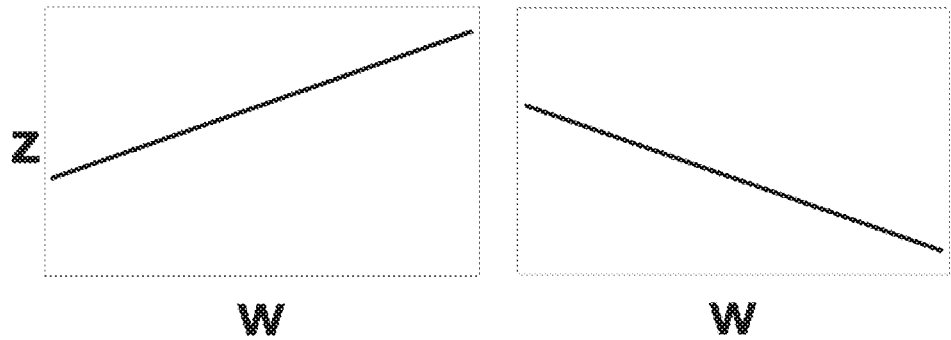
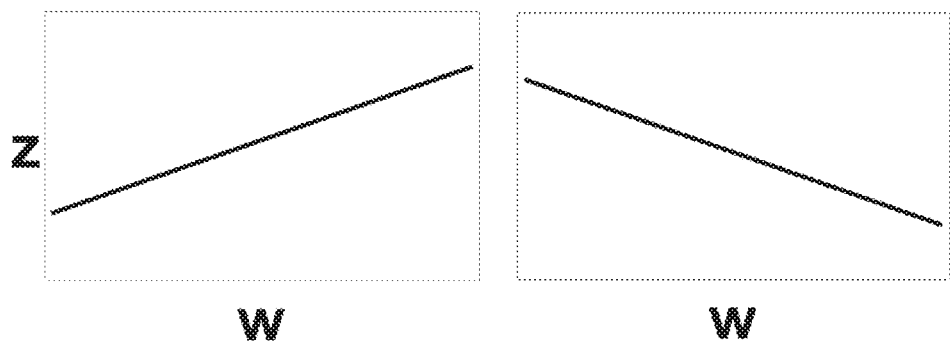
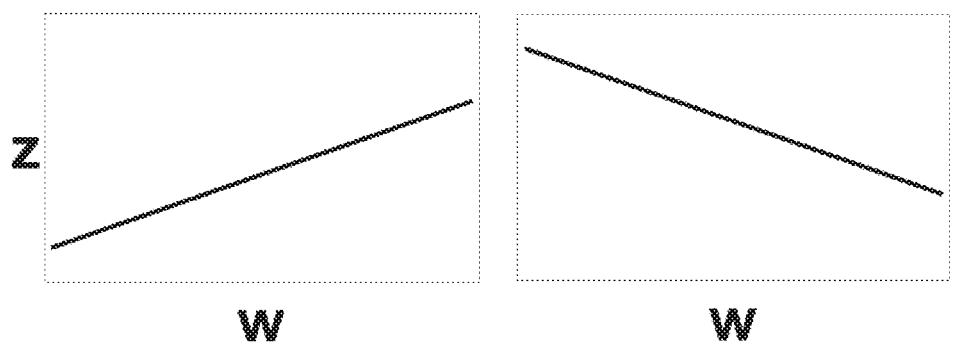
Figure 16

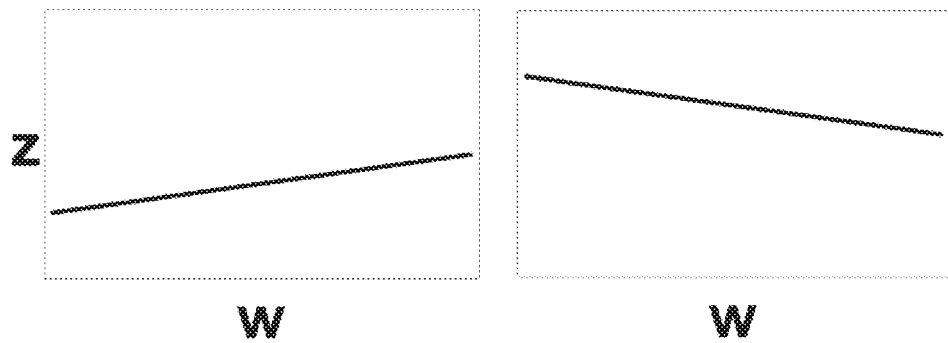
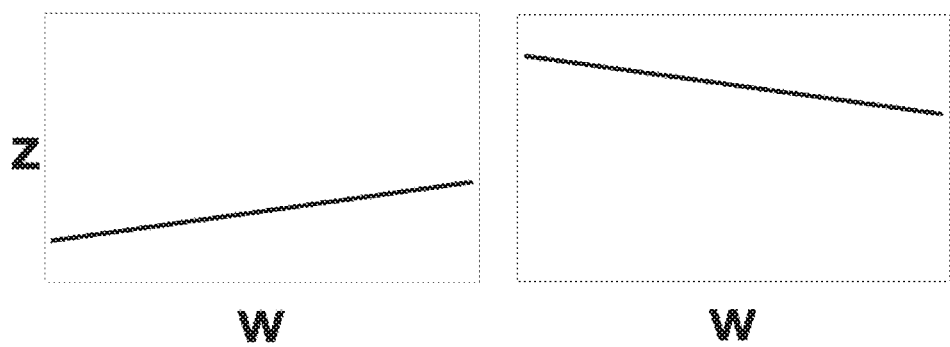
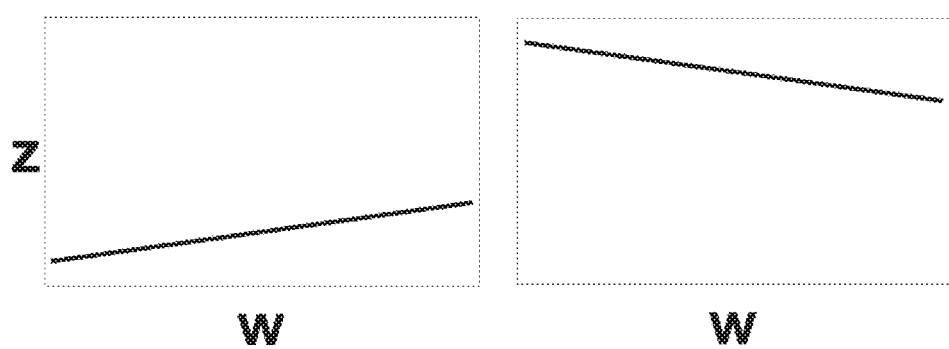
Figure 17

PROCESS FOR GEAR MANUFACTURING MACHINING

CROSS-REFERENCE TO RELATED APPLICATION

The present application claims priority to German Patent Application No. 10 2016 005 257.0, entitled "PROCESS FOR GEAR MANUFACTURING MACHINING," filed on Apr. 28, 2016, the entire contents of which is hereby incorporated by reference in its entirety for all purposes.

TECHNICAL FIELD

The present invention relates to a process for gear manufacturing machining of a workpiece by a tool on a gear manufacturing machine. A workpiece is in this respect machined by a generating machining method in which the tool for the gear manufacturing machining rolls off on the workpiece at a predefined center distance and axial cross angle.

BACKGROUND AND SUMMARY

In a generating machining method, the rotational movements of the tool and of the workpiece are coupled such that the gear teeth of the tool roll off on the gear teeth of the workpiece, the so-called generating coupling. The generating movement thus corresponds to that of a gear train formed by the tool and the workpiece. The generating movement is a relative movement between the tool and the workpiece in the direction of the workpiece width, i.e. superposed in the direction of the axis of rotation of the workpiece, by which the tool is guided along the workpiece in a machining stroke.

The center distance between the workpiece and the tool defines the engagement depth of the tool into the workpiece and permits an influencing of the tooth thickness. The axial cross angle in known generating machining methods is predefined by the helix angle of the tool and of the workpiece.

A desired tooth trace shape and/or tooth thickness of the gear teeth can be generated by such a generating machining method. The term tooth trace shape on the one hand comprises an unmodified tooth trace in the sense of the invention. The term tooth trace shape on the other hand comprises a tooth trace modification in the sense of the invention.

It is already known from the prior art to predefine a modified tooth trace and to generate it by a generating machining method. It is known for this purpose from DE 102 085 31 to generate a free tooth trace modification on the left and right tooth flanks of the workpiece by a variation of the center distance in dependence on the workpiece width position and on a corresponding correction of the generating coupling.

It is the object of the present invention to extend the possibilities of generating machining.

This object is achieved by a process in accordance with claim 1. Advantageous embodiments of the present invention form the subject of the dependent claims.

The present invention comprises a process for gear manufacturing machining of a workpiece by a tool on a gear manufacturing machine, wherein the workpiece is machined by a generating machining method in which the tool for the gear manufacturing machining rolls off on the workpiece at a predefined center distance and axial cross angle. A desired tooth trace shape and/or tooth thickness of the gear teeth is generated by the generating machining method. In accordance with the invention, an additional condition can be predefined, wherein the center distance and the axial cross angle are determined in dependence on the desired tooth trace shape and/or on the tooth thickness of the gear teeth and on the additional condition.

The inventor of the present invention has recognized that a further degree of freedom of gear manufacturing machining becomes available via the axial cross angle and said degree of freedom can be used to extend the possibilities of generating machining. This further degree of freedom permits an additional condition to be predefined in the generating machining in dependence on which the center distance and the axial cross angle are determined.

The process in accordance with the invention is preferably used in two-flank generating machining.

The present invention can in particular be used in gear hobbing and in generating grinding. In gear hobbing, a blank is machined that still has no gear teeth, that typically has a rotationally symmetrical shape and that is only provided with gear teeth by the gear hobbing process. Gear hobbing typically takes place in a plurality of machining strokes.

In generating grinding, a blank is typically machined that already has gear teeth, wherein generating grinding is used to improve the quality of the gear teeth geometry. Generating grinding is in particular a hard fine machining. The blank that already has gear teeth is typically surface hardened prior to the carrying out of generating grinding. Generating grinding preferably takes place in a plurality of machining strokes and in particular in at least one rough machining cut and at least one finishing cut.

The workpieces preferably consist of metal, in particular steel. In gear hobbing, a hob is typically used as the tool; in generating grinding, a grinding worm is typically used. The grinding worm can be a dressable tool or a non-dressable tool.

Within the framework of the present invention, an axial cross angle is preferably used that differs from an axial cross angle that is predefined by the helix angle of the tool and of the workpiece and that was used in the prior art. The deviation of the axial cross angle from an axial cross angle predefined by the helix angles of the tool and of the workpiece is preferably selected in dependence on the additional condition. The center distance is then preferably set such that the desired tooth trace and/or tooth thickness is generated despite the deviating axial cross angle.

The inventor of the present invention has recognized that the tooth thickness can be changed by a change of the axial cross angle. The tooth thickness can in particular be reduced by a deviation from the axial cross angle predefined by the helix angles of the tool and of the workpiece. An increase in the tooth thickness that is caused by a larger center distance can therefore be compensated by a corresponding setting of the axial cross angle. This permits the center distance to be freely selected within certain limits and nevertheless to achieve the desired tooth trace shape by a corresponding selection of the axial cross angle. It is in turn possible to satisfy an additional condition by the setting of the center distance.

The center distance and the difference between the axial cross angle to be set and the axial cross angle predefined by the helix angles of the tool and of the workpiece is preferably determined in accordance with the invention in dependence on the additional condition and on the desired tooth trace shape and/or tooth thickness. The center distance can in particular be set in dependence on the additional condition and the axial cross angle can thus in particular be determined such that the desired tooth trace shape and/or tooth thickness is/are produced.

Provision can furthermore be made in accordance with the invention that a specific setting of the correction of the generating coupling takes place in addition to a specific setting of the center distance and of the axial cross angle.

A correction of the generating coupling in dependence on the workpiece width position can be achieved by a plurality of different machine axes. A correction of the generating coupling can in particular be achieved by an additional rotational movement of the workpiece and/or of the tool. The correction of the generating coupling can, however, also be achieved by a shift movement and/or, with a helical gear, by an axial feed movement of the workpiece. The movements preferably take place in dependence on the workpiece width position.

The center distance, the axial cross angle and a correction of the generating coupling can be determined in accordance with the invention in dependence on the desired tooth trace shape and/or tooth thickness and on the additional condition. The correction of the generating coupling permits an influencing of the tooth trace shape that has a different effect on the left and right tooth flanks. The tooth trace shape and/or the tooth thickness at the left and right tooth flanks can thus be predefined independently by a setting of the center distance and of a corresponding correction of the generating coupling.

In accordance with the invention, a tooth flank modification can be predefined as the desired tooth trace, with the tooth thickness and/or the tooth trace modification preferably being predefinable independently for the left and right tooth flanks.

Alternatively or additionally, the center distance and/or the correction of the generating coupling can be determined as a function of the workpiece width position. Freely predefinable tooth trace modifications can be generated on the right and left tooth flanks within certain conditions in accordance with the invention by a center distance variable in dependence on the workpiece width position and by a corresponding correction of the generating coupling. The setting of the center distance in accordance with the invention additionally permits the satisfaction of an additional condition.

The additional condition that can be predefined in accordance with the invention and that can be satisfied by setting the axial cross angle preferably relates to the geometry of the gear teeth.

In a first variant of the present invention, the additional condition can be a specification with respect to the shape of the gear teeth in the inactive part of the gear teeth. In a second variant of the present invention, the additional condition can in contrast be a specification of the shape of the gear teeth in the active part of the gear teeth. The inactive part of the gear teeth is in particular the non-involute part of the gear teeth, in particular the root and/or the tip. The active part of the gear teeth is in particular the involute part of the gear teeth, in particular the left and/or right tooth flank.

Within the framework of the first variant, the specification can relate to the root geometry, in particular to the root radius and/or to the extent of the root, and/or to the tip geometry, in particular to the tip radius and/or to the extent of the tip, of the gear teeth generated on the workpiece. A specification relating to the root geometry is particularly relevant within the framework of the present invention.

Within the framework of the second variant, in which the additional condition relates to a specification relating to the shape of the gear teeth in the active part of the gear teeth, the specification can in particular relate to the position of a modification generated on the active tooth flank of the workpiece by a modification on the tool.

The root radius or the tip radius of the gear teeth generated on the workpiece can therefore in particular be predefined as the additional condition, wherein a corresponding root radius or tip radius is generated by a corresponding setting of the axial cross angle and of the center distance within the framework of the process in accordance with the invention.

Alternatively, the position of a modification generated on the active tooth flank of the workpiece can be predefined as the additional condition, wherein a corresponding position of the modification is generated by a corresponding setting of the axial cross angle and of the center distance within the framework of the process in accordance with the invention.

If only one additional condition is predefined in accordance with the invention, this can preferably be exactly satisfied by the process in accordance with the invention. The center distance and the axial cross angle and, optionally, the correction of the generating coupling are in particular determined in accordance with the invention such that the desired tooth trace shape and/or the tooth thickness is/are generated and the additional condition is exactly satisfied.

Within the framework of the present invention, however, two or more additional conditions can also be predefined, in particular two of the above-named additional conditions. A first specification relating to the shape of the gear teeth in the inactive part of the gear teeth and a second specification relating to the shape of the gear teeth in the active part of the gear teeth can in particular be predefinable. A specification relating to the root radius and/or tip radius and a specification relating to the position of a modification generated on the active tooth flank of the workpiece by a modification on the tool can in particular be provided in accordance with the invention. In this case, the two or more additional conditions can, however, typically no longer be exactly satisfied. The center distance and the axial cross angle and, optionally, a correction of the generating coupling are therefore preferably determined by means of a curve fitting such that the two or more additional conditions are satisfied in an ideal approximation.

The present invention permits a plurality of new applications that will be explained in more detail in the following:

In a first variant, in accordance with the invention, the root can be processed together with the active tooth flank in at least one machining stroke. In accordance with the invention, the tooth thickness generated in this machining stroke and the root radius generated in this machining stroke are predefinable separately and/or the material removal in the region of the root and of the tooth flank can be set separately. In accordance with the invention, the tooth thickness generated in this machining stroke and the root radius generated in this machining stroke are generated by a suitable setting of the axial cross angle and of the center distance between the tool and the workpiece.

The inventor of the present invention has recognized that the material removal in the region of the root substantially only depends on the center distance and, in contrast, not on the axial cross angle. The material removal in the region of the tooth flanks, in contrast, depends on the center distance and on the axial cross angle. In accordance with the invention, the center distance can therefore be set in dependence on the predefined root radius or in dependence on the predefined material removal in the region of the root and the axial cross angle can be set in dependence on the center distance determined in this manner such that the desired tooth thickness or the desired material removal is achieved in the region of the tooth flanks.

The process in accordance with the invention has considerable advantages over methods known from the prior art in which the material removal was not separately settable on the tooth flanks and in the root. This could have the result that a technologically unfavorably large material removal would take place in the root or that an unnecessarily small material removal would have to be selected on the tooth flanks.

The material removal on the right and left tooth flanks is preferably separately predefinable within the framework of the present invention. A corresponding material removal is preferably generated by a suitable setting of the axial cross angle and of the center distance between the tool and the workpiece and of a suitable correction of the generating coupling. An independent setting of the material removal on the right and left tooth flanks is in turn possible by the correction of the generating coupling.

In a second variant that is preferably carried out in accordance with the first variant, the workpiece is machined with a plurality of machining strokes, wherein the root is machined together with the active tooth flank in at least one machining stroke. The setting of the axial cross angle and of the center distance between the tool and the workpiece takes place such that the material removal in the region of the root is smaller in the last machining stroke than in a preceding machining stroke. The inventor of the present invention has recognized that the amount of the material removal in the region of the root has an effect on the quality of the gear teeth in the active region of the tooth flank. If the material removal for the last machining stroke is therefore selected as small in the region of the root, the negative effects on the gear manufacturing quality in the region of the tooth flanks are reduced.

The material removal in the region of the root in all the preceding machining strokes is preferably larger than or equal to the material removal in the region of the root in the last machining stroke. Alternatively or additionally, no material removal at all can take place in the root region in the last machining stroke.

In a third variant that can optionally be combined with the first and/or second variants, the root is machined together with the active tooth flank in at least one machining stroke, while the root is not co-machined in at least one other machining stroke. This can have technological advantages, on the one hand; it increases the degrees of freedom in the machining of the active tooth flank, on the other hand.

No modification caused by a variation of the axes of movement of the gear manufacturing machine is preferably generated in the one machining stroke in which the root is machined together with the active tooth flank. This has the advantage that no modification is applied to the root. In contrast, in the other machining step, a modification of the active tooth flank caused by a variation of the axes of movement is preferably generated, while the tool remains out of engagement with the root. In accordance with the invention, a sufficiently large distance is selected between the root of the gear teeth of the workpiece and the tip of the tool in accordance with the invention such that, despite the variation of the axes of movement by which the modification of the active tooth flank is generated, the tool remains out of engagement with the root of the gear teeth generated on the workpiece.

The variation of the axes of movement by which the modification of the active tooth flank is generated can in particular be a variation of the center distance and/or of the axial cross angle and/or of the correction of the generating coupling. The center distance and/or the axial cross angle and/or a correction of the generating coupling are preferably therefore changed in the other machining stroke for producing a tooth trace modification of the active tooth flank in dependence on the workpiece width position.

The present invention permits the use of a combination dressing tool in generating grinding for the dressing of the grinding worm used as the tool, wherein the combination dressing tool simultaneously dresses at least one left and one right tooth flank and one tip of the grinding worm. The tooth thickness and the tip radius of the grinding worm are admittedly hereby dependent on one another. In accordance with the invention, a desired root radius and a desired tooth trace shape and/or tooth thickness of the gear teeth to be generated on the workpiece can nevertheless be generated by a suitable setting of the center distance and of the axial cross angle and, optionally, by a suitable correction of the generating coupling between the tool and the workpiece in the machining of the workpiece.

A combination dressing tool in the sense of the present invention can in particular be a dressing roller and/or a combination of dressing rollers and/or a multi-ribbed dressing roller and/or a dressing gear wheel.

In the above-described variants of the present invention, the additional condition respectively referred to a specification relating to the geometry of the gear teeth to be generated in the region of the root and/or of the tip, in particular to a specification of a desired root radius. The present invention is, however, not restricted to such additional conditions that relate to the inactive region of the gear teeth.

In a further variant of the present invention, a tool is used that has a modification that is applied to the active tooth flank of the workpiece during gear manufacturing machining. The position of the modification on the active tooth flank of the workpiece is predefinable and/or variable in accordance with the invention and/or is set via the setting of the axial cross angle and of the center distance between the tool and the workpiece.

The inventor of the present invention has recognized that the position of the modification on the active tooth flank of the workpiece depends in different manners on the center distance and on the axial cross angle. The position of the modification depends more on the center distance, but also less on the axial cross angle. The center distance can therefore be set in a first approximation in dependence on the desired position of the modification on the active tooth flank of the workpiece, wherein the axial cross angle is then set in dependence on this center distance such that the desired tooth thickness and/or tooth trace shape is generated. However, an equation system in the parameters center distance and axial cross angle and, optionally, correction of the generating coupling has to be solved for the exact determination of the center distance and of the axial cross angle so that both the desired position of the modification and the tooth thickness and/or tooth trace shape are achieved.

A possible application comprises a tool being used whose modification was configured for a different desired workpiece geometry, wherein the position of the modification on the workpiece is adapted to the new desired workpiece geometry via the setting of the axial cross angle and of the center distance between the tool and the workpiece. For example, a tool can thus be used that is actually configured for the desired workpiece geometry of a gear wheel that forms a gear train pair with the gear wheel to be machined.

The modification of the tool used in accordance with the invention can in particular be generated by a corresponding modification of the dressing tool. The tool can in particular be dressed within the framework of the present invention using a dressing tool that has a profile modification that is transferred to the tool by the dressing. A dressing tool can in particular be used that simultaneously dresses at least one left tooth flank and one right tooth flank. A dressing roller and/or a combination of dressing rollers and/or a multi-ribbed dressing roller and/or a dressing gear wheel can in particular be used as the dressing tool.

If the left and right tooth flanks are dressed simultaneously, the position of the profile modification during dressing can no longer be set independently of the tooth space width or tooth thickness of the gear teeth of the tool.

The present invention, however, permits the position of the modification on the workpiece to be adapted to the desired workpiece geometry via the setting of the axial cross angle and of the center distance between the tool and the workpiece and in particular to generate the position of the modification as desired and nevertheless also to generate the desired tooth thickness and/or tooth trace shape.

Work can be carried out within the framework of the present invention with an axial cross angle constant over the workpiece width in at least one machining stroke. Work can furthermore also be carried out with an axial cross angle constant over the workpiece width in all the machining strokes. A constant axial cross angle can in particular be determined within the framework of the invention for a respective machining stroke in dependence on the additional condition and can be used in gear manufacturing machining. It is, however, also possible within the framework of the present invention to vary the axial cross angle in dependence on the workpiece width.

In a further independent aspect, the present invention comprises a gear manufacturing machine having a tool holder and a workpiece holder as well as NC axes for setting the relative position between the tool and the workpiece for gear manufacturing machining a workpiece held in the workpiece holder by a tool held in the tool holder. The gear manufacturing machine comprises a control for controlling the NC axes for carrying out a generating machining method in which the tool for the gear manufacturing machining rolls off on the workpiece. The control has an input function by which a desired tooth trace shape and/or tooth thickness and an additional condition are predefinable. The control furthermore has a machining function that sets the center distance and the axial cross angle between the workpiece and the tool during generating machining such that the machined workpiece has the desired tooth trace shape and/or tooth thickness and satisfies the additional condition.

As already described above, the desired tooth trace shape can be both an unmodified tooth trace and a tooth trace modification. The present invention thus also relates to such a gear manufacturing machines whose input function does not permit any predefinition of a tooth trace modification. However, the present invention preferably relates to gear manufacturing machines in which a tooth trace modification is predefinable via the input function.

Alternatively or additionally, a tooth thickness generated in a machining stroke and/or a root radius generated in a machining stroke can be separately predefinable by the input function. Further alternatively or additionally, the material removal can be separately predefinable on the right and left flanks and in the root. The machining function preferably correspondingly controls the center distance, the axial cross angle and, optionally, a correction of the generating coupling to generate the tooth thickness and/or the root radius or to carry out the predefined material removal.

The control of the NC axes by the machining function preferably takes place in an automated manner in dependence on the predefined tooth trace shape and/or tooth thickness and on the additional condition.

The additional condition can in particular be an additional condition such as was described above. The input function and the machining function are further preferably designed such that one of the above-described processes can be carried out via the gear manufacturing machine in accordance with the invention. The machining function is preferably configured such that it carries out a generating machining in accordance with one of the processes presented above in an automated manner in dependence on the inputs and/or specifications.

In a further independent aspect, the present invention comprises a calculation apparatus for calculating the relative positions between the tool and the workpiece required for the carrying out of generating machining. Such a calculation apparatus can in particular comprise a microprocessor and a memory with software being stored in the memory that runs in the microprocessor. The present invention furthermore comprises software for calculating the relative position between the tool and the workpiece required for carrying out generating machining.

The calculation apparatus and/or software comprises an input function by which a desired tooth trace shape and/or tooth thickness and an additional condition are predefinable as well as a determination function that determines the center distance and the axial cross angle between the workpiece and the tool during generating machining such that the machined workpiece has the predefined tooth trace shape and/or tooth thickness and satisfies the additional condition. The determination function furthermore preferably determines a correction of the generating coupling during generating machining.

The input function and the determination function are preferably configured such that a calculation of the relative position between the tool and the workpiece required for carrying out a process in accordance with the invention such as was described above is possible via the determination function. The input function is furthermore preferably configured such that the specifications presented above, and in particular at least one of the additional conditions presented above, are predefinable.

The calculation apparatus and/or the software can be part of a gear manufacturing machine in accordance with the invention, wherein the data determined by the determination function are used by the machining function for machining a workpiece.

Alternatively, the calculation apparatus and/or the software can be an apparatus separate from a gear manufacturing machine. The calculation apparatus and the software, however, preferably have an interface by which the data determined by the determination function can be transmitted to a gear manufacturing machine such that it can carry out generating machining on the basis of the data.

The present invention will now be explained in more detail with reference to embodiments and Figures.

BRIEF DESCRIPTION OF THE FIGURES

The Figures only show w-z diagrams of cylindrical gear teeth by way of example. The w-z diagrams of conical gear teeth are generally not rectangular, are typically trapezoidal, since the evaluation region of the generating path varies over the gear tooth width;

FIG. 5B showing the center distance change $\Delta d$ that is required to keep the tooth thickness of the workpiece constant with a changing axial cross angle.

FIG. 6B showing the change of the profile angle $\alpha_{tw}$ in the transverse section of the theoretical generating rack of the workpiece.

FIG. 7A shows the transverse section with an unchanged axial cross angle; and FIG. 7B shows the transverse section with a changed axial cross angle between the strokes.

FIGS. 8A and 8B show the engagement of a grinding worm having two variants of dressing wheels that can be used for a simultaneous dressing of the left and right tooth flanks and of the worm tip.

FIG. 10A shows the dressing tool during the dressing of the flanks of the worm; and FIG. 10B shows the dressing tool during the dressing of the tips of the worm threads.

FIG. 11A shows the dressing tool during the dressing of the flanks of the worm threads; and FIG. 11B shows the dressing tool during the dressing of the tip of a worm thread.

FIG. 12A shows a worm thread having a rounded tip; FIG. 12B shows a worm thread having a non-rounded tip.

FIG. 16 shows the different positions of the contact track on the left flank (LF) and on the right flank (RF) of a workpiece in dependence on the profile angle $\alpha$ of the tool used.

FIG. 17 shows the different positions of the contact track on the left flank (LF) and on the right flank (RF) of a workpiece in dependence on the axial cross angle $\gamma$.

FIG. 21B showing a conical grinding worm as an example for a conical tool.

DETAILED DESCRIPTION

Figure 1:
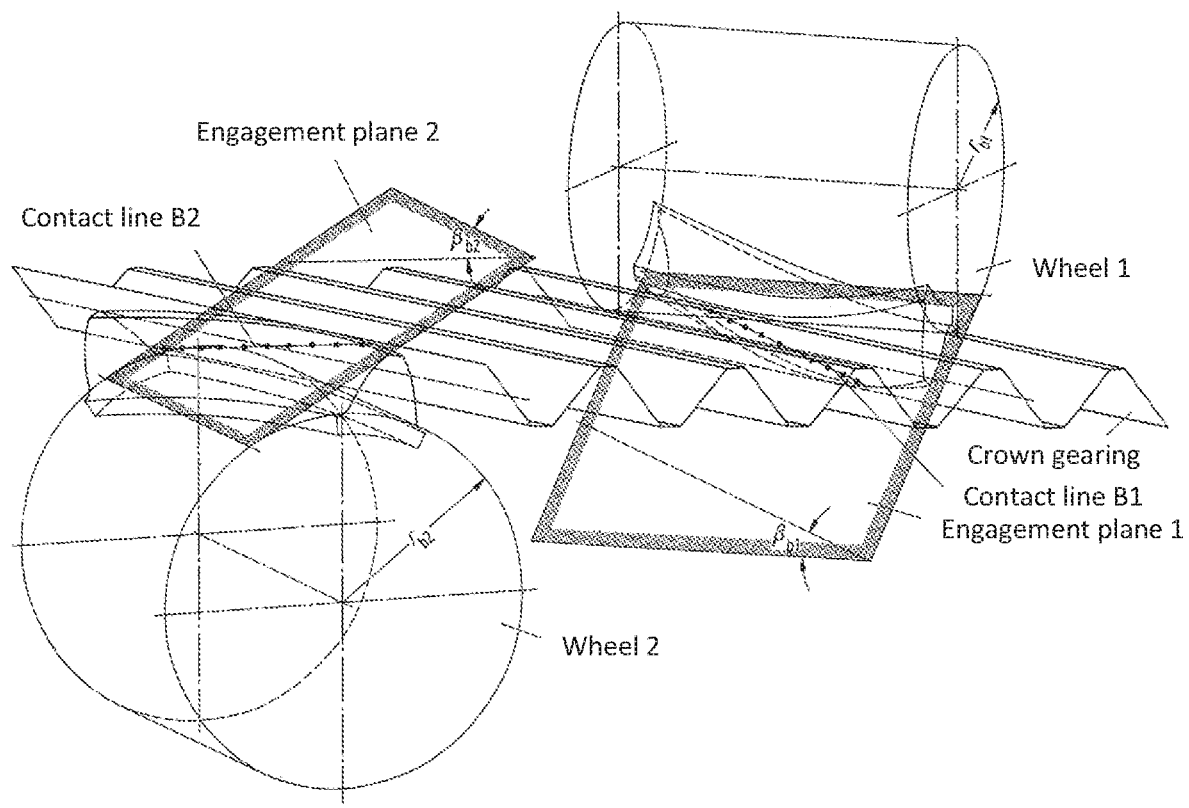
FIG. 1 shows a representation of two gearing arrangements in a continuous generating gear train including the common rack and the engagement planes of both gearing arrangements. For a better illustration, the relative position of the two gearing arrangements does not correspond to that in the continuous generating gear train. This Figure also shows the relative position of cylindrical gear teeth to the generating rack. (From Niemann, G; Winter, H: Maschinenelemente Band 3 2. Auflage, [Machine Elements Vol. 3, 2nd Edition] Springer Verlag, Berlin, 1983)

The invention describes a process for producing gearing arrangements. The production takes place using a toothed tool that forms a continuous generating gear train, i.e. a gear train with crossed axes, with the workpiece. The workpiece and the tool can each be both cylindrical and conical. Conical tools or conical workpieces are characterized by different leads on the left and right flanks and are frequently also called beveloids. In the cylindrical case, the leads are identical on both flanks. The profiles of the workpieces and of the tools can be both symmetrical and asymmetrical, that is the profile angles on the left and right flanks can be different. The tool can have both defined edges and non-defined edges. In the case of a non-defined edge, the enveloping gearing of the tool is to be considered in the following calculations. The production methods in which the process described here can inter alia be used are in particular continuous generating grinding, gear hobbing, and skive hobbing. The tools can have both one thread and multiple threads. The process is preferably used during a two-flank machining of the workpiece; however, a single-flank machining is likewise possible.

It is the idea of the invention to set the axial cross angle γ specifically and/or to vary it during the machining. The axial cross angle can be changed between two machining strokes and can then be kept constant during the individual machining strokes; however, the axial cross angle can also be changed in a further embodiment during a machining stroke in dependence on the axial feed position $z_{V2}$ of the workpiece.

It is the underlying recognition of the invention that a change of the axial cross angle has a comparable effect on the left and right flanks of the workpiece as a change of the center distance. The span measurement of the produced workpiece can thus be changed via the axial cross angle, for example in the variant in which the axial cross angle is not changed during the machining. The profile of the workpiece remains unaffected thereby. Such a change of the span measurement was previously only possible by a change of the center distance with a given tool. Such a change of the center distance, however, also automatically produces a change in the root diameter of the workpiece if the root is also machined. Such a change of the root diameter is, however, often not desired or can have a technologically negative effect, in particular during generating grinding.

In the variant of the invention in which the axial cross angle is changed during a machining stroke, free tooth trace modifications can be generated on the left and the right if a correction of the generating coupling is additionally carried out. Such free tooth trace modifications were previously only able to be generated via a change of the center distance and of the angle of rotation of the workpiece (see DE10208531). If the root is co-machined, this change of the center distance produces a non-constant root radius of the workpiece over the workpiece width, which is generally not wanted. If the root is also ground especially during generating grinding, such a center distance change produces very different material removal in the root, which can have a technologically negative effect and can result in grinding burn in the root in certain cases. If the root is not also to be ground, the center distance change can produce an unwanted partial initial grinding of the root that can have a negative effect on the load-bearing capacity of the root. The machining of the root means a machining of the non-involute region beneath the utilizable root circle radii or at least a part of this region.

If the process used is a continuous generating grinding, only called generating grinding in the following, both dressable and non-dressable grinding worms can be used therein. If the worms are dressed, different types of dressing tools and different dressing methods can be used. FIGS. 8A and 8B thus shows dressing wheels in an embodiment with a tip dressing roller. Multi-ribbed dressing tools can also be used that dress at least two left flanks and/or at least two right flanks simultaneously. Such a multi-ribbed dressing tool is shown in a special embodiment in FIGS. 10A and 10B. A further possibility of dressing worms is the dressing using dressing gear wheels. Such dressing gear wheels known from the prior art are gear wheels provided with an abrasive film. The dressing kinematics correspond to the kinematics of generating grinding, wherein a dressing over the total worm length is implemented via the axial feed $z_{V1}$ of the worm. Optionally, different regions of the dressing gear wheel could be brought into contact with the worm via the axial feed $z_{V2}$ of the dressing gear wheel in order thus, for example, to apply topological modifications to the worm.

The dressing can be carried both on one flank and on two flanks in the variants described here. On a two-flank dressing, at least one left flank and at least one and at least one right flank are dressed simultaneously, that is in one dressing stroke.

In this application, dressing tools mean, if not specified in more detail, all tools suitable for dressing a grinding worm, in particular dressing plates, single-ribbed or multi-ribbed dressing rollers and dressing gear wheels. Dressing means, if not specified in more detail, the process of dressing a grinding worm using one of said dressing tools.

The mathematical principles will be described in the following:

Parameters which differ or which may differ for left and right flanks are provided with the index F. F can be l (left) or r (right). Equations in which the index F occurs always apply to left flanks and right flanks.

The involute gearings discussed in the following are divided into the following four types in dependence on the base circle radii ($r_{br}$, $r_{bl}$) and on the base helix angles ($\beta_{br}$, $\beta_{bl}$).

1. Cylindrically symmetrical: $r_b := r_{br} = r_{bl}$ and $\beta_b := \beta_{br} = \beta_{bl}$
2. Cylindrically asymmetrical: $r_{br} \neq r_{bl}$ and $$\frac{\tan\beta_{br}}{r_{br}} = \frac{\tan\beta_{bl}}{r_{bl}}$$

3. Conically symmetrical: $\beta_{br} \neq \beta_{bl}$ and $r_{br} \cos\beta_{br} = r_{bl} \cos\beta_{bl}$
4. Conically asymmetrical: $\beta_{br} \neq \beta_{bl}$ and $r_{br} \cos\beta_{br} \neq r_{bl} \cos\beta_{bl}$ and $$\frac{\tan\beta_{br}}{r_{br}} \neq \frac{\tan\beta_{bl}}{r_{bl}}$$

Values which relate to the tool are provided with the index 1 and those which relate to the workpiece are provided with the index 2.

A tool which likewise has involute gear teeth, as a rule with a large helix angle, is used for the production of involute gear teeth. There is a theoretical point contact between the tool and the end geometry of the gear teeth to be produced during the machining process. The surfaces of the tooth flanks, both of the workpiece and of the tool, are typically parameterized over the generating path (w) and the position in the width line direction (z).

$$E_F(w, z) = \begin{pmatrix} r_{bF} \cdot \sin\left(s_F \cdot \left(\frac{w}{r_{bF}} + \eta_{bF}\right) - \frac{z \cdot \tan(\beta_{bF})}{r_{bF}}\right) - \\ s_F \cdot w \cdot \cos\left(s_F \cdot \left(\frac{w}{r_{bF}} + \eta_{bF}\right) - \frac{z \cdot \tan(\beta_{bF})}{r_{bF}}\right) \\ r_{bF} \cdot \cos\left(s_F \cdot \left(\frac{w}{r_{bF}} + \eta_{bF}\right) - \frac{z \cdot \tan(\beta_{bF})}{r_{bF}}\right) + \\ s_F \cdot w \cdot \sin\left(s_F \cdot \left(\frac{w}{r_{bF}} + \eta_{bF}\right) - \frac{z \cdot \tan(\beta_{bF})}{r_{bF}}\right) \\ z \end{pmatrix} \quad (1)$$

$s_F$ serves to write equations for left and right flanks in a compact form and is defined by:

$$s_F := \begin{cases} +1, & \text{for left flanks} \\ -1, & \text{for right flanks} \end{cases}$$

This parameterization allows simple relationships to be calculated for the progression of the contact point (contact path) on the tool and on the workpiece. This progression is continuously displaced on the workpiece by its axial feed. The knowledge of these progressions makes it possible to associate a point on the workpiece unambiguously with a point on the tool, and vice versa.

The following definitions are made to formulate the relationships mathematically: The following terms are used for transformations:

$R_x(\varphi)$ rotation by the angle $\varphi$ about the x axis. Analogously for y and z $T_x(v)$ translation by the path v in the x direction. Analogously for y and z $H(A_1, \ldots, A_N)$ general transformation describable by a homogenous matrix with a total of N coordinates $A_1$ to $A_N$.

The term "coordinates" is used here for generalized, not necessarily independent coordinates.

The axis of rotation of gear teeth in the system of rest always coincides with the z axis. The gear tooth center is at $z=0$. The tooth thickness is given by the sum $\Sigma\eta_b := \eta_{bl} + \eta_{br}$ of the base gap half-angle $\eta_{bF}$ of the left and right flanks for the generally asymmetrical gear teeth considered here. This sum is called the base gap angle here. The tooth thickness is used here synonymously for the parameters ball measurement, span measurement, $\Sigma\eta_b$ or another check size.

It is furthermore important for the formulation of the relationships to define the kinematic chains which describe the relative positions between the workpiece and the tool. This depends on whether the tool or the workpiece is cylindrical or conical. All four possible combinations will be looked at here.

Kinematic Chain for a Cylindrical Tool and a Cylindrical Workpiece

The relative position between the tool and the workpiece is described by the following kinematic chain $K_R$:

$$K_R = R_z(-\varphi_1) \cdot T_z(-z_{V1}) \cdot T_y(d) \cdot R_y(\gamma) \cdot T_z(z_{V2}) \cdot R_z(\varphi_2) \quad (2)$$

$\varphi_1$: Tool angle of rotation.
$\varphi_2$: Workpiece angle of rotation.
$z_{V1}$: Axial feed of the tool (also called the shift position).
$z_{V2}$: Axial feed of the workpiece.
d: Center distance (tool/workpiece)
$\gamma$: Axial cross angle (tool/workpiece)

Kinematic Chain for a Conical Tool and a Cylindrical Workpiece

The relative position between the tool and the workpiece is described by the following kinematic chain $K_R$:

$$K_R = R_z(-\varphi_1) \cdot T_y(r_{w1}) \cdot R_x(\vartheta_1) \cdot T_z(-z_{V1}) \cdot T_y(d) \cdot R_y(\gamma) \cdot T_z(z_{V2}) \cdot R_z(\varphi_2) \quad (3)$$

$\varphi_1$: Tool angle of rotation.
$\varphi_2$: Workpiece angle of rotation.
$z_{V1}$: Feed of the tool (also called the shift position).
$z_{V2}$: Axial feed of the workpiece.
d: Dimension for the center distance (tool/workpiece)
$\gamma$: Axial cross angle (tool/workpiece)
$\vartheta_1$: Tool conical angle
$r_{w1}$: Pitch circle radius of the tool Kinematic Chain For a Cylindrical Tool and a Conical Workpiece The relative position between the tool and the workpiece is described by the following kinematic chain $K_R$:

$$K_R = R_z(-\varphi_1) \cdot T_z(-z_{V1}) \cdot T_y(d) \cdot R_y(\gamma) \cdot T_z(z_{V2}) \cdot R_x(\vartheta_2) \cdot T_y(-r_{w2}) \cdot R_z(\varphi_2) \quad (4)$$

$\varphi_1$: Tool angle of rotation.
$\varphi_2$: Workpiece angle of rotation.
$z_{V1}$: Axial feed of the tool (also called the shift position).
$z_{V2}$: Feed of the workpiece
d: Dimension for the center distance (tool/workpiece)
$\gamma$: Axial cross angle (tool/workpiece)
$\vartheta_2$: Workpiece conical angle
$r_{w2}$: Pitch circle radius of the workpiece Kinematic Chain for a Conical Tool and a Conical Workpiece The relative position between the tool and the workpiece is described by the following kinematic chain $K_R$:

$$K_R = R_z(-\varphi_1) \cdot T_y(r_{w1}) \cdot R_x(\vartheta_1) \cdot T_z(-z_{V1}) \cdot T_y(d) \cdot R_y(\gamma) \cdot T_z(z_{V2}) \cdot R_x(-\vartheta_2) \cdot T_y(-r_{w2}) \cdot R_z(\varphi_2) \quad (2)$$

$\varphi_1$: Tool angle of rotation.
$\varphi_2$: Workpiece angle of rotation.
$z_{V1}$: Axial feed of the tool (also called the shift position).
$z_{V2}$: Axial feed of the workpiece.
d: Dimension for the center distance (tool/workpiece)
$\gamma$: Axial cross angle (tool/workpiece)
$\vartheta_1$: Tool conical angle
$\vartheta_2$: Workpiece conical angle
$r_{w1}$: Pitch circle radius of the tool
$r_{w2}$: Pitch circle radius of the workpiece If the tool and/or the workpiece is/are conical, the dimension for the center distance is also only called the center distance in the following.

These kinematic chains initially first only serve the mathematical description of the invention described here. They do not have to match the physical axles of the machine on which the invention is used. If the machine has a movement apparatus, which makes possible relative positions between the tool and the workpiece in accordance with a transformation $$H(A_1, \ldots, A_{N_s}) \text{ where } N_s \geq 1 \quad (6)$$

the invention can be used on this machine when there are coordinates $A_1, \ldots, A_{N_s}$ for each set of coordinates from the kinematic chains just described which set is calculated in this invention, where $$H(A_1, \ldots, A_{N_s}) = K_R \quad (7)$$

The calculation of the coordinates $A_1, \ldots, A_{N_s}$ can be carried out by means of a coordinate transformation.

Typical movement apparatus which make possible all the required relative positions are, for example, described by the following kinematic chains:

$$H_{Bsp1} = R_z(\varphi_{B1}) \cdot T_z(-v_{V1}) \cdot R_x(90° - v_{A1}) \cdot T_z(-v_{Z1}) \cdot T_x(-v_{X1}) \cdot R_z(\varphi_{C2}) \quad (8)$$

$$H_{Bsp2}=R_z(\varphi_{B1})\cdot R_x(90°-\varphi_{A1})\cdot T_z(-v_{Y1})\cdot T_z(-v_{Z1})\cdot T_x(-v_{X1})\cdot R_z(\varphi_{C2}) \quad (9)$$

Figure 26:
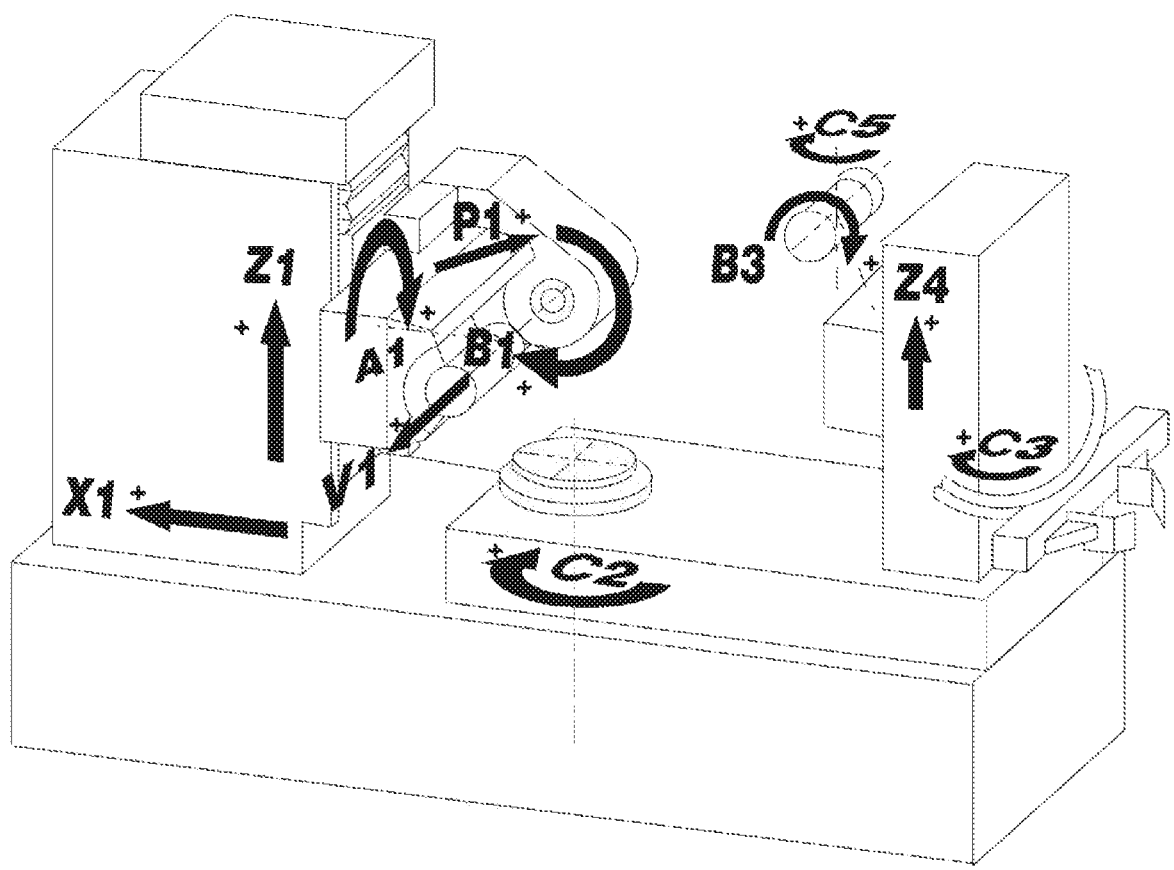
FIG. 26 schematically shows a gear manufacturing machine with the movement apparatus designed as an example here.

FIG. 26 schematically shows a gear manufacturing machine having a movement apparatus described by $H_{Bsp1}$.

FIG. 26 shows a perspective view of a gear manufacturing machine having a dressing machine which can be used for carrying out the process in accordance with the invention. The gear manufacturing machine has a machining head shown at the left having a tool holder, a workpiece holder shown at the center and a dressing tool holder shown schematically at the right. A workpiece clamped in the workpiece holder can be machined by a tool clamped in the tool holder for carrying out a gear manufacturing machining. To carry out a dressing process, the tool clamped in the tool holder can be machined by a dressing tool clamped in the dressing tool holder. This has the advantage that the tool for dressing can remain in the tool holder. The axes of movement of the machining head can furthermore be used for setting the relative position of the tool and the dressing tool on the dressing tool. The dressing functionality is, however, not necessary for the carrying out of a process in accordance with the invention for generating machining a workpiece so that it can also be dispensed with in the gear manufacturing machine used for this purpose.

The gear manufacturing machine has the axes of movement A1, B1, V1, X1, Z1 for moving the tool holder and C2 for moving the workpiece holder for carrying out the gear manufacturing machining of a workpiece.

In detail, B1 enables a rotation of the tool about its axis of rotation; X1 enables a translatory movement of the tool perpendicular to the axis of rotation of the tool or of the workpiece; Z1 enables a translatory movement of the tool in the vertical direction or in parallel with the axis of rotation of the workpiece; A1 enables a pivot movement of the tool; V1 enables a tangential movement or a shift movement of the tool in the direction of its axis of rotation; and C2 enables a rotational movement of the workpiece.

The gear manufacturing machine furthermore has the axes of movement B3, C5 for moving the dressing tool for carrying out a dressing process. The axis B3 enables a rotational movement of the dressing tool about its axis of rotation; and C5 enables a pivot movement of the dressing tool for changing the pressure angle α at the tool.

The pivot axis C5 is, however, not absolutely necessary for the processes discussed here. If a dressing plate is used, the axis of rotation B5 is also not necessary.

Other gear manufacturing machines and/or dressing machines can furthermore also be used for carrying out the processes in accordance with the invention.

In the embodiment of a gear manufacturing machine shown in FIG. 26, a change of the axial cross angle γ is implemented via the A1 axis.

The $z_{V2}$ coordinate is moved during the machining process and the feed of the workpiece is thus implemented. With cylindrical wheels, this is the axial feed; with conical wheels, this feed is not axial, but is tilted by the conical angle $\vartheta_2$ with respect to the axis of the gear teeth.

In the further course, however, the term feed is also used for $z_{V1}$ and $z_{V2}$ respectively for cylindrical tools or workpieces.

In some embodiments of this invention, a diagonal generating method is used in which the axial feed position $z_{V1}(z_{V2})$ of the tool is changed in dependence on the axial feed position $z_{V2}$ during the machining. $z_{V1}(z_{V2})$ is a continuous, preferably continuously differentiable function. The derivation from $z_{V1}(z_{V2})$ to $z_{V2}$ is called a diagonal ratio and is generally not constant. If work is carried out with a constant diagonal ratio, the following relationship applies:

$$z_{V1}(z_{V2})=K_{z_{V1}}\cdot z_{V2}z_{V01} \quad (10)$$

$K_{Z_{V1}}$ is the diagonal ratio and $z_{V01}$ is a fixed offset that enables the region on the tool to be selected that is to be used. If $K_{Z_{V1}}=0$, we speak of an axial generating method.

How the speed of the workpiece and/or of the tool and/or the feed of the tool and/or of the workpiece behave in time and/or relative to one another during the machining does not play any role in this method since only the coupling between $z_{V1}$ and $z_{V2}$ is looked at. The speeds and feeds can be changed during the machining as long as the required couplings are observed.

The four possible combinations of cylindrical and/or conical tools and workpieces will be looked at separately. The starting point in each case is the mathematical description of the progression of the contact point on the tool and on the workpiece in generating grinding as the relationship between the generating path (w) and the position in the width line direction (z) in dependence on the feed positions $z_{V1}$ and $z_{V2}$.

Cylindrical Tool and Cylindrical Workpiece

The progression of the contact point between the workpiece and the tool will be described in the following in dependence on the axial feeds $z_{V1}$ and $z_{V2}$. This progression depends on the base circle radii and on the base helix angles of the workpiece and of the tool and on the center distance d and on the axial cross angle γ. The relative position of the workpiece to the worm is described by equation (2) in this observation. This progression can be described mathematically as a relationship (R6) between the position in the width line direction ($z_F$) and the generating path ($w_F$) for the tool (index 1) and for the workpiece (index 2), as follows:

$$z_{F1}=C_{Fw1}\cdot w_{F1}-z_{V1}+C_{Fc1} \quad (11)$$

$$z_{F2}=C_{Fw2}\cdot w_{F2}-z_{V2}+C_{Fc2} \quad (12)$$

The coefficients $C_{Fw1}$, $C_{Fc1}$, $C_{Fw2}$ and $C_{Fc2}$ introduced here have the following dependencies:

$$C_{Fw1}=C_{Fw1}(\beta_{bF1}) \quad (13)$$

$$C_{Fc1}=C_{Fc1}(\beta_{bF1},\beta_{bF2},r_{bF1},d,\gamma) \quad (14)$$

$$C_{Fw2}=C_{Fw2}(\beta_{bF2}) \quad (15)$$

$$C_{Fc2}=C_{Fc2}(\beta_{bF1},\beta_{bF2},r_{bF2},d,\gamma) \quad (16)$$

This relationship shows that there is a linear relationship between $z_F$, $w_F$ and $z_V$ both for the tool and for the workpiece.

If all the points on the workpiece having a fixed generating path $w_{F2}$ are looked at in the production process, all these points on the worm only contact points having a generating path $w_{F1}$ resulting from this. The relationship (R7) between the generating paths of contacting points on the tool and on the workpiece is given by:

$$\hat{C}_{Fw1}\cdot w_{F1}+\hat{C}_{Fw2}\cdot w_{F2}+\hat{C}_{Fc}=0 \quad (17)$$

The coefficients $\hat{C}_{Fw1}$, $\hat{C}_{Fw2}$ and $\hat{C}_{Fc}$ introduced here have the following dependencies:

$$\hat{C}_{Fw1}=\hat{C}_{Fw1}(\beta_{bF1}) \quad (18)$$

$$\hat{C}_{Fw2}=\hat{C}_{Fw2}(\beta_{bF2}) \quad (19)$$

$$\hat{C}_{Fc}=\hat{C}_{Fc}(\beta_{bF1},r_{bF1},\beta_{bF2},r_{bF2},d,\gamma) \quad (20)$$

The relationships just presented follow directly from an analytical calculation of the contact points of two involute gear tooth arrangements which are oriented with respect to one another in accordance with the kinematic chain from equation (2).

It is possible using the equations (11), (12), and (17) to associate a point $(w_{F1}, z_{F1})$ on the tool with each point $(w_{F2}, z_{F2})$ on the workpiece for given axial feeds $z_{V1}$ and $z_{V2}$, and vice versa, to associate a point on the workpiece with each point on the tool.

Conical Tool and Cylindrical Workpiece

The machining processes looked at here have previously only been known with cylindrical tools. It is, however, also possible to use conical tools. The kinematics of this process can be described by a continuous generating gear train having a conical and a cylindrical wheel. These kinematics are described by the kinematic chain given in equation (3). As in the continuous generating gear train comprising two cylindrical wheels, there is also a theoretical point contact between both wheels. This enables the same approach to be used as for cylindrical tools. The progression of the contact point between the workpiece and the tool can be described mathematically as follows.

$$z_{F1} = C_{Fw1} \cdot w_{F1} + C_{Fz_{V1}1} \cdot z_{V1} + C_{Fc1} \tag{21}$$

$$z_{F2} = C_{Fw2} \cdot w_{F2} + C_{Fz_{V1}2} \cdot z_{V1} - z_{V2} + C_{Fc2} \tag{22}$$

The coefficients $C_{Fw1}$, $C_{Fc1}$, $C_{Fw2}$, $C_{Fz_{V1}1}$, $C_{Fz_{V1}2}$ and $C_{Fc2}$ introduced here have the following dependencies:

$$C_{Fw1} = C_{Fw1}(\beta_{bF1}) \tag{23}$$

$$C_{Fc1} = C_{Fc1}(\beta_{bF1}, \beta_{bF2}, r_{bF1}, d, \gamma, \vartheta_1) \tag{24}$$

$$C_{Fw2} = C_{Fw2}(\beta_{bF2}) \tag{25}$$

$$C_{Fc2} = C_{Fc2}(\beta_{bF1}, \beta_{bF2}, r_{bF2}, d, \gamma, \vartheta_1) \tag{26}$$

$$C_{Fz_{V1}1} = C_{Fz_{V1}1}(\beta_{bF1}, \beta_{bF2}, r_{bF1}, d, \gamma, \vartheta_1) \tag{27}$$

$$C_{Fz_{V1}2} = C_{Fz_{V1}2}(\beta_{bF1}, \beta_{bF2}, r_{bF2}, d, \gamma, \vartheta_1) \tag{28}$$

Equation (17) is replaced with:

$$C_{Fw1} \cdot w_{F1} + \hat{C}_{Fw2} \cdot w_{F2} + \hat{C}_{Fz_{V1}} \cdot z_{V1} + \hat{C}_{Fc} = 0 \tag{29}$$

The coefficients $\hat{C}_{Fw1}$, $\hat{C}_{Fw2}$, $\hat{C}_{Fz_{V1}}$ and $\hat{C}_{Fc}$ introduced here have the following dependencies:

$$\hat{C}_{Fw1} = \hat{C}_{Fw1}(\beta_{bF1}) \tag{30}$$

$$\hat{C}_{Fw2} = \hat{C}_{Fw2}(\beta_{bF2}) \tag{31}$$

$$\hat{C}_{Fz_{V1}} = \hat{C}_{Fz_{V1}}(\beta_{bF1}, r_{bF1}, \beta_{bF2}, r_{bF2}, \gamma, \vartheta_1) \tag{32}$$

$$\hat{C}_{Fc} = \hat{C}_{Fc}(\beta_{bF1}, r_{bF1}, \beta_{bF2}, r_{bF2}, d, \gamma, \vartheta_1) \tag{33}$$

With knowledge of these relationships, a mapping of points on the tool to points on the workpiece, and vice versa, can be calculated in an analog manner to the case of cylindrical tools and workpieces.

Cylindrical Tool and Conical Workpiece

The process described here can be transferred directly onto the production of conical workpieces. The case of a cylindrical tool will be looked at first here. The tool and the workpiece again form a continuous generating gear train whose kinematics are given by equation (4). There is again also a theoretical point contact between the tool and the workpiece. The progression of the contact point between the workpiece and the tool can be described mathematically as follows.

$$z_{F1} = C_{Fw1} \cdot w_{F1} - z_{V1} + C_{Fz_{V2}1} \cdot z_{V2} + C_{Fc1} \tag{34}$$

$$z_{F2} = C_{Fw2} \cdot w_{F2} + C_{Fz_{V2}2} \cdot z_{V2} + C_{Fc2} \tag{35}$$

The coefficients $C_{Fw1}$, $C_{Fc1}$, $C_{Fw2}$, $C_{Fz_{V2}2}$, $C_{Fz_{V2}1}$ and $C_{Fc2}$ introduced here have the following dependencies:

$$C_{Fw1} = C_{Fw1}(\beta_{bF1}) \tag{36}$$

$$C_{Fc1} = C_{Fc1}(\beta_{bF1}, \beta_{bF2}, r_{bF1}, d, \gamma, \vartheta_2) \tag{37}$$

$$C_{Fw2} = C_{Fw2}(\beta_{bF2}) \tag{38}$$

$$C_{Fc2} = C_{Fc2}(\beta_{bF1}, \beta_{bF2}, r_{bF2}, d, \gamma, \vartheta_2) \tag{39}$$

$$C_{Fz_{V2}2} = C_{Fz_{V2}2}(\beta_{bF1}, \beta_{bF2}, r_{bF2}, d, \gamma, \vartheta_2) \tag{40}$$

$$C_{Fz_{V2}1} = C_{Fz_{V2}1}(\beta_{bF1}, \beta_{bF2}, r_{bF1}, d, \gamma, \vartheta_2) \tag{41}$$

Equation (17) is replaced with:

$$\hat{C}_{Fw1} \cdot w_{F1} + \hat{C}_{Fw2} \cdot w_{F2} + \hat{C}_{Fz_{V2}} \cdot z_{V2} + \hat{C}_{Fc} = 0 \tag{42}$$

The coefficients $\hat{C}_{Fw1}$, $\hat{C}_{Fw2}$, $\hat{C}_{Fz_{V2}}$ and $\hat{C}_{FC}$ introduced here have the following dependencies:

$$\hat{C}_{Fw1} = \hat{C}_{Fw1}(\beta_{bF1}) \tag{43}$$

$$\hat{C}_{Fw2} = \hat{C}_{Fw2}(\beta_{bF2}) \tag{44}$$

$$\hat{C}_{Fz_{V2}} = \hat{C}_{Fz_{V2}}(\beta_{bF1}, r_{bF1}, \beta_{bF2}, r_{bF2}, \gamma, \vartheta_2) \tag{45}$$

$$\hat{C}_{Fc} = \hat{C}_{Fc}(\beta_{bF1}, r_{bF1}, \beta_{bF2}, r_{bF2}, d, \gamma, \vartheta_2) \tag{46}$$

With knowledge of these relationships, a mapping of points on the tool to points on the workpiece, and vice versa, can be calculated in an analog manner to the case of cylindrical tools and workpieces.

Conical Tool and Conical Workpiece

The calculation for a conical tool and a conical workpiece takes place analog to the previously discussed combinations. The tool and the workpiece again form a continuous generating gear train whose kinematics are given by equation (5). There is again also a theoretical point contact between the tool and the workpiece. The progression of the contact point between the workpiece and the tool can be described mathematically as follows.

$$z_{F1} = C_{Fw1} \cdot w_{F1} + C_{Fz_{V1}1} \cdot z_{V1} + C_{Fz_{V2}1} \cdot z_{V2} + C_{Fc1} \tag{47}$$

$$z_{F2} = C_{Fw2} \cdot w_{F2} + C_{Fz_{V1}2} \cdot z_{V1} + C_{Fz_{V2}2} \cdot z_{V2} + C_{Fc2} \tag{48}$$

The coefficients $C_{Fw1}$, $C_{Fc1}$, $C_{Fw2}$, $C_{Fz_{V2}2}$, $C_{Fz_{V2}1}$, $C_{Fz_{V1}2}$, $C_{Fz_{V1}1}$ and $C_{Fc2}$ introduced here have the following dependencies:

$$C_{Fw1} = C_{Fw1}(\beta_{bF1}) \tag{49}$$

$$C_{Fc1} = C_{Fc1}(\beta_{bF1}, \beta_{bF2}, r_{bF1}, d, \gamma, \vartheta_1, \vartheta_2) \tag{50}$$

$$C_{Fw2} = C_{Fw2}(\beta_{bF2}) \tag{51}$$

$$C_{Fc2} = C_{Fc2}(\beta_{bF1}, \beta_{bF2}, r_{bF2}, d, \gamma, \vartheta_1, \vartheta_2) \tag{52}$$

$$C_{Fz_{V2}2} = C_{Fz_{V2}2}(\beta_{bF1}, \beta_{bF2}, r_{bF2}, d, \gamma, \vartheta_1, \vartheta_2) \tag{53}$$

$$C_{Fz_{V2}1} = C_{Fz_{V2}1}(\beta_{bF1}, \beta_{bF2}, r_{bF2}, d, \gamma, \vartheta_1, \vartheta_2) \tag{54}$$

$$C_{Fz_{V1}2} = C_{Fz_{V1}2}(\beta_{bF1}, \beta_{bF2}, r_{bF2}, d, \gamma, \vartheta_1, \vartheta_2) \tag{55}$$

$$C_{Fz_{V1}1} = C_{Fz_{V1}1}(\beta_{bF1}, \beta_{bF2}, r_{bF1}, d, \gamma, \vartheta_1, \vartheta_2) \tag{56}$$

Equation (17) is replaced with:

$$\hat{C}_{Fw1} \cdot w_{F1} + \hat{C}_{Fw2} \cdot w_{F2} + \hat{C}_{Fz_{V1}} \cdot z_{V1} + \hat{C}_{Fz_{V2}} \cdot z_{V2} + \hat{C}_{Fc} = 0 \tag{57}$$

The coefficients $\hat{C}_{Fw1}$, $\hat{C}_{Fw2}$, $\hat{C}_{Fz_{V1}}$, $\hat{C}_{Fz_{V2}}$ and $\hat{C}_{Fc}$ introduced here have the following dependencies:

$$\hat{C}_{Fw1} = \hat{C}_{Fw1}(\beta_{bF1}) \tag{58}$$

$$\hat{C}_{Fw2} = \hat{C}_{Fw2}(\beta_{bF2}) \tag{59}$$

$$\hat{C}_{F_{zV1}} = \hat{C}_{F_{zV1}}(\beta_{bF1}, r_{bF1}, \beta_{bF2}, r_{bF2}, \gamma, \vartheta_1, \vartheta_2) \quad (60)$$

$$\hat{C}_{F_{zV2}} = \hat{C}_{F_{zV2}}(\beta_{bF1}, r_{bF1}, \beta_{bF2}, r_{bF2}, \gamma, \vartheta_1, \vartheta_2) \quad (61)$$

$$\hat{C}_{Fc} = \hat{C}_{Fc}(\beta_{bF1}, r_{bF1}, \beta_{bF2}, r_{bF2}, d, \gamma, \vartheta_1, \vartheta_2) \quad (62)$$

With knowledge of these relationships, a mapping of points on the tool to points on the workpiece, and vice versa, can be calculated in an analog manner to the case of cylindrical tools and workpieces.

Calculation Approach for Calculating the Contact Paths on the Tool and on the Workpiece In the following, a calculation approach will be shown with which the above-used contact paths can be calculated in dependence on the feeds. This calculation of the contact between the workpiece and the tool is carried out with the aid of two theoretical racks (also called basic racks), one each for the workpiece and the tool, each having trapezoidal, generally asymmetrical profiles which can generate the gearings. Since both the tool and the workpiece are involute gearings, this observation is symmetrical with respect to a swapping over of the tool and workpiece.

Figure 2:
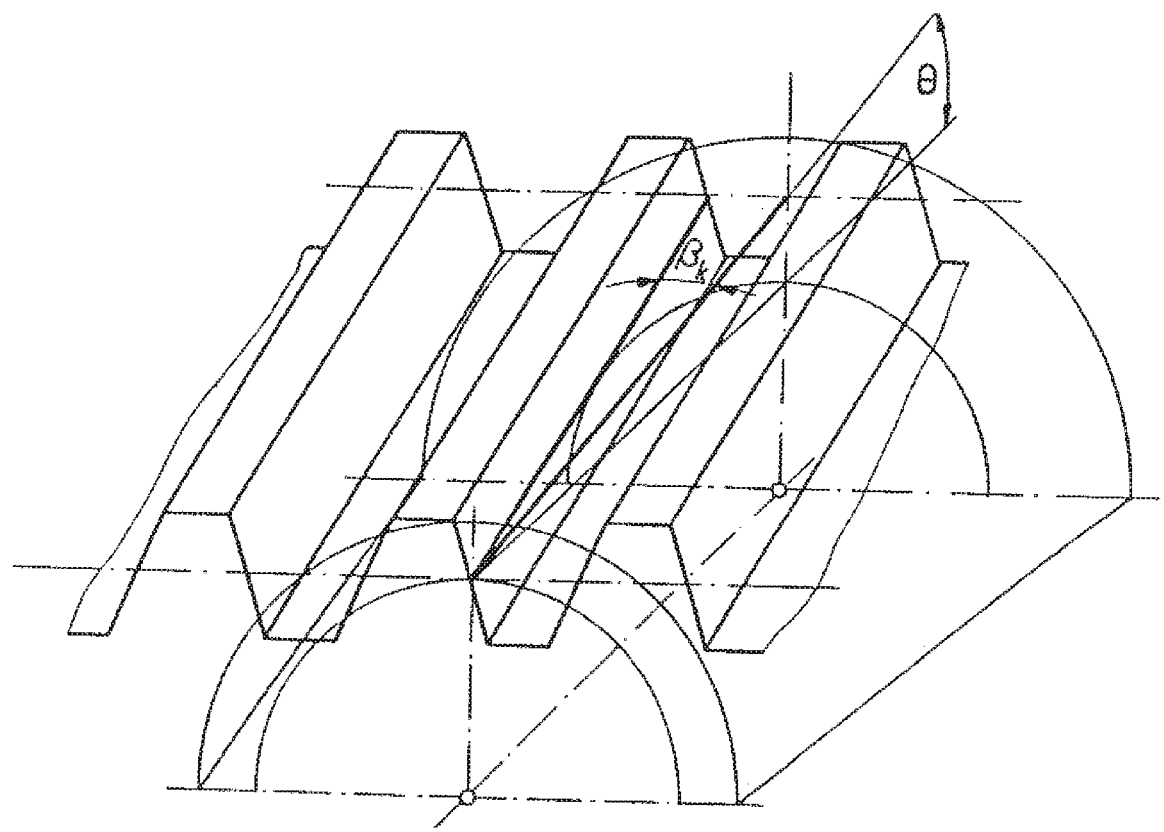
FIG. 2 shows a representation of conical gear teeth having a rack generating them. The rack is pivoted by the helix angle $\beta_k=\beta_w$ and is tilted by the conical angle $\theta=\vartheta$. (From Zierau, S: Die geometrische Auslegung konischer Zahnräder and Paarungen mit parallelen Achsen [The Geometrical Design of Conical Gears and Pairs Having Parallel Axes], Report No. 32, Institute For Construction Science, Braunschweig Technical University)
Figure 3:
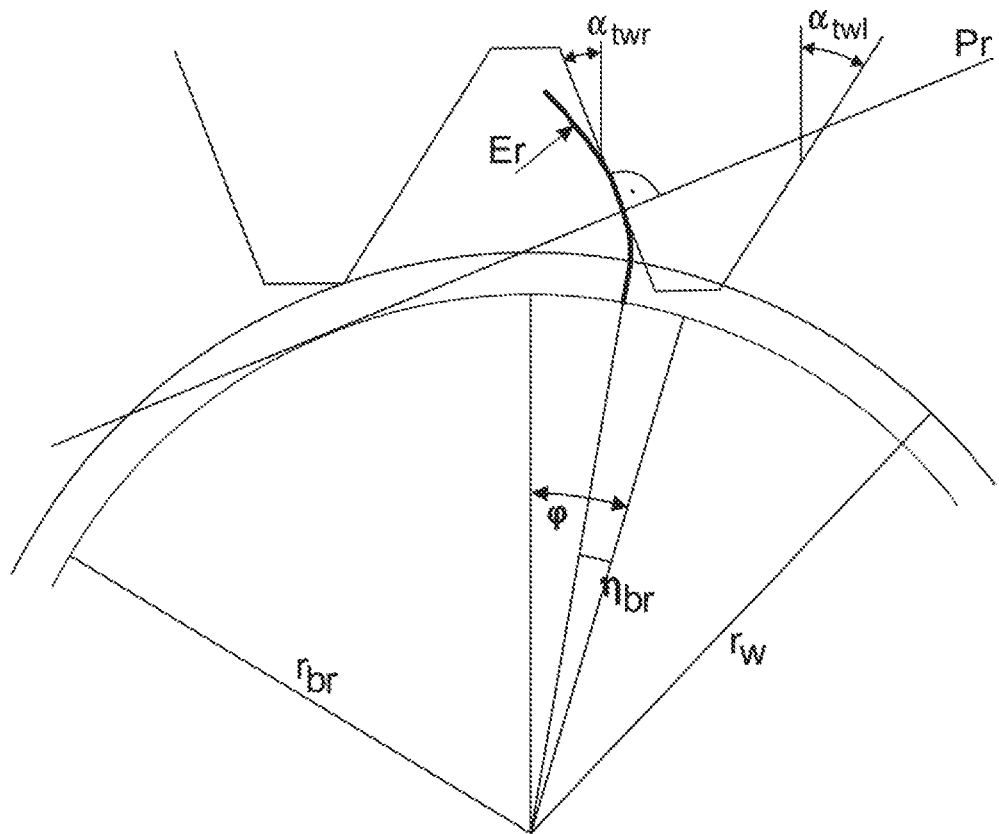
FIG. 3 shows the engagement of a right flank with a generating asymmetrical rack in the transverse section. The profile angle in the transverse section $\alpha_{twr}$ defines the inclination of the engagement planes $P_r$. The gear teeth are rotated by the angle of rotation $\varphi$.

FIG. 3 shows by way of example the contact of a right involute flank with a generating rack with a profile angle $\alpha_{twr}$ in the transverse section. The gearing is rotated by the angle of rotation $\varphi$. The contact between the flank and the rack takes place in the engagement plane $P_r$ which is inclined by $\alpha_{twr}$. The contact point between the flank and the rack results for all angles of rotation $\varphi$ as the point of intersection between the flank and the engagement plane. While the gearing rotates, the rack is horizontally displaced so that it rolls off the pitch circle with a radius $r_w$ without slippage. The flank and the rack thereby remain in contact. To describe the gearing in its whole width, the relative position of the rack to the gearing has to be observed in 3D. It is pivoted by the helix angle $\beta_w$ for cylindrical gearing. For the case of a conical gearing, the position of the rack to the gearing is described exhaustively in (Zierau) ([The Geometrical Design of Conical Gears and Pairs Having Parallel Axes], Report No. 32, Institute For Construction Science, Braunschweig Technical University). In addition to the pivoting by the helix angle $\beta_w$, a tilt takes place by the conical angle $\vartheta$ (see FIG. 2). In both cases, the rack has the profile angles $\alpha_{nwF}$ in the normal section. Which combinations of angles $\alpha_{twF}$, $\alpha_{nwF}$ and $\beta_w$ as well as of the normal module $m_n$ and the transverse module $m_t$ are possible to produce a given gearing results for cylindrical gearings from the set of formulas of DIN 3960 and for conical gearings additionally from the set of formulas from [Zierau]. The formulas required for this can be transferred directly to asymmetrical gearings by introducing different profile angles at the left and right sides.

If the geometry and the relative position of the rack to the gearing are known, the transverse sections can be determined for any desired width positions and within them the contact point between the rack and the flank. All these contact points in the individual transverse sections form a straight line (straight contact line) in the engagement plane for an angle of rotation $\varphi$. If these contact points are described via w and z from the parameterization in equation (1), a linear relationship (R1) between w, z and $\varphi$ is obtained. If the rack is held fast in space, it is possible for cylindrical gearings to displace it in the axial direction. This axial feed $z_V$ is typically set for the workpiece to machine it over the total toothed width and is set for the tool to set the diagonal ratio. So that the gearing continues to contact the rack, at two flanks as a rule, the gearing has to be rotated about its axis in addition to the shift. The amount of the rotation results from the lead of the gearing and from the amount of the shift, the rotational sense from the hand of thread. With conical gearings, the feed $z_V$ does not take place in the axial direction, but rather tilted by the conical angle $\vartheta$ with respect to it. The lead required for the calculation of the correction of the angle of rotation is calculated using the same formula as for cylindrical gearings from $\beta_w$ and $m_t$. The transverse sections are to be observed in dependence on the axial feed or the feed with the correspondingly corrected angles of rotation for calculating the contact points in the individual transverse sections. A linear relationship (R2) between w, z, $z_V$ and $\varphi$ results from (R1) for the description of the contact points.

If two sets of gearings are paired in a continuous generating gear train, their two racks have to be congruent at all times, as shown in FIG. 1. This implies that the profile angles $\alpha_{nwF}$ have to be equal for both sets of gearings. (R3) furthermore results from this: $\gamma + \beta_{w1} + \beta_{w2} = 0$. This condition allows the profile angles to be determined in the normal section or in the transverse section of the two racks from a given axial cross angle for two given sets of gearings which can mesh with one another. A change of the base circle radii and of the base helix angles of the worm is thus equivalent to a change of the profile angle and/or of the conical angle and/or of the axial cross angle.

So that the racks are congruent at all times, a linear constraint (R4) results between the two angles of rotation and the two feeds.

If the two angles of rotation and the two feeds are known, the contact point of the two sets of gear teeth can be determined directly by calculating the point of intersection of the two straight contact lines. The parameters $z_{F1}$ and $w_{F1}$ or $z_{F2}$ and $w_{F2}$, which describe the contact point on gearing 1 or gearing 2, depend linearly on $\varphi_1$, $\varphi_2$, $z_{V1}$ and $z_{V2}$ (R5). If the angles of rotation are eliminated in these relationships, the sought contact paths (R6) follow.

A linear relationship (R7) results between $w_{F1}$, $w_{F2}$, $z_{V1}$ and $z_{V2}$ from (R4) and (R2) for both sets of gearings by eliminating $\varphi_1$ and $\varphi_2$ and describes, in dependence on the feed, which generating path on gearing 1 contacts which generating path on gearing 2.

The following has to apply so that the tool and the workpiece mesh with one another:

$$m_{bF1} \cdot \cos \beta_{bF1} = m_{bF2} \cdot \cos \beta_{bF2} \quad (63)$$

The linear constraint (R4) has the following form:

$$a_F + b_1 \cdot z_{V1} + s_F \cdot z_1 \cdot \eta_{bF1} - z_1 \cdot \varphi_1 + b_2 \cdot z_{V2} + z_2 \cdot \eta_{bF2} - z_2 \cdot \varphi_2 + e_F \cdot d = 0 \quad (64)$$

The coefficients $$a_F, e_F \quad (65)$$

are here dependent both on the basic parameters of the gearings and on $\gamma$ and, with conical gearings, on the conical angles. The coefficients $$b_1, b_2 \quad (66)$$

are only dependent on the basic parameters with cylindrical gearings; with conical gearings, the corresponding coefficient additionally depends on $\gamma$ and on the corresponding conical angle.

The basic parameters here mean the base circle radii, the base helix angles and the numbers of teeth/leads ($z_1$ and $z_2$).

If the tool and/or the workpiece is/are conical, it must be noted that the calculation shown delivers a dependency of $r_w$ on $\gamma$. This must be taken into account in the described kinematic chains, in particular when the axial cross angle γ is changed during a machining stroke.

Alternatively to the just described approach for involute gearings, it is also possible to carry out the contact paths (R6) and the relationship between the pitch angles (R7) with the aid of a simulation calculation. It is possible with such simulations to calculate the exact geometry of the workpiece from a given tool, in particular from a worm and from a given kinematics, in particular from a given relative position between the tool and the workpiece. Such simulations can be extended such that it is also possible to determine with them which point on the tool produces which point on the workpiece, in dependence on the feed of the tool and of the workpiece. In this path, no involute properties are used so that it can also be used for non-involute profiles. An algorithm suitable for this will be described in the following.

For this purpose, a workpiece is first looked at which is not modified as a rule. Vectors in the normal direction having a previously fixed length are placed on individual points having the coordinates ($w_{F2}$, $z_{F2}$) on the teeth of this workpiece. The length of the vectors corresponds to the allowance of the workpiece prior to grinding, with respect to the non-modified workpiece. The allowance is typically selected to be so large that each vector is shortened at least once during the simulation described in the following. The number of points on the teeth determines the accuracy of the result. These points are preferably selected as equidistant. The relative position of the workpiece to the worm is specified at every time, for example by the kinematic chain $K_r$. The section of all vectors is calculated with the worm at each of the discrete times. If a vector does not intersect the worm, it remains unchanged. If it, however, intersects the worm, the point of intersection is calculated and the vector is shortened so much that it ends just at the point of intersection. The spacing of the point of intersection from the worm axis, that is the radius on the worm $r_{F1}$ of the point of intersection, is furthermore calculated and is stored as additional information to the just shortened vector. Since the corrections of the coordinates are not changed during the grinding here, all the vectors on a given radius of the workpiece $r_{F2}$ or on a given generating path $w_{F2}$ have approximately the same length after the simulation was carried out over the total width of the worm.

Figure 4:
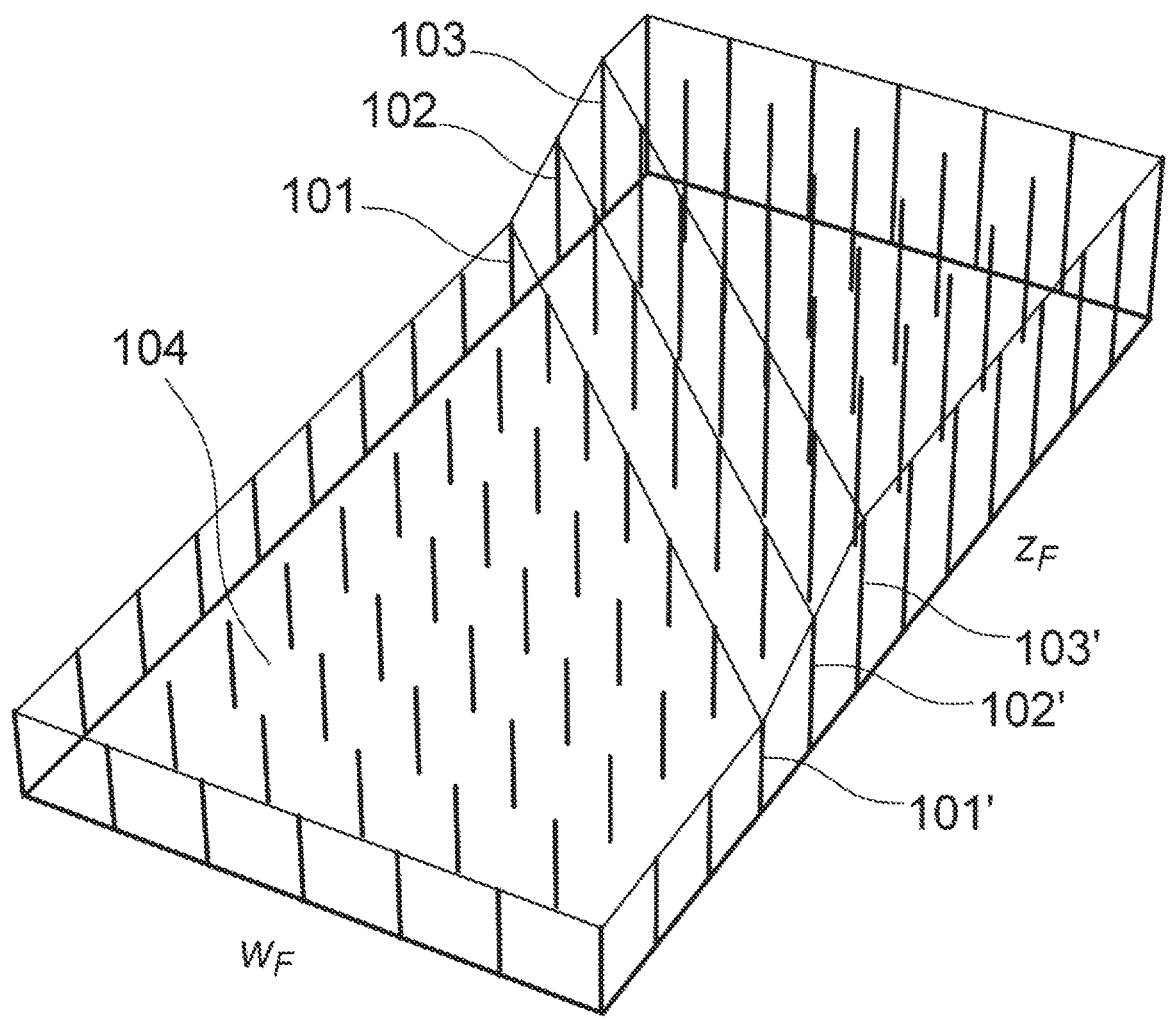
FIG. 4 schematically shows a section of the flank of a workpiece tooth with vectors in the normal direction for a workpiece not ground over the whole width. The number of vectors was considerably reduced here in comparison with a simulation calculation. The plane 104 shown schematically here corresponds to the generally curved tooth flank of the non-modified workpiece onto which the vectors are placed. The vectors 101 and 101' were already swept over by the contact path and are thus completely shortened. The vectors 102 and 102' have already been shortened at least once, but have not yet been swept over by the contact path. The vectors 103 and 103' have not yet been shortened and thus still have the length corresponding to the selected allowance.

The slight differences in the lengths are due to the fact that the algorithm described here causes markings, similar to the generating cuts during hobbing, due to the discretization of the time. These markings, and thus also the differences in the lengths of the vectors on a given radius of the workpiece, can be reduced by a finer discretization of the time, equivalent to a shortening of the time steps. If the simulation is not carried out over the total width of the workpiece, but is rather aborted at a given axial shift position $z_{V2}$ of the workpiece, only the vectors which were already swept over by the contact path have approximately the same length for a given radius on the worm. The remaining vectors either have the originally selected length or were already shortened at least once, but do not yet have the final length since they will be shortened again at a later time (see FIG. 4). This fact can be utilized to determine the contact path for the current feeds of the workpiece and of the worm with great accuracy. All the vectors on a given radius on the workpiece $r_{F2}$ or on the generating path $w_V$ are observed for this purpose and it is determined at which width line positions the transition is from vectors having approximately the same length to those having a length differing therefrom. Since the continuous generating gear train is symmetrical with respect to the swapping over of the workpiece and the worm, the contact path on the worm can be determined in the same manner. If the workpiece and the worm are both cylindrical in the involute case, the coefficients from equation (11) or (12) can be determined, for example by means of curve fitting from the points on the contact path calculated in this manner. If the vectors are determined along which the contact path extends, the radii on the worm $r_{F1}$ previously stored for them can be read out and it can thus be determined for each radius on the workpiece $r_{F2}$ by which radius on the worm $r_{F1}$ it was ground. These radii can be converted into generating paths. The coefficients from equation (17) can be determined, for example by means of curve fitting, from these value pairs for cylindrical workpieces and cylindrical worms.

If, in the involute case, the worm is conical and the workpiece is cylindrical, the contact path for at least two different feeds $z_{V1}$ has to be determined in order additionally to determine the coefficients before $z_{V1}$ in the equations (21), (22) and (29). In an analog manner, at least two different feeds $z_{V2}$ have to be looked at when the workpiece is conical and the worm is cylindrical. If the workpiece and the worm are conical, the contact paths for at least two feeds $z_{V1}$ and at least two feeds $z_{V2}$ have to be looked at to determine all the coefficients from the equations (47), (48) and (57).

The unknown coefficients from equation (64) can likewise be determined using this simulation. If a gap is completely simulated for a set of values for $z_{V1}$, $\varphi_1$, $z_{V2}$, $\varphi_2$, d, γ, and $\eta_{bF1}$, the generated gap geometry can be approximated with the aid of curve fitting to an involute in accordance with equation (1). The $\eta_{bF2}$ can be determined for left and right flanks in this manner. If first a fixed γ is selected, the searched 6 coefficients for this can be calculated in that the associated $\eta_{bF2}$ are determined with the aid of the simulation for 3 different sets of values for $z_{V1}$, $\varphi_1$, $z_{V2}$, $\varphi_2$ and d and that they are calculated from the resulting 2×3 equations (64) that are linear in the searched coefficients. To determine the dependence of the coefficients on γ, this calculation can be carried out for different γ.

Fixed Axial Cross Angle Per Machining Stroke

The first aspect of the invention will be described in detail in the following. The axial cross angle herein is predefined specifically for a machining stroke. It is the primary goal to set the tooth thickness and the root radius that result after this stroke independently of one another in a targeted manner. In the case of a conical workpiece, the root radius always means the root radius in a given fixed transverse section that, together with the root conical angle, defines the root cone of the workpiece. Analogously, in the case of a conical tool a tip radius always means the tip radius in a given fixed transverse section that defines the tip cone of the tool together with the tip conical angle. If the tool and the workpiece are both conical, a relation results between the tip radius of the tool, the root radius of the workpiece and the center distance d from the demand that both envelopes of a cone have to touch and the relative position of the two toward one another is given by the above-given kinematic chain. The envelope of a cone has to be replaced by a cylinder jacket for cylindrical tools or workpieces. The root conical angle is zero for cylindrical workpieces.

The mathematical principle for the independent setting of the tooth thickness and of the root radius is the relation:

$$a_f - a_r + z_1 \cdot \Sigma\eta_{b1} + z_2 \cdot \Sigma\eta_{b2} + (e_f - e_r) \cdot d = 0 \tag{67}$$

Figure 5A:
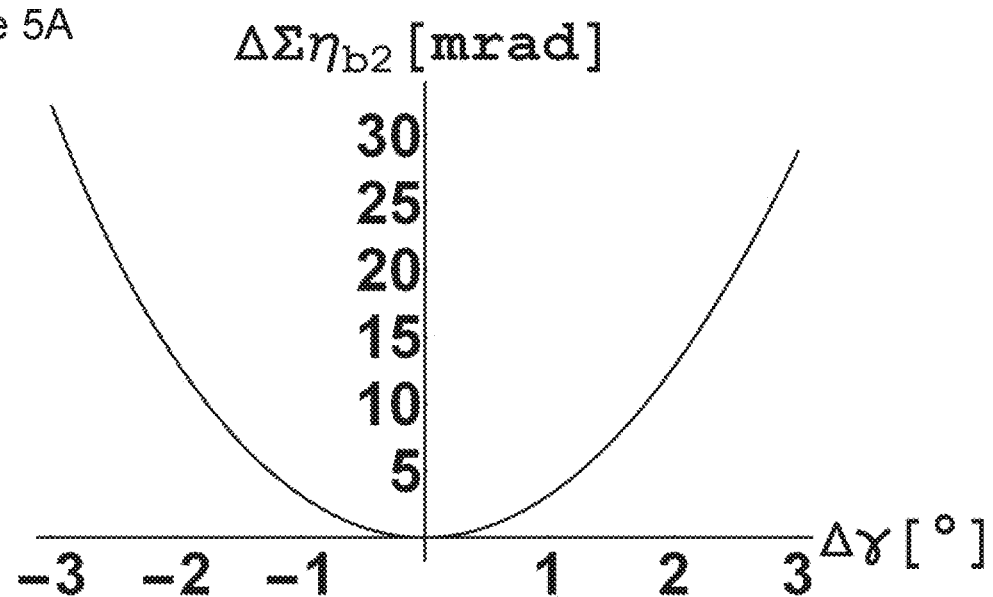
FIGS. 5A and 5B show, in dependence on the change of the axial cross angle $\Delta\gamma$ with respect to the prior art, with FIG. 5A showing the change of the basic gap angle of the workpiece $\Delta\Sigma\eta_{b2}$ with respect to the basic gap angle that is produced with the axial cross angle in accordance with the prior art.
Figure 5B:
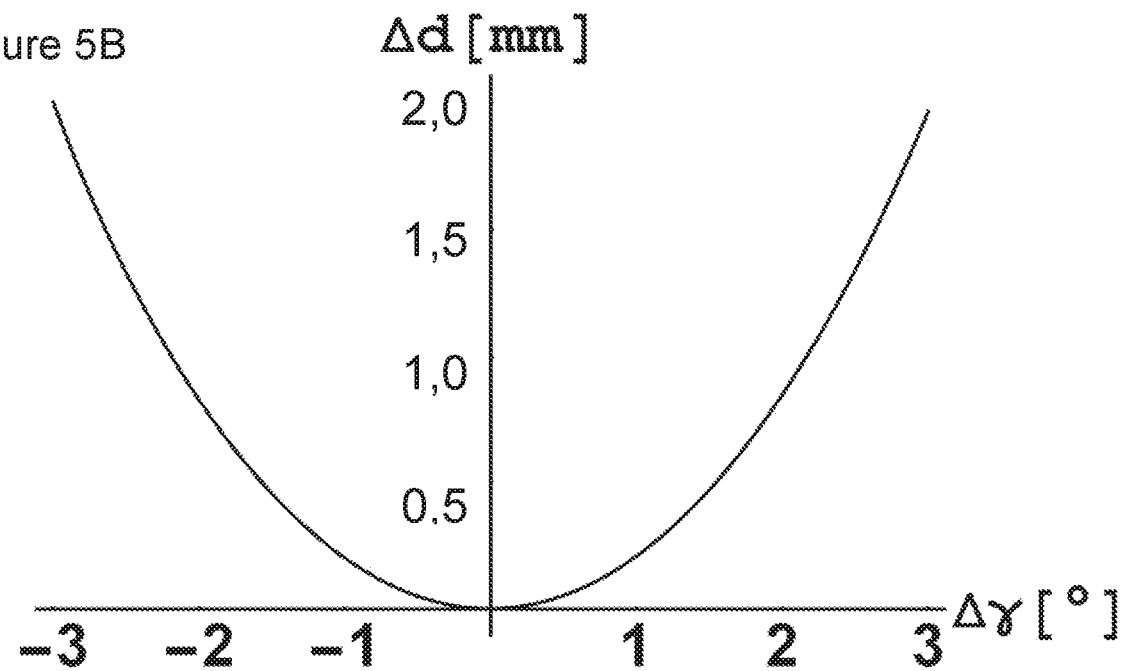

The root radius of the workpiece results from the tip radius of the tool and from d. d thus results for a given tip radius of the tool. In accordance with the prior art, the tooth thickness of the workpiece also automatically results from this for a tool with a given tooth thickness. With the recognition that the axial cross angle does not influence the profile of the gearing and with equation (67), the axial cross angle can now, however, be determined such that the desired tooth thickness is also reached in addition to the desired root radius. For this purpose, $\gamma$ has to be determined such that equation (67) is satisfied. It must be noted in this respect that there are generally two solutions for the axial cross angle $\gamma$ with respect to a desired tooth thickness that both produce the desired result (see FIG. 5A). If a tooth thickness of the workpiece is predefined, it can be reached with different axial cross angles and with associated center distances. FIG. 5B shows the changes to the axial cross angle and to the center distance required for this purpose with respect to the prior art. The axial cross angle in accordance with the prior art means the axial cross angle $\gamma'$ that is calculated from $\gamma'+\beta_1+\beta_2=0$, where $\beta_1$ and $\beta_2$ are the helix angles of the tool or of the workpiece respectively. In the examples shown in the Figures here, the maximum possible tooth thickness for a given center distance is reached at this axial cross angle. A change of the axial cross angle produces a reduction in the tooth thickness or an increase in the base gap angle, as can be seen in FIG. 5A.

The practical use of this recognition will now be shown for some application examples.

If a workpiece is produced with a root using one of the processes looked at here, a tool is typically used that produces a gap having the correct tooth thickness and the correct root radius with a predefined cutting depth. If the tool has, however, been produced such that this cannot be simultaneously achieved using the axial cross angle in accordance with the prior art, there was previously no possibility of a correction. This can now be corrected by the correct choice of the axial cross angle. The case of non-matching tools can result from production differences, but also from the fact that a tool has to be used that was configured for a different gearing or at least for a different root radius and/or for a different tooth thickness.

If dressable grinding worms are used for the machining, this problem can occur when the worm is dressed on two flanks together with the worm tip (tip region of the worm threads above the involute region) using a dressing tool in the same dressing stroke. If the dressing tool is a dressing wheel, its can equipped, for example, with a tip dressing roller. Two possible variants of such dressing wheels are shown in FIGS. 8A and B. Such a dressing tool can also be configured as a multi-rib dressing tool having a plurality of dressing wheels that dress more than one left flank and/or more than one right flank as well as one or more worm tips in the same dressing stroke. The dressing tool can, however, also be configured as a dressing gear wheel that is suitable also to dress the worm tips in the same dressing stroke such as are known from the prior art.

If such dressing tools are used, the tooth thickness of the worm and the tip radius of the worm can no longer be predefined independently of one another during dressing. For a given tip radius of the worm, said worm thus has a non-influenceable tooth thickness. If grinding takes place using this worm with the axial cross angle in accordance with the prior art with a center distance that produces the desired root radius on the workpiece, a non-influenceable tooth thickness is produced on the workpiece. The root radius and the tooth thickness on the workpiece can now also be freely defined independently of one another using the process presented here. This problem can occur, for example, when production deviations arose at the dressing tool, when the dressing tool is to be used for different gearings and/or when a change should be made between machining with and without a root.

If the root is not also to be machined, the process can also be used to precisely set the tip clearance of the tool. For this purpose, a root radius increased by the tip clearance is used in the calculation instead of the actual root radius. The tip clearance of the tool is the distance the tip of the tool has from the root of the workpiece during machining. The tip clearance is typically set to be at least so large that no machining of the root occurs while taking account of the production differences of the workpiece and of the tool and of the correction movements during the machining, in particular a correction of the center distance. It can, however be set so large as a maximum that the utilizable root circles are still achieved.

If a gearing is machined in a plurality of machining strokes that do not necessarily all have to be carried out on the same machine and not necessarily using the same process, a specific material removal $A_a$ is cut off in the root and a specific material removal $A_l$ or $A_r$ is respectively cut off on the left and right flanks respectively in each following stroke. If only the center distance is reduced between the machining strokes in accordance with the prior art, the following applies:

$$A_a = \frac{1}{2}\left(\frac{A_l}{\sin\alpha_{twl}} + \frac{A_r}{\sin\alpha_{twr}}\right) \tag{68}$$

Figure 7A:
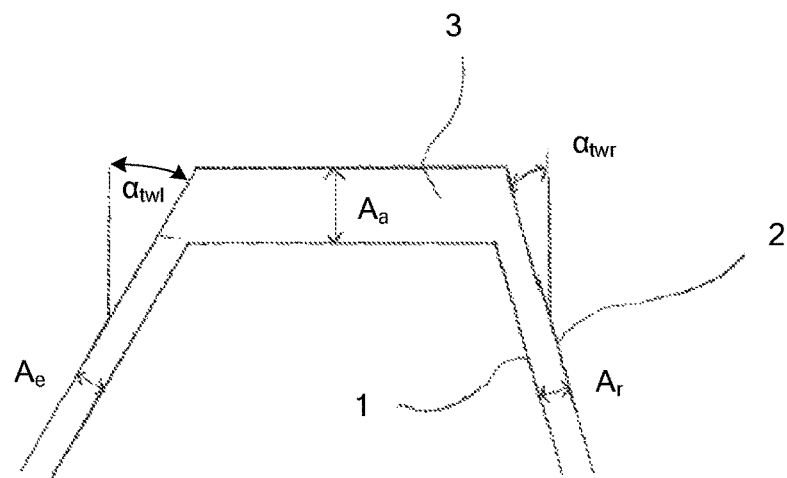
FIGS. 7A and 7B show transverse sections of a generated gap geometry shown in a simplified trapezoidal form after a first and a second machining stroke.

The material removal in the root is thus fixedly given by the two material removals at the flanks and is generally considerably larger than them. For a symmetrical workpiece with $\alpha_t=20°$, the following, for example, applies: $A_a \approx 2.9A_l=2.9A_r$. As $\alpha_t$ becomes smaller, this effect becomes increasingly greater so that $A_a \approx 5.8A_l=5.8A_r$ already applies to $\alpha_t=10°$. FIG. 7A shows the gap 1 after the first stroke and the gap 2 after the second stroke. 3 marks the contiguous cut region. The large cut material removal in the root can have a technologically negative effect. During gear hobbing, for example, thicker chips thereby arise in the root region that are in particular problematic when they are three-flank chips that may result in increased wear of the hob. If the root is also ground during the generation grinding, the larger cut volume in the root can produce grinding burn that could previously only be avoided by a smaller feed or a smaller delivery, both of which, however, produce a longer machining time.

With the possibility of being able to predefine the root radius and the tooth thickness independently of one another after every stroke, the material removals $A_a$, $A_l$, and $A_r$ can likewise be predefined independently of one another and the described technological problems can thus be solved. It can thus be advantageous in generating grinding, for example, to select the material removals in the root and on the flanks as the same for one stroke or even to select the material removal in the root as smaller than that on the flanks. This can in particular be of advantage in the last finishing stroke since a grinding of the root can produce deviations on the flanks.

Figure 7B:
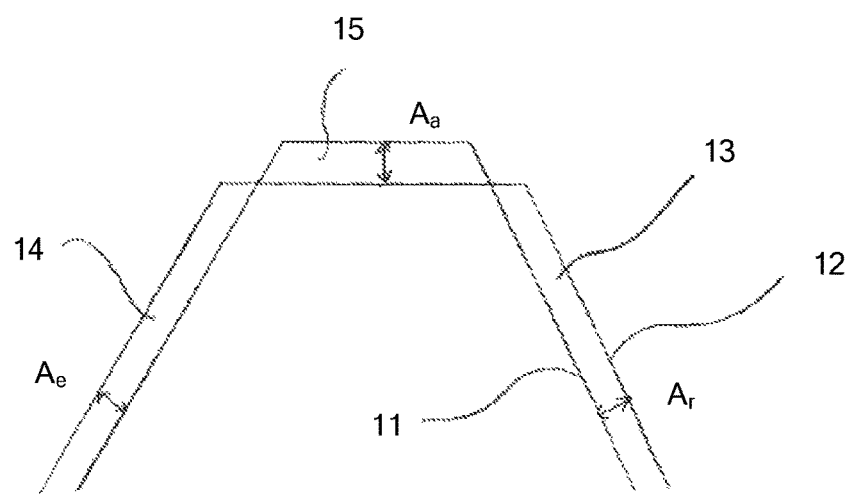

The free choice of the material removal in the root also permits said removal to be selected as negative for one stroke, which would mean that the root is not also machined in this stroke even though the flanks are machined. Such a situation is shown in FIG. 7B. 11 marks the gap after the first stroke, 12 the gap after the second stroke. The cut regions 13 and 14 are now no longer contiguous. The region 15 was already machined in the previous stroke. A machining of the root can thus be avoided in the last cut, which can improve the quality of the flanks. A further application case results in the production of gearing arrangements with tooth trace modifications, for example with tooth trace crownings. Such tooth trace modifications have previously been implemented via a change of the center distance in dependence on the feed position. This change of the center distance, however, produces a non-constant root radius over the width of the workpiece, which is generally not wanted. If, however, the final root circle is already generated in the penultimate stroke, for example, and if no tooth trace modification has yet been generated and if subsequently in the last stroke only the flanks with the desired tooth trace modification are machined, a constant root radius results over the width of the gearing. A swapping of the two strokes is also possible so that only the root is machined in the last stroke.

It is desired in specific applications cases to cut over or grind over the tip of the gear teeth with the root of the tool. It is desirable in this case to set the tooth thickness and the tip radius of the workpiece independently of one another and to predefine material removals at the flanks and at the tip of the workpiece independently of one another for one stroke. This is equally possible using the process presented here and all considerations and calculations can be taken over directly; only the tool root diameter has to be observed instead of the tool tip diameter and the workpiece tip diameter instead of the workpiece root diameter. In the case of two-flank dressing, the tool root radius is determined by the outside diameter of the dressing tool so that this diameter is to be observed instead of the outside diameter of the tip dressing tool.

The machine settings required for the achieving of the three desired material removals, in particular the axial cross angle, the center distance and the change of the generating coupling result directly as a special case of the specification described later in this invention of a tooth trace modification on the left and/or right flanks and a free progression of the root radius or of the tip radius of the workpiece.

Figure 6A:
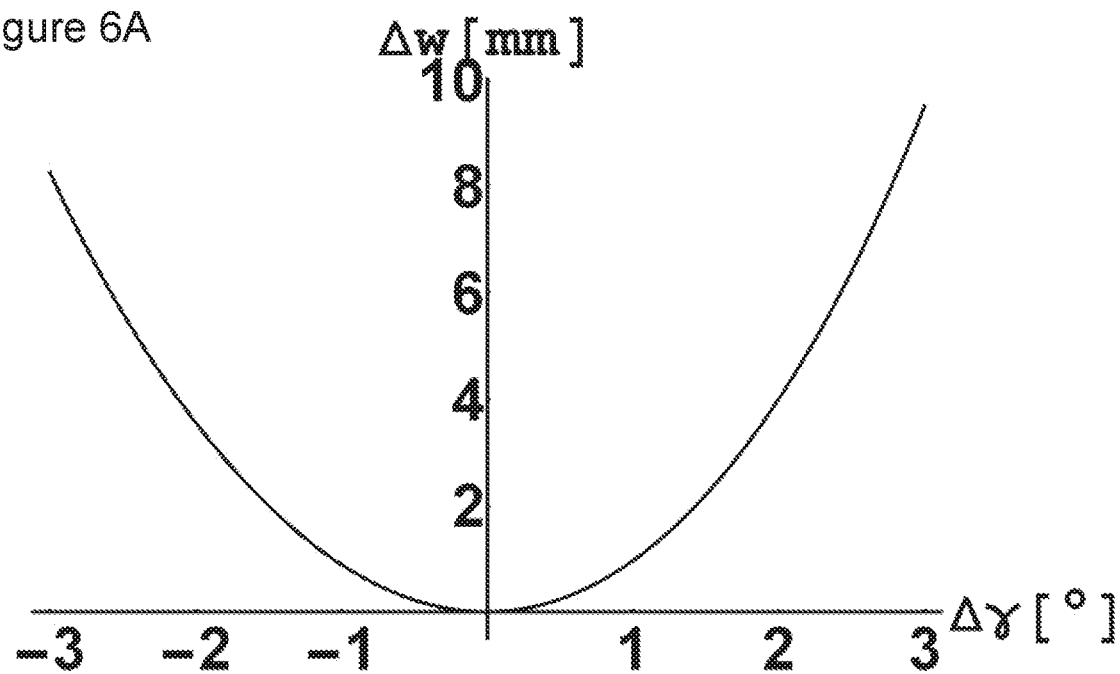
FIGS. 6A and 6B show, in dependence on the axial cross angle $\gamma$, with FIG. 6A showing the displacement of the profile modification $\Delta w$ with a fixed tooth thickness of the workpiece.

As can be seen from relation (R7), d and $\gamma$ influence the association of generating angles on the tool with generating angles on the workpiece. This association is of particular significance when a modified profile is to be generated on the workpiece by a tool having a modified profile. Such profile modifications are, for example, profile angle modifications, profile crownings or tip reliefs and root reliefs. Whereas the association of generating angles on the tool to generating angles on the workpiece do not have any influence on the generated modification with profile angle modifications, the association in the other profile modifications influences their positions. The position of the kink of a tip relief is thus influenced by the association, for example. In accordance with the prior art, only the influence of the center distance d could previously be used to influence the position of the profile modification on the workpiece. However, this automatically produces a change of the tooth thickness with two-flank machining. With knowledge of the relation (R7) and with equation (67), that together form an equation system in the variables d and $\gamma$, it is now possible to set the position of the profile modification and the tooth thickness of the workpiece independently of one another via $\gamma$. Since the coefficients $\hat{C}_{Fw1}$ and $\hat{C}_{Fw2}$ do not depend on d and $\gamma$, a change of d and $\gamma$ only produces a displacement of the profile modification on the workpiece, but not a stretching or compression. FIG. 6A shows the displacement of the profile modification on the workpiece, measured as a displacement in the generating angle, in dependence on $\gamma$, with the tooth thickness being kept constant, that is the center distance d extends in dependence on $\gamma$ as shown in FIG. 5B. There are again generally two axial cross angles here that produce a desired displacement of the profile modification. The possibility of the independent setting of the displacement of the profile modification and of the tooth thickness is of particular importance, for example, in gear hobbing and skive hobbing as well as in generating grinding with non-dressable tools. Tools can thus now be used that would incorrectly position the profile modification for the desired tooth thickness. This can be the case, for example, when the tools were incorrectly configured and/or produced or when they were configured for other workpieces, in particular similar workpieces.

A second application case is the generating grinding in conjunction with a two-flank dressing of the grinding worm. To dress worms that are to produce a profile modification at the workpiece, modified dressing tools are used that generate the required modification on the surface of the worm. During two-flank dressing, the tooth thickness of the worm is set via the center distance between the worm and the dressing tool. This center distance, however, simultaneously also determines the position of the profile modification on the surface of the worm. If the worm is now dressed with the tooth thickness required in accordance with the prior art, a fixed position of the profile modification on the worm results that produces a fixed position of the profile modification on the workpiece during generating grinding in accordance with the prior art. The process described here now permits the position of the profile modification on the workpiece also to be influenced in this application case and thus to set and/or correct it in a targeted manner independently of the desired tooth thickness.

All the previously described aspects on the fixed axial cross angle per machining stroke form special cases of the aspects now following in which the axial cross angle is changed during a machining stroke.

Variable Axial Cross Angle Per Machining Stroke

The second major aspect of the invention provides changing the axial cross angle during a machining stroke in dependence on the axial feed position $z_{V2}$ of the workpiece in accordance with a continuous function $\gamma(z_{V2})$. This permits the tooth thickness and at least one of the parameters root radius on the workpiece, tip radius on the workpiece, position of the profile modification on the left flank, position of the profile modification on the right flank to be predefined in dependence on the workpiece width position. It is decisive for the performance of this aspect of the invention to know how and, above all, where these specifications have an effect on the gearing, in dependence on the axial feed position $z_{V2}$. This will be discussed in the following for the influenceable parameters for the case of a conical tool and of a conical workpiece. The cases in which a cylindrical workpiece and/or a cylindrical tool are used result as special cases by the use of the corresponding relations and the observation of the cylinder jacket surfaces instead of the cone envelope surfaces.

A change of the tooth thickness over the width of the workpiece is called a tooth trace modification. In the manufacturing process looked at here, there is a theoretical point contact between the tool and the workpiece. The contact point moves along the contact track that is given on the workpiece for given axial feed positions of the tool $z_{V1}$ and of the workpiece $z_{V2}$ by equation (48) while neglecting the axial feed. This equation shows that the contact track is given by a straight line in $w_{F2}$ and $z_{F2}$. Since the coefficient $C_{FW2}$ only depends on the basic parameters of the workpiece, the direction of the straight line remains unchanged on a change of the center distance d and/or of the axial cross angle γ. A change of the machining kinematics, in particular the changing of γ and/or d and/or a breakup of the generating coupling by a change of the angles of rotation of the tool and/or of the workpiece and/or of the axial feed positions of the tool $z_{V1}$ and/or of the workpiece $z_{w2}$ results in a modification $f_{KFt}(w_F, z_F)$ on the workpiece that adopts a constant value along the current contact track and can be described as follows mathematically:

$$f_{KFt}(w_F, z_F) = F_{KFt}(w_F \tan \rho_{KF} + z_F) = F_{KFt}(X_F) \quad (69)$$

where $X_F = w_F \tan \rho_{KF} + z_F$.

Figure 13:
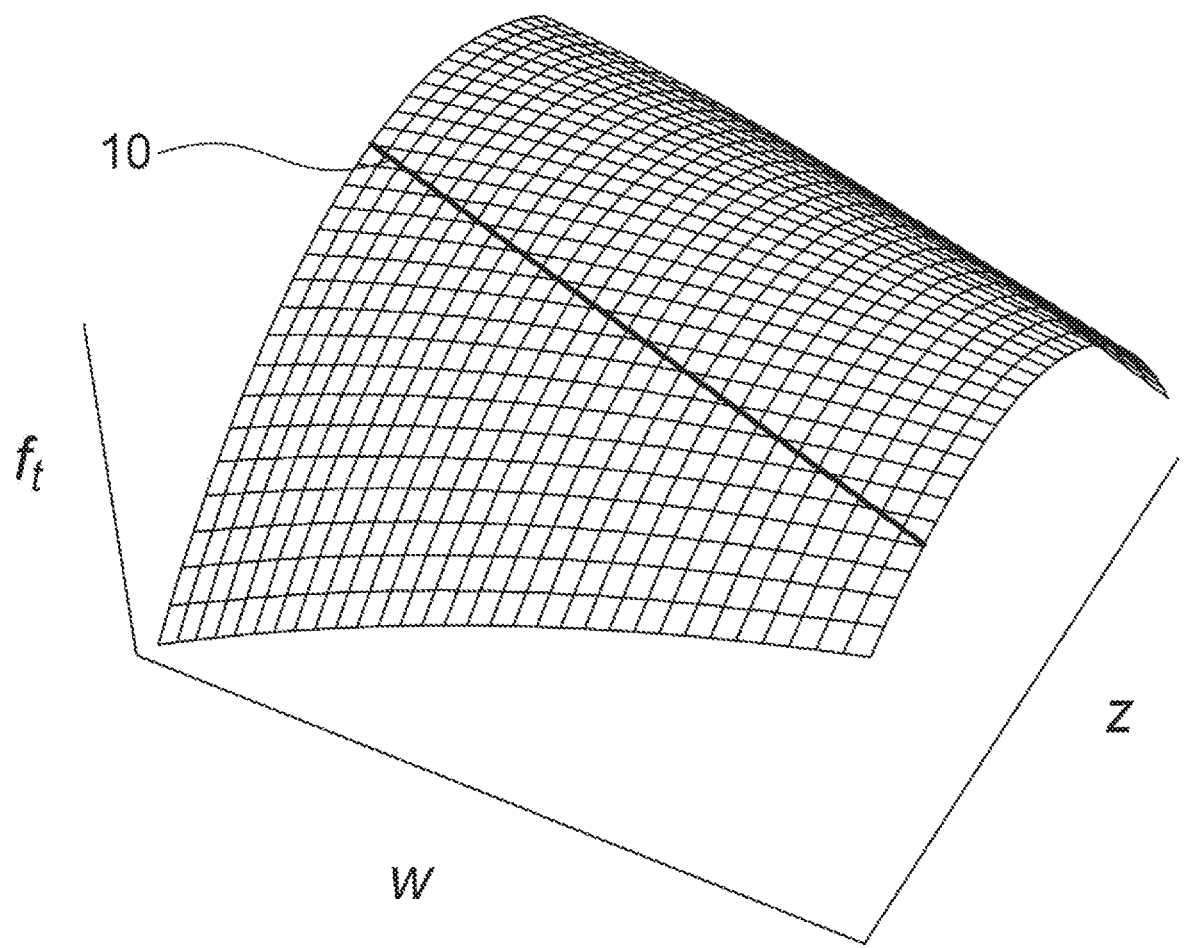
FIG. 13 shows a w-z diagram of a natural twisted tooth trace crowning. The line 20 marks a contact track. It corresponds to a line having a constant value of the modification

The functions $F_{KFt}$ can be any desired continuous functions within certain limits. $\rho_{KF}$ results directly by equation (48) from the direction of the contact track. FIG. 13 shows a modification in accordance with equation (69) for the example of a naturally twisted tooth trace crowning. The straight line 20 corresponds to the progression of the contact track at a point in time of the machining. The modification has a constant value along 20.

It will be shown in the following how the required change of the machining kinematics can be calculated from given functions $F_{Klt}$ and $F_{Krt}$ for left and right flanks while taking account of an additional condition in γ and/or d and/or $z_{V2}$ (for example, tip/root radius, position of the profile modification, tool tip clearance, tool root clearance). The following equation is the starting point for this $$\hat{a}_F - a_F + \hat{b}_1 \cdot \hat{z}_{V1} - b_1 \cdot z_{V1} - z_1 \cdot \Delta\varphi_1 + \hat{b}_2 \cdot \hat{z}_{V2} - b_2 \cdot z_{V2} + s_F \cdot z_2 \Delta\eta_{bF2} - z_2 \cdot \Delta\varphi_2 + \hat{e}_F \cdot \hat{d} - e_F \cdot d = 0 \quad (70)$$

that follows directly from equation (64), with the parameters with a hat (ˆ) relating to the changed kinematics and those without a hat relating to the unchanged machining kinematics. The following applies to the angles of rotation:

$$\Delta\varphi_1 = \hat{\varphi}_1 - \varphi_1 \text{ and } \Delta\varphi_2 = \hat{\varphi}_2 - \varphi_2 \quad (71)$$

The uncorrected machining kinematics here mean the kinematics known from the prior art for the machining of non-modified workpieces. These non-corrected kinematics, however, do not yet include the differential rotation required for helical gearing arrangements or the differential rotation required in diagonal generating machining. These differential rotations are likewise known from the prior art and are required in conventional machining so that the constraint (R4) is satisfied at all times. If the axial cross angle is changed during the machining, the differential rotation is to be determined together with the corrections of the angles of rotation required for the tooth trace modifications, which will be shown in the following.

$\Delta\eta_{bF2}$ is the change of the base gap half-angle $\eta_{bF2}$ of the workpiece caused by the corrected kinematics. This change is, via $$\Delta\eta_{bF2} = -\frac{f_{tF}}{r_{bF2}}, \quad (3)$$

in a direction relation to the generated modification $f_{tF}$ in the transverse section on the workpiece. It must be noted in this respect that this modification is formed on both flanks in each case along the current position of the contact track that is inter alia dependent on $z_{V1}$ and $z_{V2}$. The value of the modification is constant along the current contact track. If the position of the contact track is now in particular displaced via the axial feed of the workpiece over the entire workpiece, the contact track sweeps over the complete flank and produces it completely. The position of the contact track can be described by $X_F$ from equation (69). $X_F$ can be directly calculated by means of equation (48), inter alia in dependence on the coordinates of the kinematic chain, in particular of the axial feed $z_{V2}$. It must be noted here that $X_F$ also depends on $\hat{\gamma}$. The following applies:

$$X_F = X_F(z_{V1}, z_{V2}, \hat{\gamma}, d) \quad (73)$$

from which it follows with equation (72):

$$F_{KFt}(X_F(z_{V1}, z_{V2}, \hat{\gamma}, d)) = -\Delta\eta_{bF2} \cdot r_{bF2} \quad (74)$$

Together with equation (70), a relationship is thus available between the machining kinematics and the functions $F_{Klt}$ and $F_{Krt}$. Since the displacement of the contact track is typically implemented by the axial feed $z_{V2}$ of the workpiece, this coordinate can be considered the main coordinate and the required corrections of the other coordinates as a function of $z_{V2}$. $\hat{z}_{V2} = z_{V2}$ can furthermore be set.

The changes $\Delta\varphi_1$ and $\Delta\varphi_2$ and $\hat{z}_{V1}$ all have the effect that the value of the modification becomes larger on the one flank and becomes smaller on the other flank. Which of the values are changed is not important so that they can be combined to a newly introduced change:

$$\Delta A(z_{V2}) := \hat{b}_1(z_{V2}) \cdot \hat{z}_{V1}(z_{V2}) = b_1 \cdot z_{V1} - z_1 \cdot \Delta\varphi_1(z_{V2}) - z_2 \cdot \Delta\varphi_2(z_{V2}) + (\hat{b}_2(z_{V2}) - b_2) \cdot z_{V2} \quad (75)$$

Equation (70) is then simplified to:

$$\Delta A(z_{V2}) + s_F \cdot z_2 \cdot \Delta\eta_{bF2}(z_{V2}) + \hat{e}_F(z_{V2}) \cdot \hat{d}(z_{V2}) - e_F \cdot d + \hat{a}_F(z_{V2}) - a_F = 0 \quad (76)$$

It then follows from equation (74):

$$F_{KFt}\left(X_F(z_{V1}(z_{V2}), z_{V2}, \hat{\gamma}(z_{V2}), \hat{d}(z_{V2}))\right) = \quad (77)$$
$$s_F \cdot \frac{r_{bF2}}{z_2}\left(\Delta A(z_{V2}) + \hat{e}_F(z_{V2}) \cdot \hat{d}(z_{V2}) - e_F \cdot d + \hat{a}_F(z_{V2}) - a_F\right)$$

Together with the additional condition to be taken into account for $\hat{d}$ and/or $\hat{\gamma}$, the two variants of this equation for the left and right flanks form an equation system for a given $z_{V2}$ in the parameters $\hat{\gamma}(z_{V2})$, $\hat{d}(z_{V2})$, and $\Delta A(z_{V2})$ that can be solved to determine them and thus delivers the sought parameters as a function of $z_{V2}$. $\Delta A(z_{V2})$ subsequently has to be converted for each $z_{V2}$ by means of equation (75) into corrections of the coordinates $\Delta\varphi_1$ and/or $\Delta\varphi_2$ and/or $\hat{z}_{V1}$, with it having to be noted that this conversion is not unambiguous. These corrections are, however, typically realized via $\Delta\varphi_1$ or $\Delta\varphi_2$, that is via a correction of the angle of rotation of the tool or of the workpiece. If these corrections are, for example, realized via a correction of the angle of rotation of the workpiece, $\Delta\varphi_1 = 0$ and $\hat{z}_{V1} = z_{V1}$ can be selected for this case.

The tool and the workpiece run in a generating coupled manner in a continuous generating gear train during the machining using one of the processes looked at here. The correction $\Delta A(z_{V2})$ results in a breaking up of this generating coupling, whereby, as described, the value of the modification is increased on the one flank and is decreased on the other flank.

The additional conditions for $\hat{d}$ and/or $\hat{\gamma}$ looked at here and generally dependent on the axial feed position $z_{V2}$ of the tool will be discussed in the following.

Figure 22:
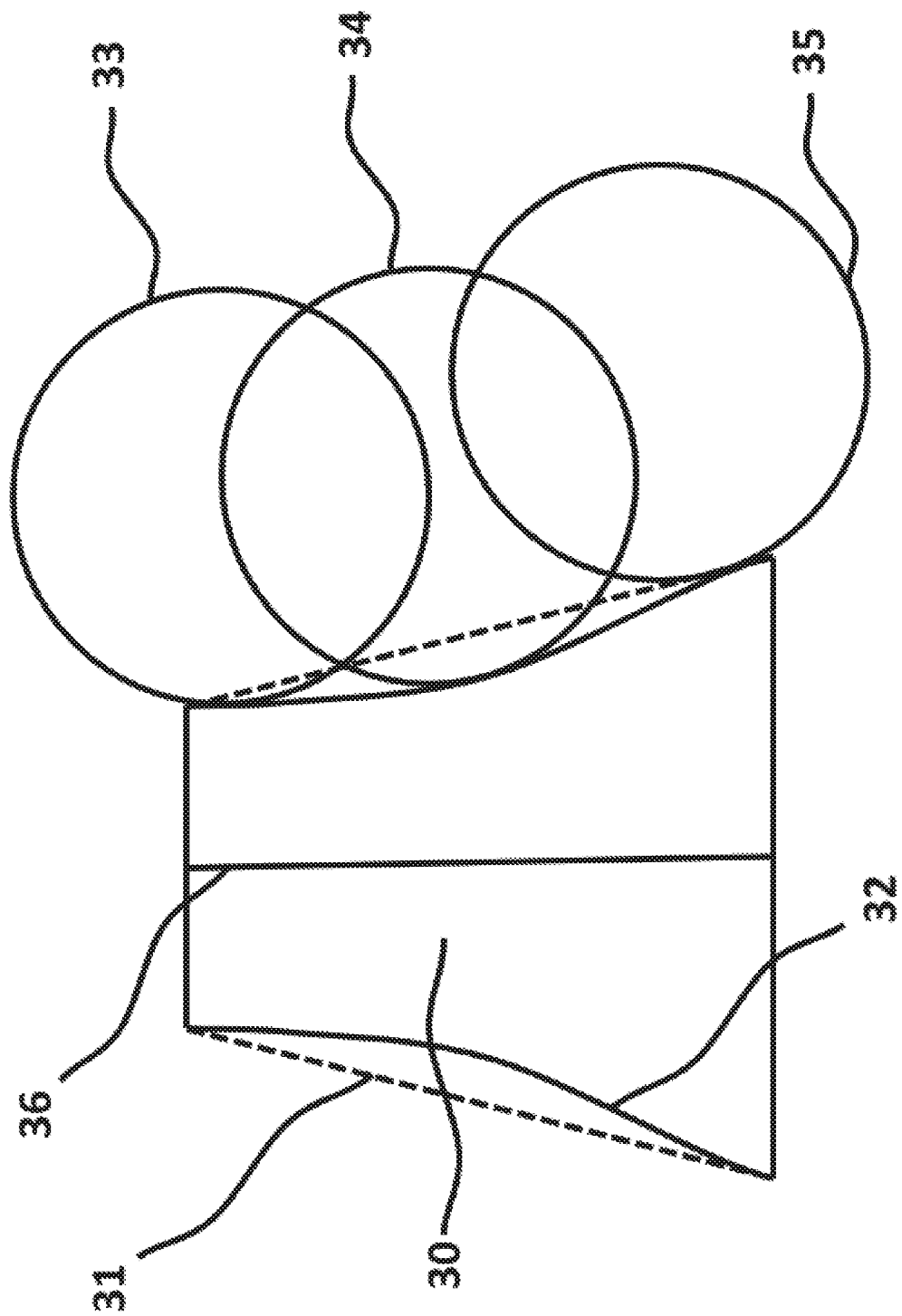
FIG. 22 schematically shows a conical workpiece 30 having a free extent of the root radius; and it shows the positions of the tool for three different axial feed positions 33, 34, 35.

FIG. 22 schematically shows a conical workpiece 30. The straight line 31 marks the progression of the root radius (extent of the tooth base) for a conical workpiece in accordance with the prior art. The straight line is tilted by the root conical angle with respect to the axis of rotation. Such a progression of the root radius results with non-modified machining kinematics. The root radius for each width position of the conical workpiece can now be freely predefined using the process described here. 32 shows such a free progression of the root radius over the width of the workpiece. If this progression rotates about the axis of rotation 36 of the workpiece, the rotational body that is produced describes the progression of the root diameter in three dimensions. To generate such a free progression of the root radius using a generally conical tool, the center distance $\hat{d}$ has to be set in dependence on the axial feed position $z_{V2}$ while taking account of the axial cross angle $\hat{\gamma}$ such that the envelope of the cone that envelopes the tip diameter of the tool contacts the rotational body tangentially at all times. The sought additional condition for $\hat{d}$ and/or $\hat{\gamma}$ results directly from this. FIG. 22 shows schematically and in section the enveloping envelopes of the cone 33, 34 and 35 of the tool tangentially contacting the rotational body for three different axial feed positions $z_{V2}$ in simplified form as circles. The progression of the root radius can be freely selected within wide limits. Deviations from the straight progression are thus possible in the range of a few μm, but also in the range of 0.5 to the one times the modulus of the workpiece. It is a substantial restriction regarding the shape of the progression that the radius of curvature of the progression has to be larger the radius of curvature of the tool with inwardly arched progressions such as shown in FIG. 22. The outside diameter of the tool must be selected as sufficiently small in this case. There is no such restriction with outwardly arched or straight progressions and the tool diameters can be selected as desired. Progressions can also be arched inwardly at points and outwardly at points and can thus have a wave-like design, for example. The possibility of producing such free progressions allows the root strength to be further optimized and/or to provide a better oil flow in the installed state. The free progressions can in particular also be selected as straight lines. The straight line is tilted by an angle differing from the conical angle with respect to the axis of rotation. Conical gearing arrangements can thus, for example, be produced with root radii extending in parallel with the axis of rotation so that the progression of the root radii corresponds to that of a cylindrical wheel. It is, however, equally also possible to produce cylindrical gearing arrangements with a progression of the root radii tilted with respect to the axis of rotation.

If the tip is rather also to be machined instead of the root, a free progression of the tip radius can also be produced here. The calculation takes place in an analog manner; only the root cone of the tool has to tangentially contact the free progression of the tip diameter for each axial feed position $z_{V2}$. The rotational body resulting from the rotation of the progression of the tip diameter about the axis of rotation 36 of the workpiece is called the envelope body of the workpiece.

Figure 14:
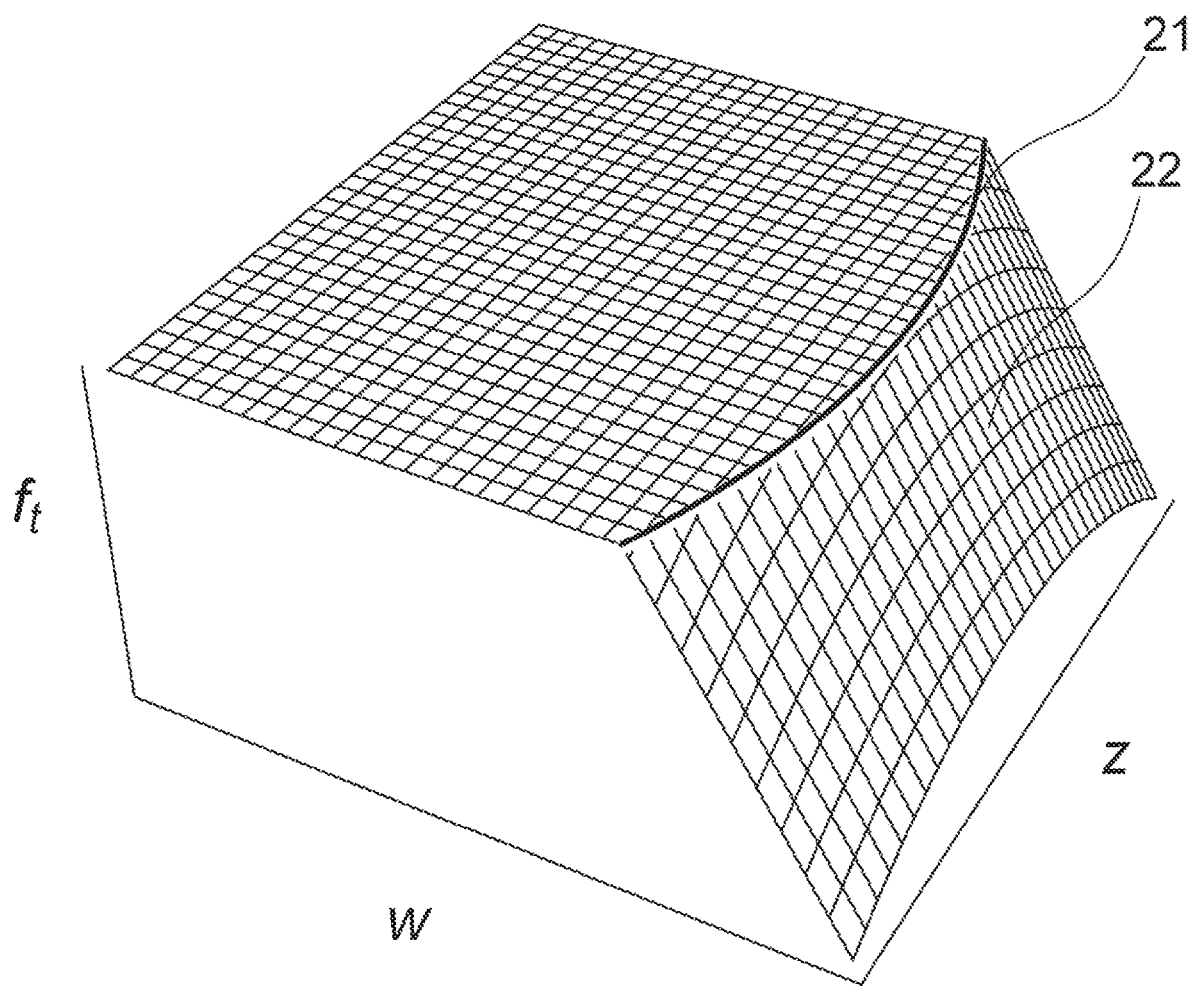
FIG. 14 shows a w-z diagram of a modification having a position of the tip relief displaced over the gear tooth width.
Figure 15:
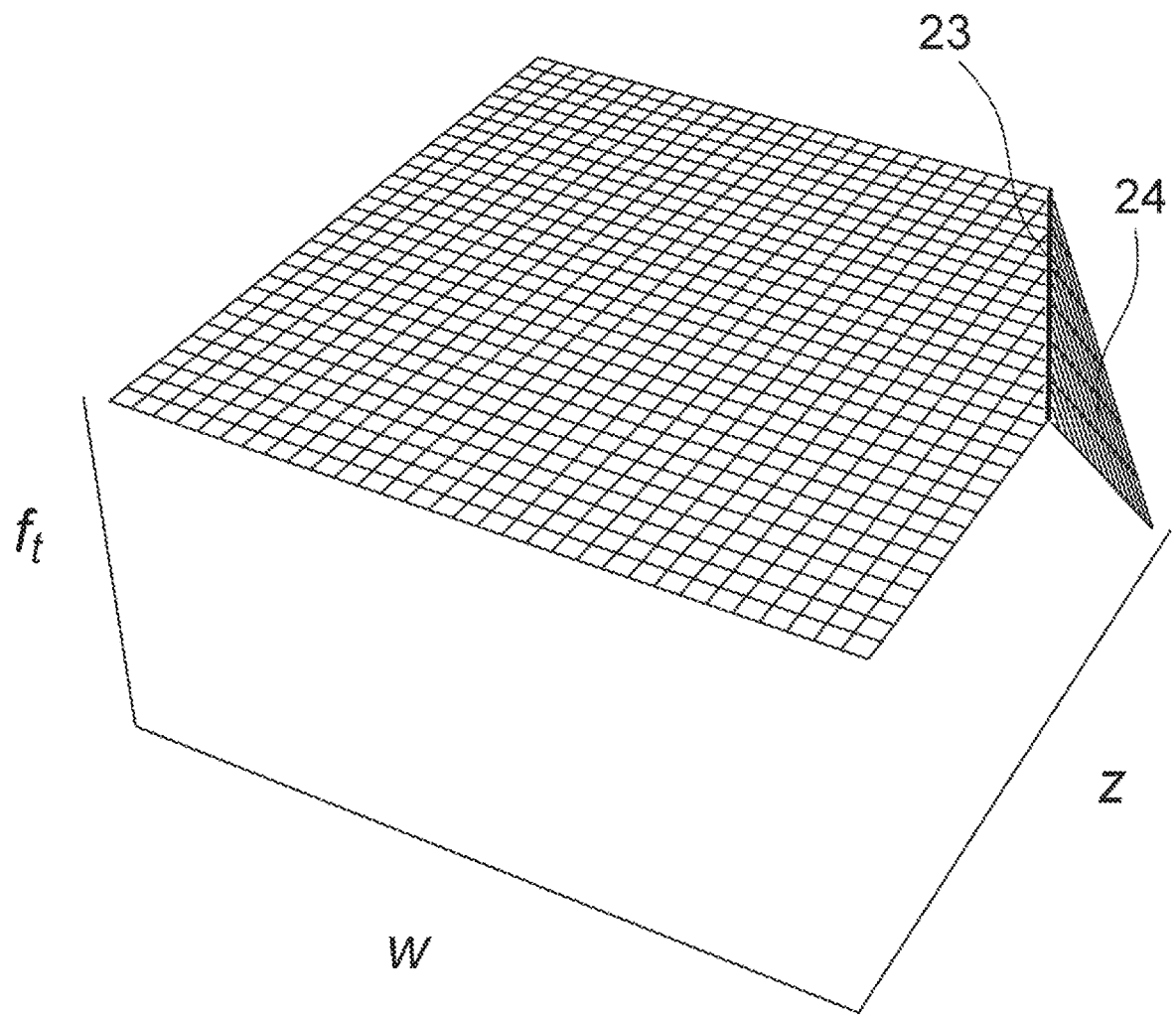
FIG. 15 shows a w-z diagram of a linear, triangular end relief without a tangential transition.

An alternative additional condition can be formulated when the position of the profile modification on the left or right flanks is to be varied over the width of the gearing. It is possible to proceed here in an analog manner to the case of the axial cross angle constant during a machining stroke. Relation (R7) directly delivers the sought condition. If, for example, a point on the profile of the tool on the generating path $w_{F1}$ is to be associated with a generating path $w_{F2}(z_{F2})$ dependent on $z_{F2}$ on the workpiece, $w_{F2}$ can be replaced by $w_{F2}(z_{F2})$ in equation (57). Together with equation (48), this equation forms the new additional condition with the newly added unknown $z_{F2}$ that has also has to be determined by solving the total equation system. FIG. 14 shows by way of example the modification of a gearing with a tip relief 22 in which the position of the tip relief varies over the gearing width. In this example, the tip relief is longer at the top and bottom and thus has a larger amount; at the center, however, it is shorter and thereby has a smaller amount. The line 21 marks the variable start of the tip relief. The displacement of the profile modification can adopt free shapes within certain limits. A displacement can thus also be selected, for example, in which the length of the tip relief increases or decreases continuously from one end of the gearing to the other end of the gearing. A triangular end relief 24 can thus be generated, for example, such as is shown in FIG. 15. Since the shape of the profile modification (e.g. crowning, tip relief/root relief) is determined solely by the tool, this process can be used for displacing any number of profile modifications. It must be noted that the displacement of the profile modification always has an effect along the current contact track.

Since only one degree of freedom is available for the displacement of the profile modification, it can only be exactly predefined for the left or the right flanks. A displacement automatically results for the respective other flank. This displacement can be determined using the equations (57) and (48).

Where the displacement on the profile modification has an effect on the other flank is influenced by the position of the contact track on the flank and can be calculated using equation (48). The different position of the contact track on the left and right flanks for given axial feed positions $z_{V1}$ and $z_{V2}$ can inter alia be influenced by the profile angle of the tool used, but also by the set axial cross angle.

In the processes looked at here, it is possible to utilize different tools having different profile angles for producing a given workpiece as long as they satisfy the generating condition (63). The selection of the profile angle of this tool influences the mutual positions of the contact tracks on the left and right flanks. FIG. 16 shows how the contact tracks extend on the left and right flanks for fixed axial feed positions for three different profile angles α of the tool used. In the example shown, a larger profile angle of the tool effects a displacement of the contact track upwardly in the width direction on the right flank and downwardly in the width direction on the left flank.

The axial cross angle γ set for the machining likewise mutually influences the position of the contact lines on the left and right flanks. FIG. 17 shows how the contact tracks extend on the left and right flanks for fixed axial feed positions for three different axial cross angles γ. In the example shown, a larger axial cross angle effects a displacement of the contact track upwardly in the width direction on the right flank and downwardly in the width direction on the left flank. This effect generally always has to be observed, but is automatically taken into account by equation (48). The axial cross angle to be set for a given center distance in the machining of a predefined workpiece is given by the tooth thickness of the tool and can be calculated with equation (67), with there generally being two solutions for γ. Conversely, the tooth thickness of the tool can also be calculated with respect to a given axial cross angle.

There are thus two parameters available that can be used individually or together to influence the relative position of the contact tracks on the left and right flanks via the geometry of the tool. This relative position of the contact tracks influences how a displacement of the profile modification on a flank affects the other flank using the process described here. If, for example, a displacement of the profile modification is to be realized on both flanks and if the progressions in the width direction are similar but displaced with respect to one another in the width direction, the displacement of the contact lines can be set such that displacement of the profile modification on the one flank automatically results, at least approximately, in the correct displacement of the profile modification on the other flank. The position of the contact tracks with respect to one another and the achievable progression of the displacement of the profile modification on a flank are preferably optimized, for example by means of curve fitting, such that a progression of the displacement of the profile modification that is as optimum as possible results on both flanks. The distance of the desired displacement of the profile modification from the achieved displacement over the gearing width can, for example, be used as a measure of the quality of the achieved solution on both flanks. If the desired displacement of the profile modification should have different tolerances over the gearing width and/or on the left and on the right, a distance function can additionally be selected that gives different weight to the different width positions and/or flanks.

An even better result can be achieved if the geometry of the tool, in particular the profile angle and the tooth thickness and the functions $\Delta A\ (z_{V2})$, $\hat{d}(z_{V2})$, and $\hat{\gamma}(z_{V2})$ directly enter into the curve fitting. While taking account of the tooth trace modification to be achieved, the latter can be determined such that the difference of the displacements of the profile modifications on the left and right flanks are optimum, optionally while taking account of a distance function.

The possibility of influencing the position of the contact tracks, in particular of increasing the spacing between the contact tracks on the left and right flanks in the width direction, can also be used to machine only at one flank directly at the upper and lower ends of the gear teeth. Such a situation is shown in the last example in FIG. 17. If the top of the right flank moves out of contact with the tool, the tool must be traveled a little until the left flank also moves out of engagement. This admittedly increases the run-in length and the run-out length and thus also the machining time, but makes it possible in the specific example to freely select the displacement of the profile modification in the upper region of the left flank and in the lower region of the right flank without influencing the displacement of the profile modification on the respective other flank. A specific application example for this embodiment of the process is the triangular end relief of FIG. 15. If such a triangular end relief should be produced on both flanks, the profile modification would have to be displaced upwardly on the first flank and downwardly on the second flank. If both flanks were always in engagement, the profile modification of the first flank would automatically be displaced downwardly and that of the second flank upwardly. To avoid this, the contact tracks can now be displaced apart from one another so far in the width direction that the second flank is already no longer in engagement from the width position onward from which the profile modification on the first flank has to be upwardly displaced, and vice versa.

If a machining of the root is not desired, the maximum possible amount by which the profile modification can be displaced with respect to the root is only limited by the amount of tip clearance of the tool available during the machining. A displacement of the profile modification toward the root is realized by a reduction of the center clearance and thus results in a reduction of the tip clearance of the tool.

If a profile modification is displaced toward the tip, the center distance is increased. This has the result that the smallest diameter still produced at the workpiece is increased. If the utilizable root circle to be produced is exceeded, the maximum possible displacement in the direction of the tip is reached.

If the root is also machined, a displacement of the position of the profile modification necessarily has the result of a changed progression of the root radius. If this change of the root radius is still within a given tolerance or even desired, the process can also be used in this case.

If a displacement of the profile modification is not possible to the desired degree due to the just described restrictions, a tool can be used having a tip radius correspondingly adapted over the tool width and the process can be carried out as a diagonal generating method. Due to the displacement of the tool in the axial direction, in dependence on the axial feed position $z_{V2}$ of the workpiece, different regions of the tool and thus also different regions of the enveloping body of the tool come into engagement over the width of the workpiece and thus also regions of the tool having different tip radii. The tip diameters of the tool and the axial feed of the tool $z_{V1}(z_{V2})$ have to be matched such that a tip radius of the tool is active at any workpiece position that prevents both an unwanted machining of the root or machines the root with the desired root radius and ensures a machining of the utilizable root circle of the workpiece. It must be noted that this matching of the tool only has to be carried out at the tip diameter. The shape of the flanks thereby remains unchanged.

If a workpiece having a desired progression of the utilizable root circle is given and if $\hat{\gamma}(z_{V2})$, $\hat{d}(z_{V2})$, and $\Delta A\ (z_{V2})$ and, from $\Delta A\ (z_{V2})$, the coordinates $\Delta \varphi_1$, $\Delta \varphi_2$, and $\hat{z}_{V1}$ have already been determined to achieve the desired displacement of the profile modification, the progression of the tip radius of the workpiece can be determined with respect to a given axial feed of the tool $z_{V1}(z_{V2})$. For this purpose, the rotational body is first looked at that results from the progression of the root radius of the workpiece. The tip diameter is then determined at each width position of the workpiece that comes into engagement, while taking account of the fully known kinematics, such that the rotational body resulting from the progression of the tip radius tangentially contacts the rotational body of the progression of the root radius of the workpiece at all times. This calculation shows that there is not a solution for every axial feed of the tool $z_{V1}(z_{V2})$. An increase of the diagonal ratio that results in a longer shift distance and thus in a longer used region on the tool provides a remedy here. The diagonal ratio is increased in amount for so long for this purpose until a solution can be found. In a preferred variant, a non-constant diagonal ratio can be assumed and this can be determined for each axial food position of the workpiece $z_{V2}$ such that just one solution can be found. This calculation process delivers the shortest possible shift distance and thus also the shortest possible used region on the tool. A further preferred calculation process not only takes account of the desired progression of the root radius on the workpiece, but additionally the permitted tolerance of the progression of the root radius and thus produces further shortened shift distances.

Figure 18A:
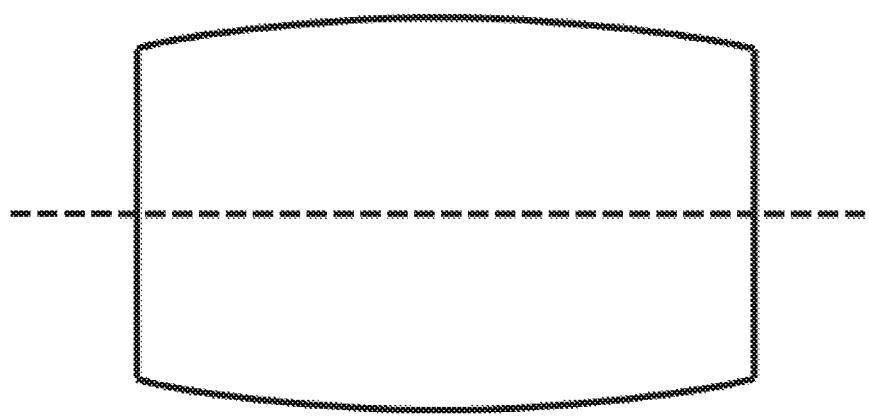
FIGS. 18A and 18B schematically show two cylindrical tools having tip radii changed over the tool width.

FIG. 18A shows by way of example the enveloping body of a cylindrical tool having a tip radius varying in an arcuate manner over the tool width. Such a tool can be used to generate a displacement of the profile displacement that is arcuate over the workpiece width having a constant diagonal ratio using the process described here such as is shown, for example, in FIG. 14. If the upper and/or lower ends of the workpiece are produced, the center distance has to be reduced to displace the profile modification in the direction of the root. At these points in time, the regions of the tool then have to come into contact with the reduced tip radii in order not to damage the root radius of the workpiece. If the center of the gearing is produced, the center distance has to be increased to displace the profile modification in the direction of the tip. In order still to reach the utilizable root circles of the tool, the region of the tool having a large tip radius has to come into contact.

Figure 18B:
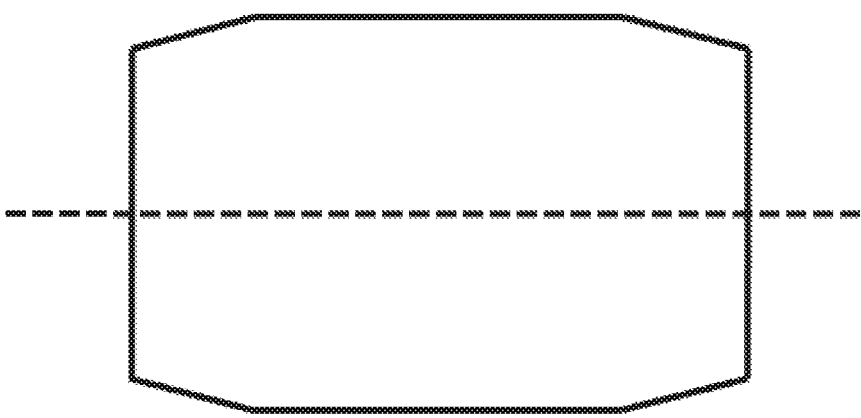

FIG. 18B shows the enveloping body of a cylindrical tool having a tip radius that is reduced linearly in size at both ends over the width and that can, for example, be used to produce a modification having a constant diagonal ratio such as shown in FIG. 15.

A modification as shown in FIG. 15 can, however, also be produced using a tool as in FIG. 18A. For this purpose, however, the axial feed $z_{V1}(z_{V2})$ of the tool has to be selected in dependence on $z_{V2}$ such that a region of the tool comes into contact at all times whose tip radius just corresponds to the required tip diameter. The diagonal ratio would thus first become continuously smaller, will be zero while the non-modified region is produced and would subsequently continuously increase again.

A further variant is a tool whose tip diameter increases monotonously, for example linearly, from one end to the other end. A reversal of direction of the diagonal ratio would be necessary for the two modifications of FIG. 14 and FIG. 15 looked at by way of example using such a tool.

FIGS. 18A and 18B shows only cylindrical tools by way of example. If conical tools are used, the matching of the tip radii with respect to the envelope surface of the cone is instead to be carried out with respect to the cylinder jacket surface.

If different parts which can be produced with the same reference profile, but which require different progressions of the tip radii are to be produced with one tool, different regions on a tool can be provided with the respective required regions.

Periodically recurring progressions of the tip radii can also be provided on the tool. Such a tool 40 is shown by way of example in FIG. 20. It has three periodically recurring regions 41, 42, 43. Each of these regions has a progression of the tip radius similar to the tool shown in FIG. 18A. A division into such regions is sensible, for example, when the rough machining and the fine machining are to be carried out on different regions.

The width of the different regions on the tool can be freely selected within wide limits and is preferably selected such that the tool is used optimally and/or such that the wear is as minimal as possible. It is thus of advantage, for example during generating grinding, to apply as many identical regions to the worm as possible and first to use each of these regions for fine machining and to continue to use it for rough machining when it is worn.

If the tool is a grinding worm, the different regions can, for example, be used for rough/fine machining or also for polishing machining and respective different abrasives or specifications of the abrasives can be used on these regions for this purpose.

A further application case provides that regions are first used for fine machining when they are not yet worn and are thus able to generate a good profile and that they are used for rough machining when they are then worn. A division into up to 20 or more regions is in particular conceivable in this case.

If the process is used in generating grinding with dressable worms, different possibilities of dressing the worm tips are available. If the root is also to be machined with the worm, it is generally desired to round the worm tips in a specific manner in order thus to generate the desired root geometry. A dressing of the worm tip using a tip dressing roller is necessary for this purpose. Such a tip dressing roller 50 can be seen as part of a combination dressing tool in FIGS. 8A and 8B and is known from the prior art. Every worm thread is dressed singly using such a tip dressing roller. For this purpose, the worm is led past the tip dressing roller in the axial direction and is rotated about its axis of rotation coupled in accordance with its lead. With conical worms, the center distance between the worm and the tip dressing roller is additionally matched in accordance with the taper of the worm. If now a worm having a predefined progression of the tip radius is to be dressed, the center distance between the tip dressing roller and the worm has to be adapted, in dependence on the axial position of the worm, during the dressing such that the desired progression of the tip radius is formed over the width of the worm. In this manner, worms having only one region (FIGS. 18A and 18B), worms having a plurality of different regions, or also worms having periodically recurring regions (FIG. 20) can be dressed. Since the progression of the tip radius is implemented solely via the dressing kinematics, such a tip dressing roller can be used very universally and for any desired progressions of the tip radius.

Figure 9A:
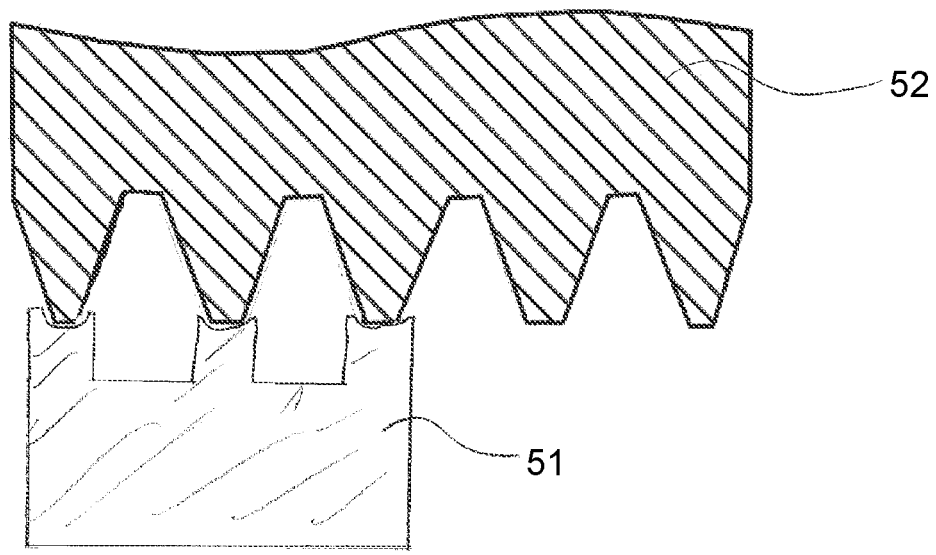
FIGS. 9A and 9B show two examples of multi-ribbed tip dressing rollers 51 and 53 in engagement with a worm 52.
Figure 9B:
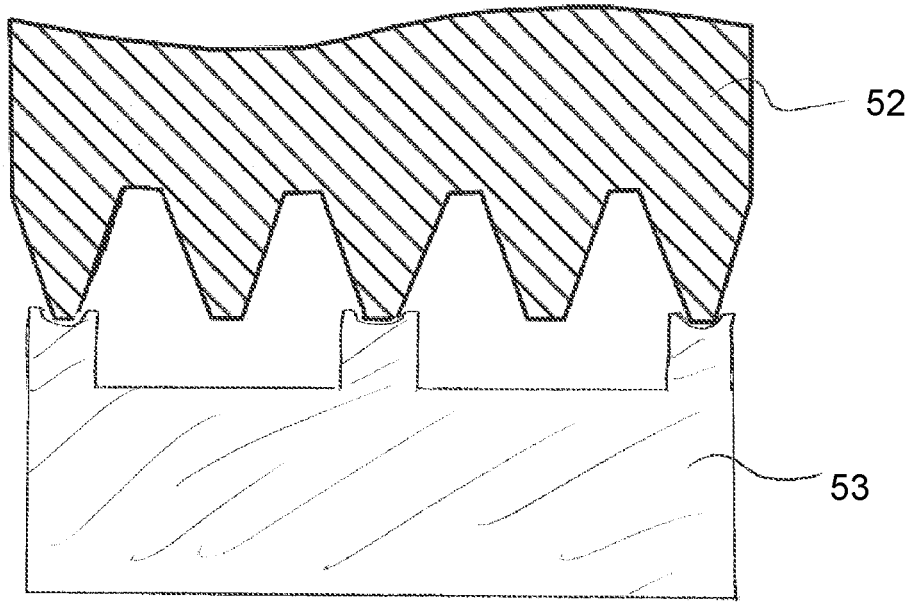

To considerably reduce the dressing time of the worm tips in multi-thread worms, a multi-ribbed tip dressing roller 51 can be used with periodically recurring regions (FIG. 9A). The tips a plurality of threads, preferably all the threads of a worm are dressed in one dressing stroke using such a multi-ribbed tip dressing roller. The kinematics during dressing are identical to those of a conventional tip dressing roller 50 when such a multi-ribbed tip dressing roller is used. Only a longer run-in length and/or a longer run-out length has to be selected so that all the worm threads are dressed such that the shift distance required overall increases during dressing. If a worm having a predefined progression of the tip radius is to be dressed using such a multi-ribbed tip dressing roller, the changes of the center distance between the worm and the tip dressing roller equally affect all the worm threads that are simultaneously in contact, but at different width positions. If the period of the recurring regions in the width direction of the worm has been selected exactly such that it corresponds to the interval of two adjacent contact points between the tip dressing roller and the worm in the worm width direction, the periodic progression of the tip radius is mapped the same on all threads over the width of the worm and the desired periodic progression of the tip radius on the enveloping body is reached. If the period of the recurring regions exactly corresponds to a whole-number multiple V of the interval of two adjacent contact points between the tip dressing roller and the worm in the worm width direction, a multi-ribbed tip dressing roller can thus be used whose interval of the individual ribs is exactly selected such that only every Vth worm thread is in contact, viewed in a transverse section. Such a multi-ribbed tip dressing roller for V=2 can be seen in engagement with a worm by way of example in FIG. 9B. If the worm, for example, has 3 threads in this example, all the threads are also simultaneously dressed in one stroke here. If the worm in contrast has 6 threads, for example, only three worm threads are dressed, that is only every second worm thread is dressed. To dress all the worm threads, the dressing strokes, both for dressing the flanks and for dressing the worm tips, are to be repeated, with the dressing tool being brought into engagement with the worm offset by one worm thread. The number of threads of the worm, however, does not have to be a whole number multiple of the number of ribs on the dressing tool. If this is not the case, at least one worm thread is dressed during two dressing strokes.

Since the flanks of the worm are not further modified, except for the required profile modifications, and are in particular not modified over the width, they can be dressed using all the dressing methods known from the prior art. This in particular also includes profile roller sets, dual conical wheels, multi-ribbed dressing tools, and dressing gear wheels. The required profile modifications are to be implemented on the worm by the dressing tool used.

The most economic process is the use of multi-ribbed dressing tools. They simultaneously dress at least two left flanks and/or at least two right flanks, but preferably the left and right flanks of all the worm threads. Such dressing tools can be designed as full-profile rollers and can thus be used for the simultaneous dressing of the flanks of the worm and of the worm tips. In this case, however, it is no longer possible to predefine a free progression of the tip radius on the worm since a change of the center distance between the worm and the dressing tool would also influence the shape of the flanks of the worm.

Figure 10A:
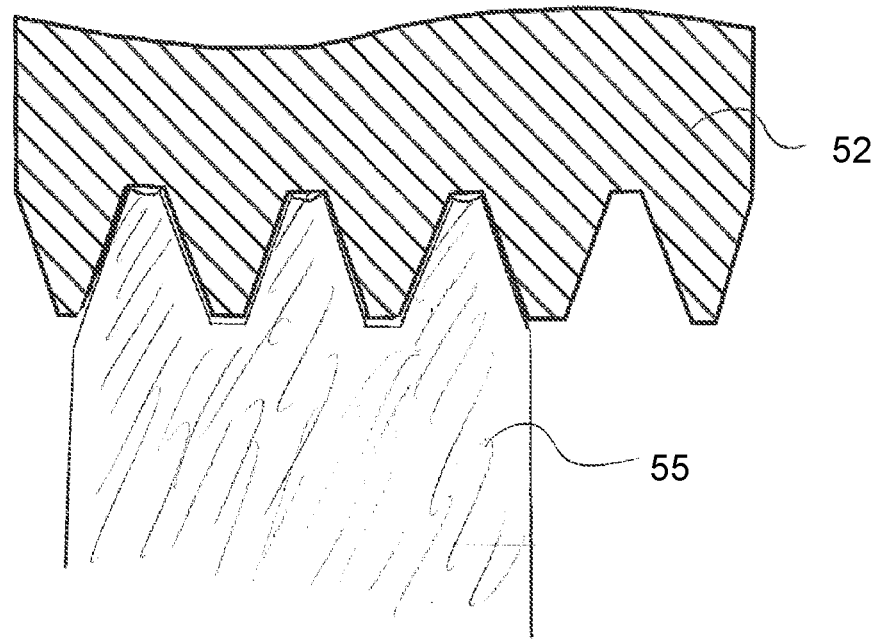
FIGS. 10A and 10B show a multi-ribbed dressing tool 55 in engagement with a worm 52.
Figure 10B:
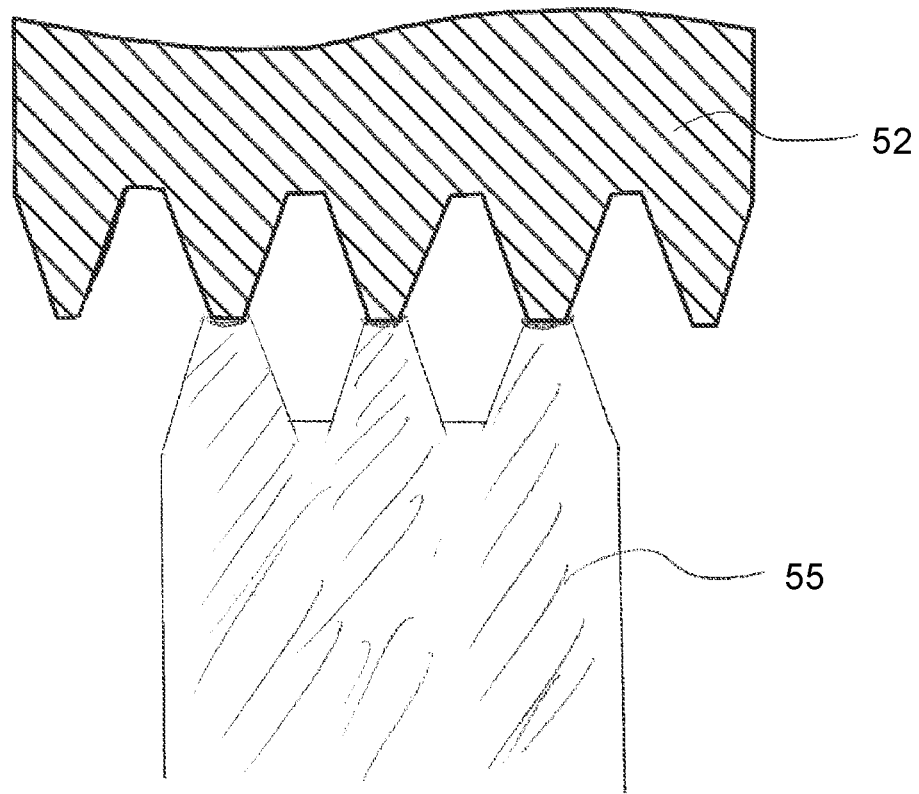

This invention therefore provides a dressing tool 55 having a tip dressing function that is configured such that it can be used to dress the tips of the worm threads with the outside diameter. The dressing tool can both the designed with multiple ribs, such as shown by way of example in FIGS. 10A and 10B for a three-ribbed dressing tool; it can, however, also be designed with a single rib. To dress the flanks of the worm, the dressing tool having a tip dressing function is brought into engagement, as shown in FIG. 10A, with the worm and the flanks are dressed in one or more strokes as is known from the prior art. The ribs of the dressing tool at their outer diameter are brought into contact with the tips of the worm threads in one or more preceding or following strokes. The dressing kinematics correspond to those during the dressing of the flanks. The worm is traveled axially and is rotated about its axis of rotation in accordance with its lead; in the case of conical worms, the center distance between the dressing tool and the worm is additionally changed in accordance with the conical angle. The dressing tool can have corresponding profiles at the outside diameter in dependence on the desired shape of the tips of the worm threads.

Figure 12A:
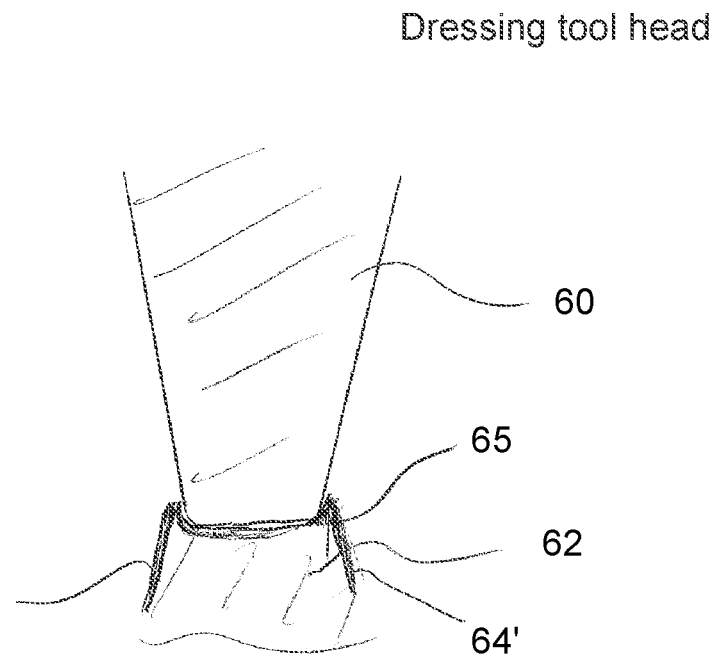
FIGS. 12A and 12B show two embodiment variants of profiles at the outside diameter of a dressing tool in accordance with FIGS. 10A and 10B.

FIG. 12A shows a worm thread 60 having a worm tip rounded toward the flanks in engagement with a dressing tool 62 with a tip dressing function having a profile 65 rounded at the outside diameter and provided with an abrasive material. Such a dressing tool having a tip dressing function is in particular suitable when the root of the workpiece is to be ground. The rounding at the dressing tool can be selected such that the desired shape, in particular the rounding, is formed at the root of the workpiece. A variant of this would be fully rounded worm tips. 64 and 64' are the profiles covered with an abrasive substance for dressing the left and right flanks of the worm respectively.

Figure 12B:
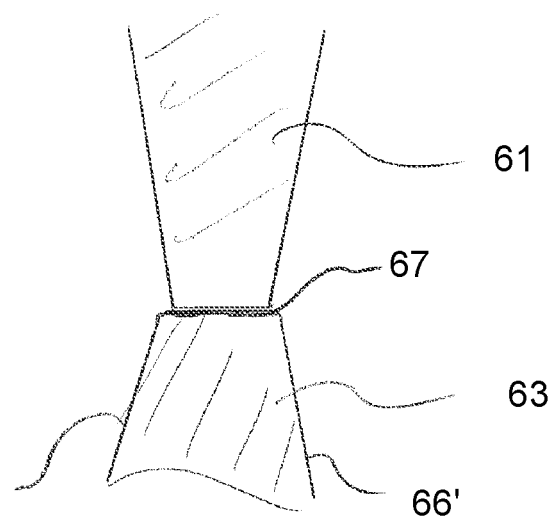

FIG. 12B shows a worm thread 61 having a non-rounded tip in engagement with a dressing tool 63 having a tip dressing function having a profile 67 flat at the outside diameter and provided with an abrasive material. Such a dressing tool is in particular suitable when the root of the workpiece is not to be ground. To completely dress the tip of the worm thread in this variant, a dressing tool narrower at the outside diameter in comparison with the variant of FIG. 12A is sufficient here. 66 and 66' are the profiles covered with an abrasive substance for dressing the left and right flanks of the worm respectively.

If a dressing tool having a tip dressing function is designed as single-ribbed, free progressions of the tip radius can be realized with it.

If a dressing tool having a tip dressing function is designed as multi-ribbed, it can be used, like the multi-ribbed tip dressing rollers 51 and 53, to achieve a freely predefined periodically recurring progression of the tip radii over the worm width. The advantage with respect to the multi-ribbed tip dressing rollers is, however, that the dressing tool having the tip dressing function can be used both for dressing the flanks and for dressing the tips of the worm threads. Only one tool and also only one dressing tool spindle are thus necessary in the gear manufacturing machine. If the period of the recurring regions in the width direction of the worm just corresponds to the distance of two adjacent contact points between the multi-ribbed dressing tool having the tip dressing function and the worm in the worm width direction, a dressing tool 55 having a tip dressing function can be used that simultaneously dresses adjacent gaps. If the period of the recurring regions in the width direction of the worm just corresponds to a whole number multiple V of the distance of two adjacent contact points between the multi-ribbed dressing tool having a tip dressing function and the worm in the worm with direction, analogously to the tip dressing roller 53, a multi-ribbed dressing tool having a tip dressing function can be used whose interval of the individual ribs is selected just such that only every Vth worm thread is in contact.

The invention furthermore provides a multi-ribbed dressing tool having a tip dressing function in which not all the ribs at the outside diameter are equipped with a profile that is suitable for dressing a worm tip. Such reduced ribs then have an outside diameter that is smaller than that of the ribs provided with a profile at the outside diameter such that these ribs have no contact with the worm when dressing the worm tips. Only every Vth rib is preferably provided with a profile at the outside diameter. Such a dressing tool then permits the flanks of the worm to be dressed in fewer strokes than would be necessary with a dressing tool that only has every Vth rib. If, for example, a 6-thread worm is to be dressed and if the periodically recurring progression of the tip radius on the worm requires that only every second worm tip can be simultaneously dressed using a multi-ribbed dressing tool with a tip dressing function, a 6-ribbed dressing tool having a tip dressing function can be used at which only every second rib has a profile for dressing the worm tips at the outside diameter. Using such a dressing tool, the flanks of all worm threads can be dressed in one dressing stroke; all the worm tips can be dressed in two dressing strokes. The outside diameter of the reduced ribs has to be so large that the worm is profiled deeply enough by these ribs during the dressing of the flanks of the worm so that the worm does not sweep over the tip of the workpiece in an unwanted manner. The outside diameter, however, simultaneously has to be selected as so small that there is no unwanted contact of a reduced rib with a worm tip during the dressing of the worm tips due to the changing center distance between the worm and the dressing tool.

It must be ensured in the design of a grinding process in which dressing should take place using a dressing tool having a tip dressing function that the dressing tool is wide enough at the outside diameter to be able to dress the worm tips. The width of the dressing tool at the outside diameter is determined by the tooth thickness of the worm threads. The required tooth thickness of the worm can be influenced by the selection of the axial cross angle $\gamma$ during grinding machining and it can be calculated using equation (67). As can be read indirectly from FIGS. 5A and 5B, a change of the axial cross angle γ with respect to the axial cross angle known from the prior art results in a reduction in the tooth thickness of the worm and thus automatically results in an increase in the gap width. A change of the axial cross angle thus results in a smaller tooth thickness at the tip of the worm thread, whereby the minimum width of the dressing tool is reduced at the outside diameter and whereby it can be designed as smaller. At the same time, the width of the dressing tool increases due to the enlarged gap width. A further parameter that can be used in the design is the profile angle of the worm. If the latter is reduced in size, a large gap width results in the base of the worm, with the same tooth thickness at the tip of the worm threads, whereby the dressing tool is to be designed as wider at the outside diameter.

Figure 11A:
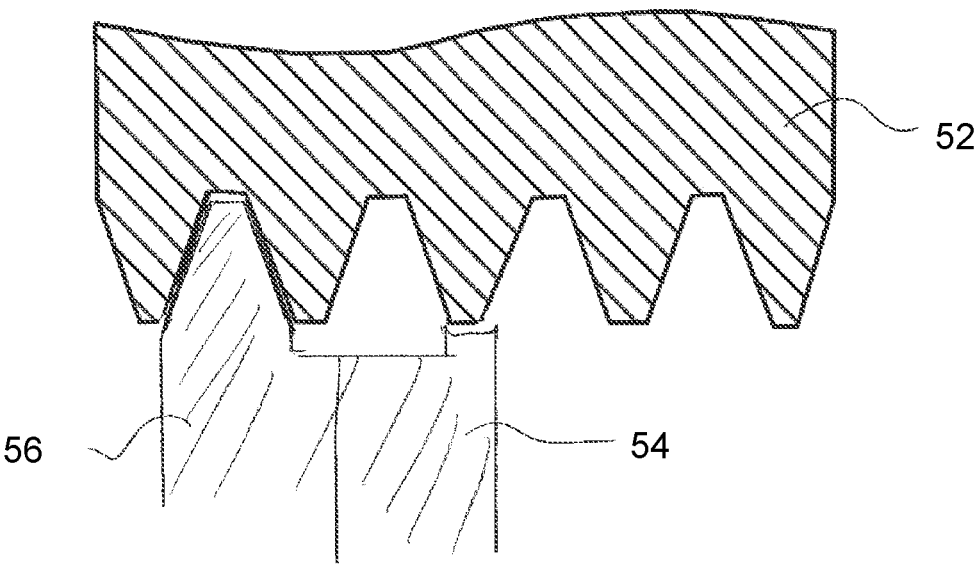
FIGS. 11A and 11B show a combination dressing tool composed of a tip dressing roller 54 and a dual conical wheel 56 in engagement with a worm 52.
Figure 11B:
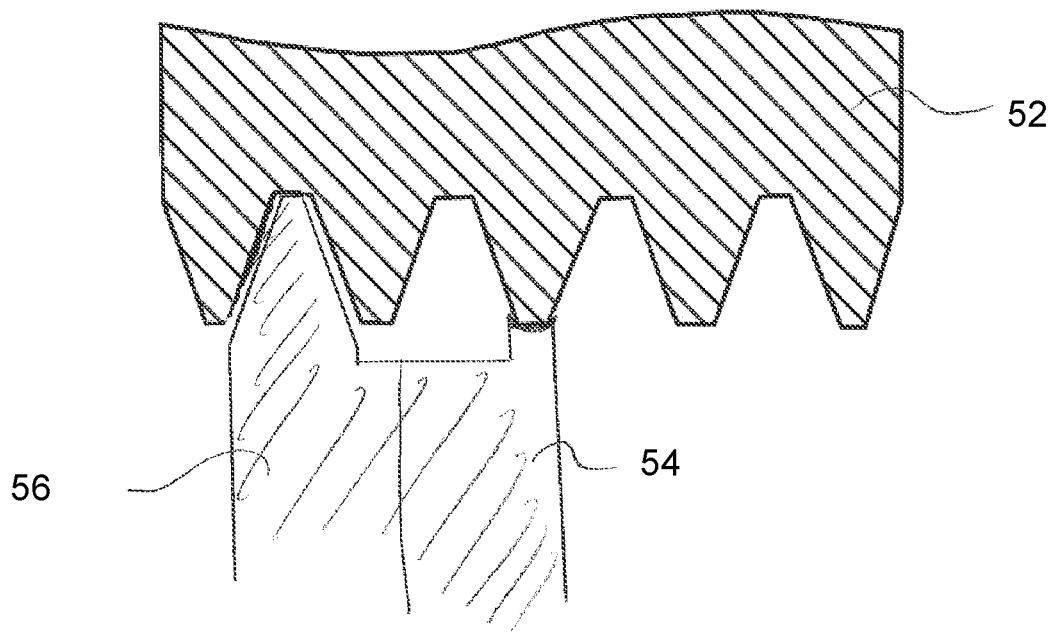

A further variant of dressing both the flanks and the worm tips using only one dressing tool and in so doing implementing free progressions of the tip radii, is provided by the combination dressing tool shown in FIGS. 11A and 11B and assembled from the tip dressing roller 54 and the dual conical wheel 56. Either the flanks or the worm tips can be dressed in one stroke using this dressing tool. For this purpose, a small center distance between the dressing tool and the worm is selected during the dressing of the worm tips in comparison with a dressing of the flanks. The tip dressing roller 54 thereby comes into contact with the worm tips. To avoid the dual conical wheel 56 contacting and dressing the flanks at this smaller center distance, a different axial cross angle is set between the axis of rotation of the dressing tool and the axis of rotation of the worm during the dressing of the flanks in comparison with the dressing of the tips of the worm threads. The axial cross angle between the axis of rotation of the dressing tool and the axis of rotation of the worm is typically selected as equal to the helix angle of the worm during dressing with a dual conical wheel. A dual conical wheel is correspondingly designed for this axial cross angle. It is, however, also possible to dress a worm with an axial cross angle different from the helix angle of the worm, with this axial cross angle being able to be varied in both directions. If a dual conical wheel is designed for such an alternative axial cross angle, the dual conical wheel will be smaller. This effect is used with the combination dressing tool proposed here and with the process proposed here. For this purpose, the dual conical wheel is designed for an axial cross angle different from the helix angle of the worm and is used at this axial cross angle for dressing the flanks (FIG. 11A), wherein the dressing can take place both on one flank and on two flanks. To dress the tips of the worm threads (FIG. 11B), an axial cross angle is set that is closer to the helix angle of the worm and is preferably equal to the helix angle of the worm. The dual conical wheel for this axial cross angle is thereby too narrow for the dressing of the flanks and does not contact them. The alternative axial cross angle is to be selected such that the dual conical wheel also has sufficient clearance toward the flanks on the reduction of the center distance between the worm and the combination dressing tool required for dressing the tips of the worm threads. The alternative axial cross angle preferably deviates from the helix angle of the worm by between 0.1° and 10°.

Figure 19:
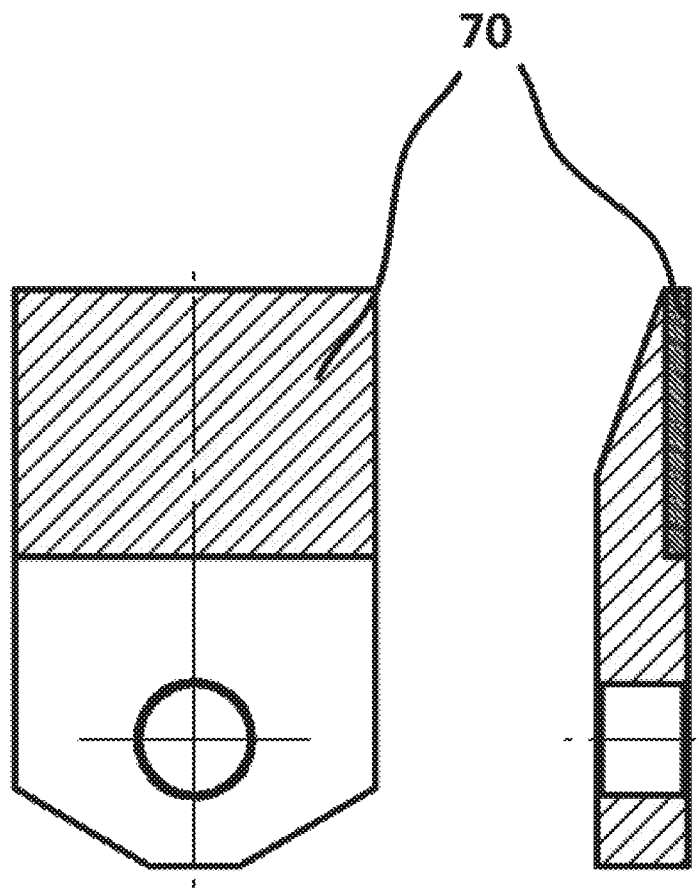
FIG. 19 shows an embodiment of a dressing plate with an abrasive surface 70.
Figure 20:
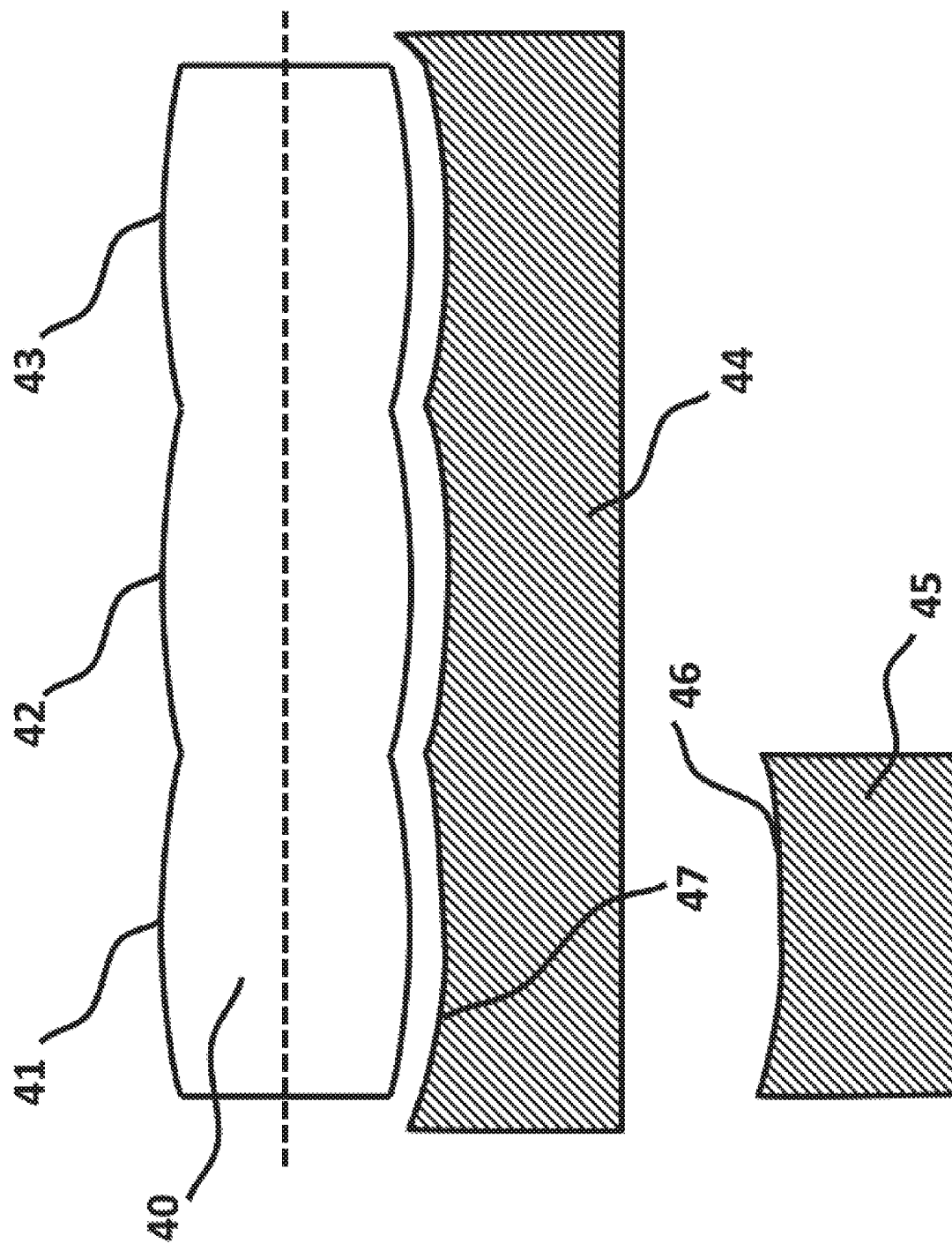
FIG. 20 schematically shows the extent of the tip radius and a dressing plate 44 specifically configured for an enveloping body at said enveloping body of a cylindrical tool 40 having three periodically recurring regions 41, 42, 43.
Figure 21A:
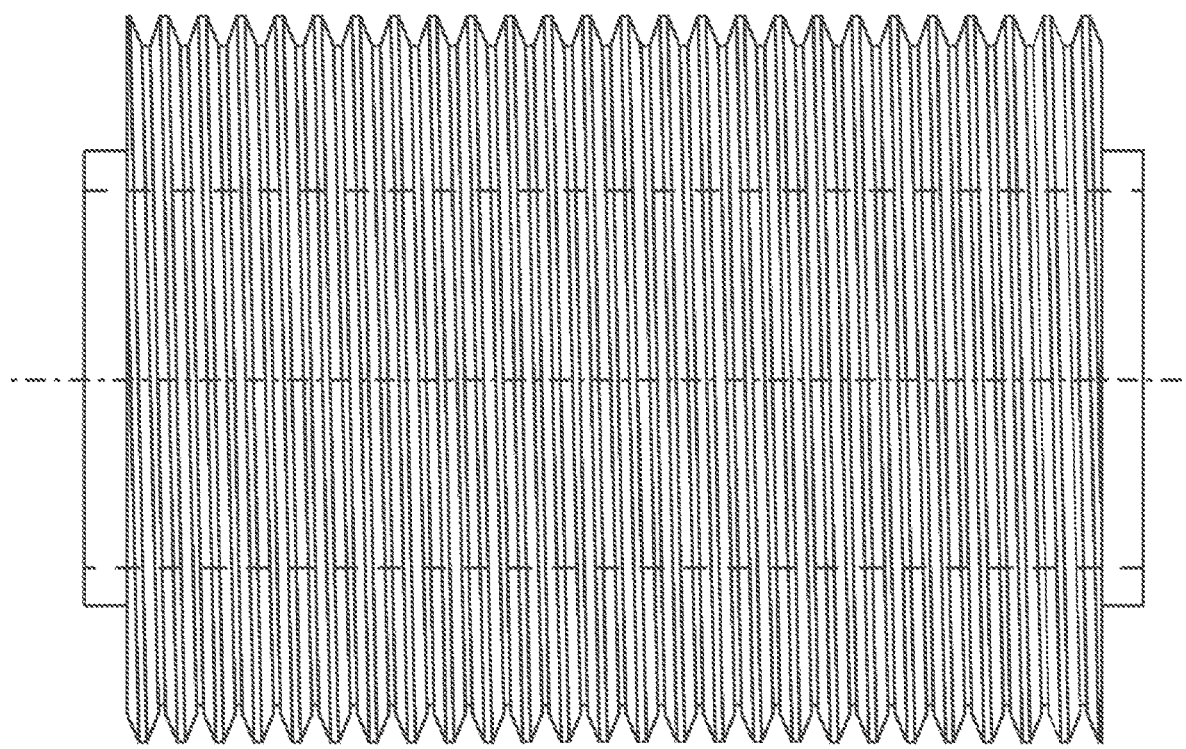
FIGS. 21A and 21B show example grinding worms, with FIG. 21A showing a cylindrical grinding worm as an example for a cylindrical tool.
Figure 21B:
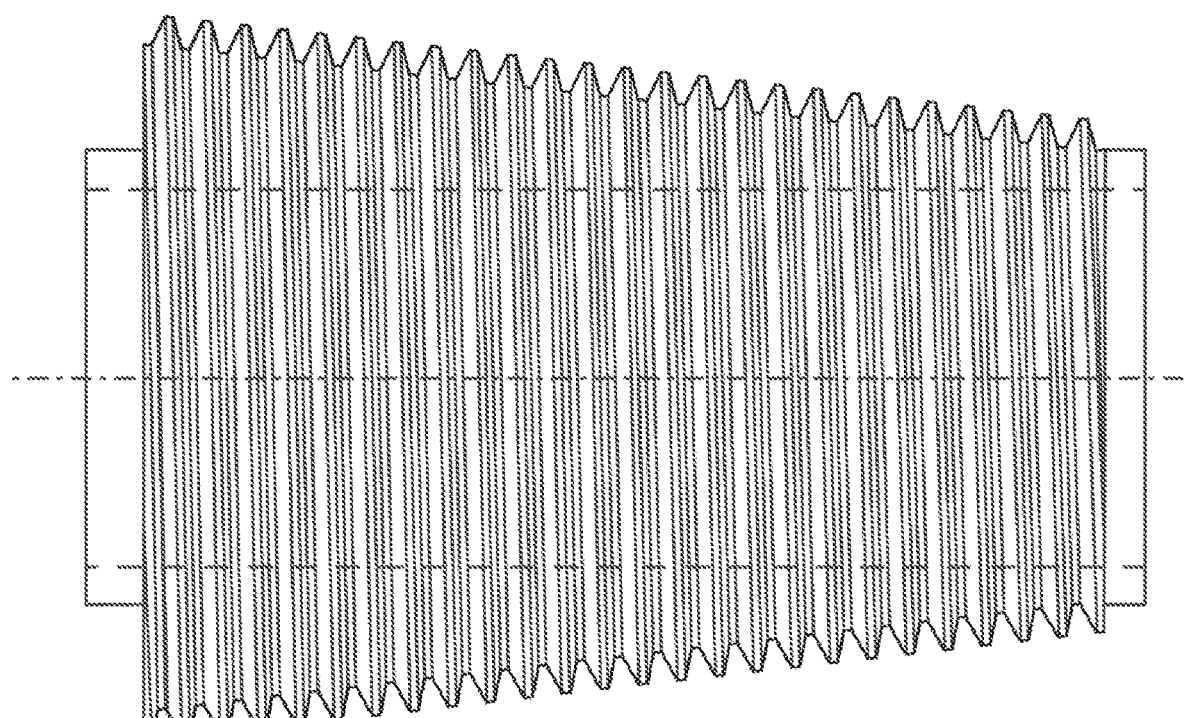

Alternatively to the dressing using tip dressing rollers, worms can also be dressed using dressing plates. Such dressing plates are fixedly fastened in the gear grinding machine and the worm is led axially past the dressing plate while it is rotating at a sufficiently high speed to reach the required cutting speed. To achieve a free progression of the tip radius, the distance from the worm to the dressing plate is to be changed in dependence on the axial position such that the desired progression of the tip radius forms on the worm. To use this process, the dressing plate can, for example, as shown in FIG. 19, be carried out using a planar abrasive surface 70. A further embodiment provides the use of a needle plate that is in particular preferred when the progression of the tip radius has small curvature radii. Such dressing plates and needle plates are in particular preferably to be used in the production of small runs due to their high flexibility. An embodiment, in particular preferred for mass production, provides a specific dressing plate 44 whose shape the abrasive surface 47 exactly corresponds to the progression of the tip radius. Such a dressing plate 44 is shown in FIG. 20 together with the enveloping body 40 of the worm for which the dressing plate was designed. The worm thus only has to be traveled to the dressing plate once in a rotating manner at the correct distance. The desired progression is formed without the worm having to be led past the dressing plate, whereby the dressing time is considerably reduced. The length of the dressing plate preferably corresponds to the length of the worm. A further embodiment provides a shorter and thus less expensive dressing plate 45 that is suitable for the simultaneous dressing of a part of the worm. The shape of the abrasive surface 46 exactly corresponds to a part of the progression of the tip radius of the worm. If the worm has a periodically recurring progression of the tip radius, the worm can be dressed over the whole length in a plurality of machining steps. Either only a periodic region or a plurality of periodic regions can be dressed per machining step depending on the embodiment. The width of this special dressing plate that extends into the plane of the paper in FIG. 20 can be freely selected. The wider it is, the more width positions it can be used on and the more dressing cycles it can be used for until it is worn.

If a free tooth trace modification is to be achieved and if at least two additional conditions should simultaneously be satisfied, this is generally not possible with the process presented here. It is, however, possible, for example by means of curve fitting, to calculate changes of the kinematics with which the additional conditions can be achieved at least approximately so that it is possible in specific cases to satisfy the additional conditions within a permitted tolerance. If the permitted tolerances depend on the axial feed position $z_{V2}$, optionally, the additional conditions can be weighted differently depending on the axial feed position $z_{V2}$. The additional conditions can be: progression of the root diameter or tip diameter of the workpiece in dependence on the workpiece width position or the displacement of the profile modification on the left or right flanks of the workpiece in dependence on the workpiece width position.

Approximate Manufacture Using a Non-Meshing Tool

To exactly produce a gearing using one of the machining processes looked at here, a tool has to be used that meshes with the workpiece, i.e. equation 63 has to be satisfied for the left and right flanks. This equation can be transcribed using the relations from DIN3960 as follows:

$$m_{nF1} \cdot \cos \alpha_{nF1} = m_{nF2} \cdot \cos \alpha_{nF2} \tag{78}$$

For an exact production, only tools can thus be used whose normal module $m_{nF1}$ and normal pressure angle $\alpha_{nF1}$ are suitable for manufacturing the workpiece. If the tool does not mesh with the workpiece, the workpiece can only be approximately produced. Such an approximate production can, however, be sufficient in specific cases, in particular with gear hobbing as the pre-gear manufacturing process. The production with non-meshing tools in particular provides the advantages in single part production and small run production that new, expensive tools do not have to be purchased and production can take place earlier due to the omission of the waiting time. The deviations from the desired geometry that arose during pre-gear manufacturing can be compensated again by the subsequent fine machining. A further application would be a rough machining with a non-meshing tool followed by a fine machining with a meshing tool. The deviations from the rough machining are then equalized again during the fine machining. The procurement of a further expensive roughing tool can in particular be dispensed with on the production of large gearing arrangements and an already present roughing tool can be used.

The possibility presented in this invention of workpieces having straight-line progressions of the root radius that are tilted about a freely predefinable angle with respect to the axis of rotation can be utilized to considerably reduce the deviations arising on the machining with a non-meshing tool. For this purpose, a given workpiece having base circle radii $r_{bF2}$, base helix angles $\beta_{bF2}$ and root conical angles $\vartheta_2$ and a given tool with a normal module $m_{n1}$ and normal pressure angles $\alpha_{nF1}$ will be looked at. If a generally conical gearing is produced using this tool with an initially freely selected helix angle $\hat{\beta}_2$ and a freely selected conical angle $\hat{\vartheta}_2$, the base circle radii $\hat{r}_{bF2}$ and the base helix angles $\hat{\beta}_{bF2}$ of the workpiece produced in this manner can be approximately calculated.

$$\tan\alpha_{tF2} = \tan\alpha_{nF1} \cdot \frac{\cos\hat{\vartheta}_2}{\cos\hat{\beta}_2} + s_F \cdot \tan\hat{\beta}_2 \cdot \sin\hat{\vartheta}_2 \quad (79)$$

$$\hat{r}_{bF2} = \frac{z_2 \cdot m_{n1}}{2 \cdot \cos\hat{\beta}_2} \cdot \cos\alpha_{tF2} \quad (80)$$

$$\tan\hat{\beta}_{bF2} = \left(\frac{\tan\hat{\beta}_2}{\cos\hat{\vartheta}_2} - s_F \cdot \tan\alpha_{tF2} \cdot \tan\hat{\vartheta}_2\right) \cdot \cos\alpha_{tF2} \quad (81)$$

Figure 23:
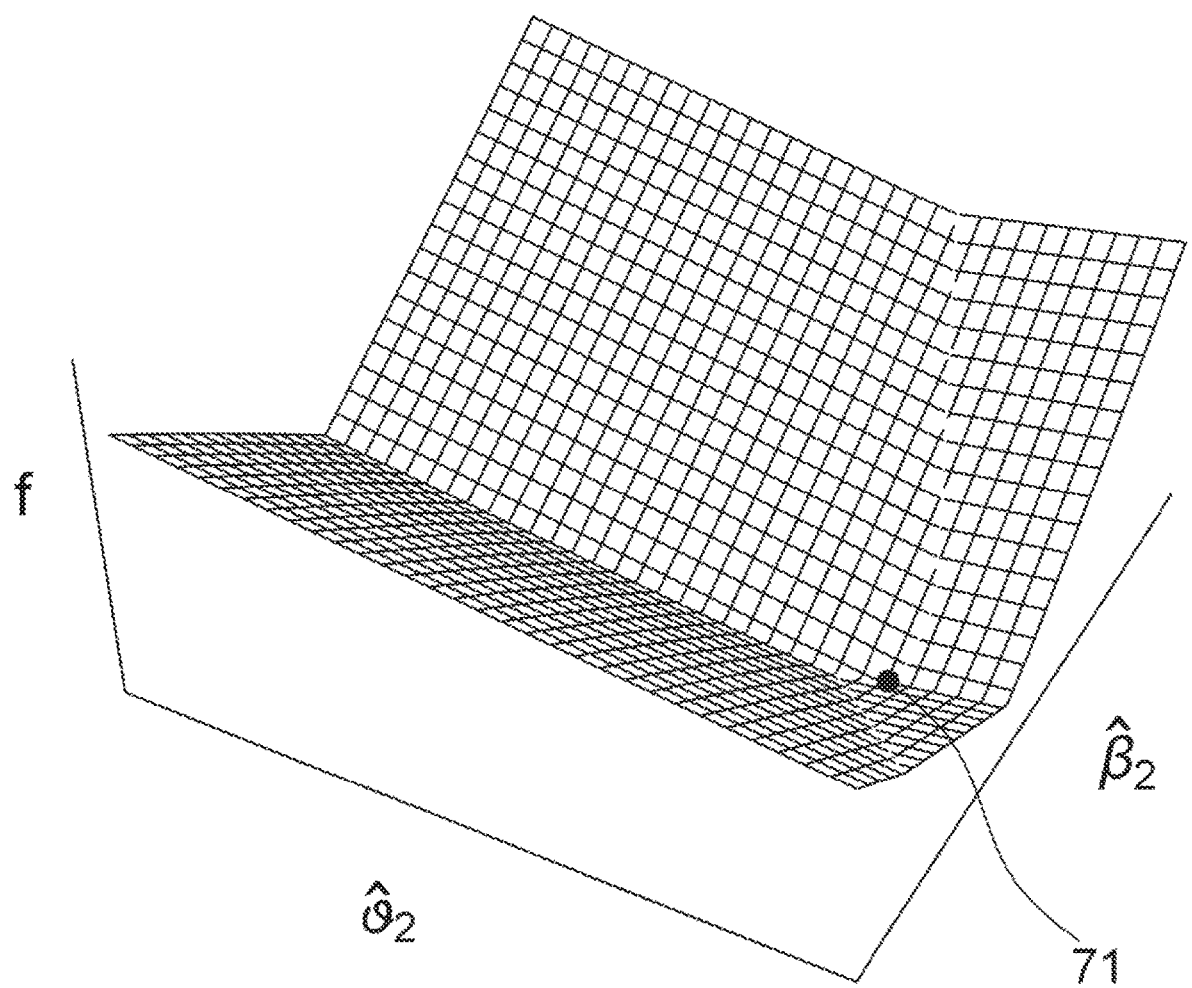
FIG. 23 shows the dependence of the deviation f of an approximately produced workpiece from the desired workpiece in dependence on $\hat{\beta}_2$ and $\hat{\vartheta}_2$.

The deviation from the desired geometry can be determined from $\hat{r}_{bF2}$ and $\hat{\beta}_{bF2}$; this deviation is preferably determined as a maximum deviation of the desired geometry from the generated geometry, further preferably as a sum of the tooth trace angle deviation $f_{H\beta}$ and the profile angle deviation $f_{H\alpha}$. The deviation of the desired geometry in dependence on $\hat{\beta}_2$ and $\hat{\vartheta}_2$ is shown for an example in FIG. 23. The deviation becomes minimal at the point 71. The minimal value is generally at a value for $\hat{\vartheta}_2$ that deviates from the root conical angle $\hat{\vartheta}_2$ of the workpiece. If the gearing were now to be machined in accordance with the prior art with the values of $\hat{\beta}_2$ and $\hat{\vartheta}_2$ for which the deviation is minimal, the workpiece would be produced with an incorrect root conical angle $\hat{\vartheta}_2$. The deviations of $\hat{\vartheta}_2$ with respect to the desired root conical angle can be in the range from a few hundredths of a degree up to 5° or more in dependence on how much the tool deviations from a meshing tool. Larger deviations of $\hat{\vartheta}_2$ in particular result in deviations of the desired root circle radii that are far outside the typically permitted tolerances. The invention now provides designing the machining process as if the workpiece should be machined using the determined values of $\hat{\beta}_2$ and $\hat{\vartheta}_2$. This process would deliver a workpiece with a minimal deviation from the desired geometry. The process is then, however, carried out such that a straight-line progression that is described by a straight line that is tilted by the root conical angle $\vartheta_2$ with respect to the axis of rotation is predefined as the desired progression of the root circle radius. A workpiece having a minimal deviation from the desired geometry on the flanks, but with an exactly produced root conical angle is thereby furthermore generated If the process is used on cylindrical workpieces, the root conical angle is generally $\vartheta_2=0$.

This process in particular offers large advantages over a variant in which only $\hat{\beta}_2$ is used for optimizing and $\hat{\vartheta}_2$ is selected as equal to the desired conical angle of the workpiece when the tool and/or workpiece have asymmetrical profiles and/or when the workpiece is conical.

If this process is used with machines that do not permit the axial cross angle γ to change continuously during machining due to their design in order to use the process for generating free progressions of the root circle radius, the axial cross angle can thus only be adjusted at a plurality of certain axial feed positions of the workpiece, in particular with large gearing arrangements, and can be kept constant between these axial feed positions of the workpiece. It is also conceivable to keep the axial feed of the workpiece constant during the change of the axial cross angle or even to interrupt the machining briefly or to bring the tool briefly out of engagement. The process thus carried out would then produce larger deviations, in particular abrupt deviations, on the generated workpiece.

The invention further provides software that determines that tool or those tools from a selection of tools whose geometrical data are stored in a database, for example, that is or are best suitable for a use of the just described process and that in particular generates or generate the smallest deviation from the desired geometry.

Influence of the Axial Cross Angle on the Profile Angle of the Generating Rack

Figure 24:
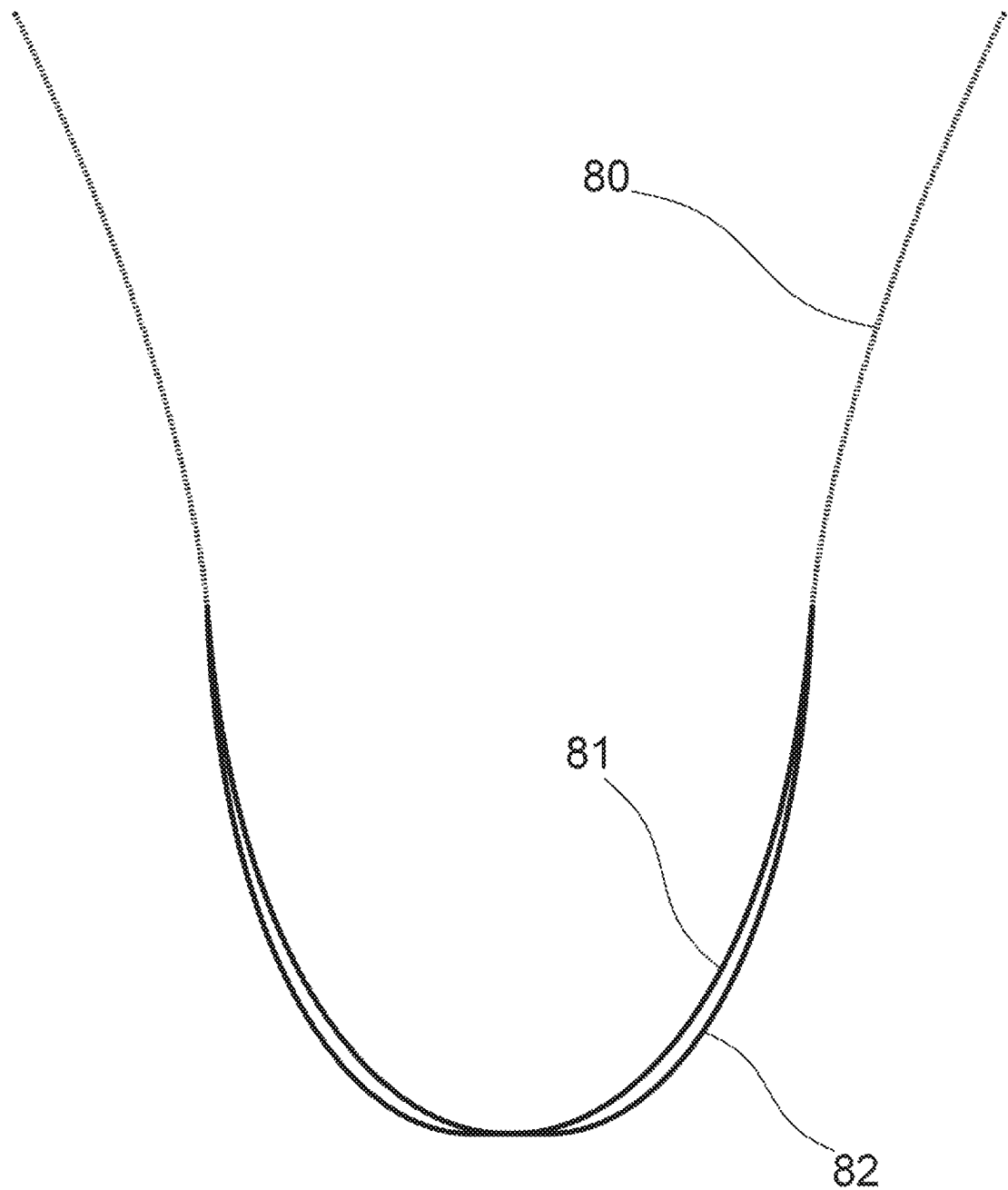
FIG. 24 shows the transverse section of a gearing having involutes 80 and two variants 81 and 82 of a root geometry.

It results directly from the relation (R3) and the formulas of DIN3960 and [Zierau] that a change of the axial cross angle automatically produces a change of the profile angle $\alpha_{tw2}$ in the transverse section of the theoretical rack generating the workpiece. It is shown in FIG. 6A how the profile angle $\alpha_{tw2}$ of the generating rack of the workpiece changes in dependence on a change of the axial cross angle. In the example shown, a strictly monotonous progression is shown that becomes steeper and steeper to the right. The change of the profile angle has no influence on the generated involute, that is the base circle radius and the base helix angle remain unchanged. The change of the profile angle, however, has an influence on the generated non-involute regions of the tooth gap, in particular on the root geometry. FIG. 24 shows this influence for the example of a tooth gap symmetrical in the transverse section. The generated involute 80 is identical with different profile angles, but the root geometries 81 and 82 differ. In the example shown, 81 corresponds to a profile angle larger in comparison with 82. It is shown that more material is removed with smaller profile angles and a root geometry is generated with a larger curvature. The actually generally root geometry also depends, in addition to the kinematics, on the shape of the tip of the tool, but the qualitative influence of the profile angle described here on the root geometry is dependent on the actual shape of the tip. The actually generated root geometry can be calculated both in the case of a constant axial cross angle and of a continuously changing axial cross angle using a removal simulation that takes the kinematics and the tooth shape of the tool into account.

As already described further above and as can be seen from FIGS. 5 and 6a, there are two solutions for the axial cross angle γ for most of the application cases shown. They are generally approximately symmetrical about an uncorrected axial cross angle in accordance with the prior art. The processes in which the axial cross angle is changed during a machining stroke can be carried out both with a rising axial cross angle and with a falling axial cross angle, that is there are generally at least two solutions for the function $\hat{\gamma}(z_{V2})$. The strictly monotonous progression of the profile angle in 6b shows that the selection of the solution has an influence on the profile angle and thus, in the case of a machining of the root, also an influence on the produced root geometry. This effect can be used as the selection criterion as to which solution is to be selected. A higher material removal in the root thus, for example, produces a weaker root and can therefore more easily produce a break of the root. On the other hand, too small a removal can produce a collision with the rip of the counter-wheel in the installed state.

Figure 6B:
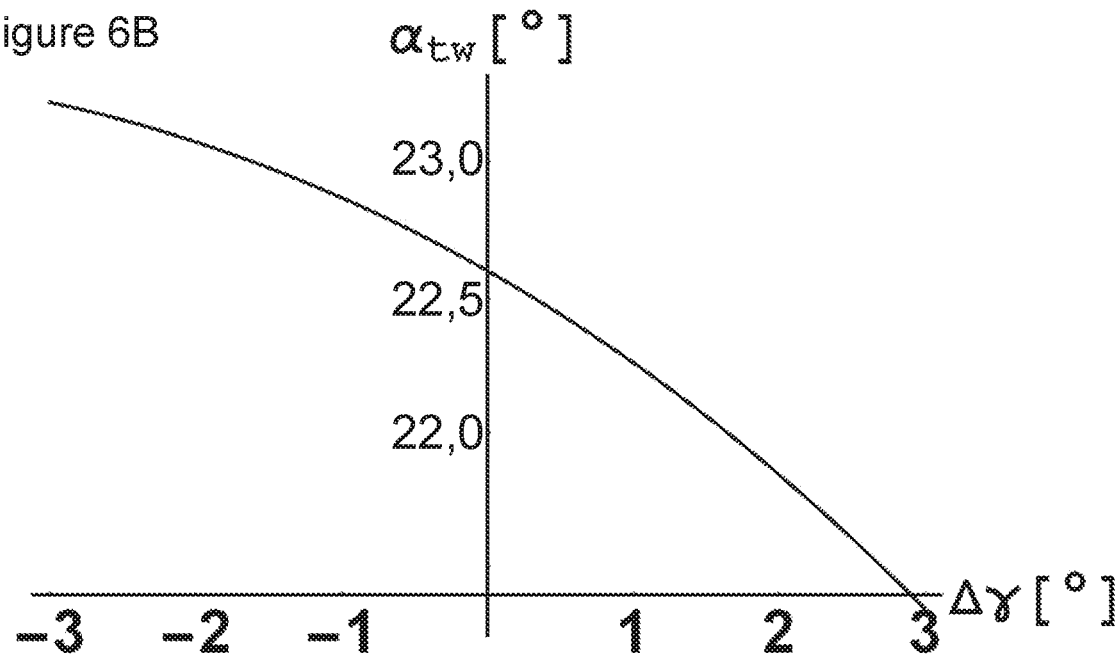
Figure 25:
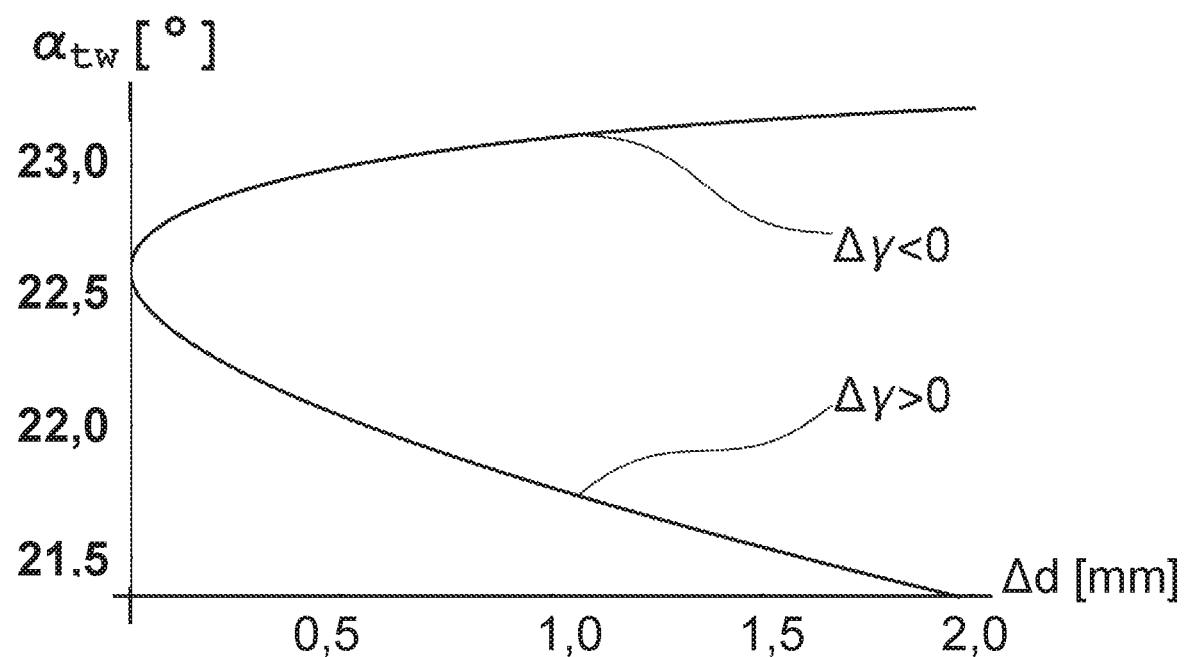
FIG. 25 shows the dependence of the profile angle $\alpha_{tw}$ in the transverse section of the theoretical generating rack of the workpiece on the center distance change $\Delta d$ that is necessary to keep the tooth thickness of the workpiece constant with a changing axial cross angle, for $\Delta\gamma>0$ and $\Delta\gamma<0$.

The influence of the profile angle on the root geometry can also be set specifically, in particular to influence the change of the root geometry over the workpiece geometry with conical workpieces. If conical gearing arrangements are produced using one of the machining processes in accordance with the prior art looked at here, a root geometry results that changes continuously over the width of the workpiece and that follows from the continuously changing profile displacement factor. This changing root geometry is inter alia determined by the shape of the tip of the tool and by the conical angle. In particular when the root is also to be machined, the conical angle corresponds to the root conical angle. Only the shape of the tip of the tool can thus be used for influencing the root geometry. There is, however, no longer any possibility to influence the change of the root geometry over the workpiece width. To increase the root strength of the workpiece and simultaneously to prevent a collision of the counter-wheel, it can, however, be advantageous to influence the change of the root geometry over the width of the workpiece such that more or also less material is removed from toe to heel in the root in comparison with machining processes in accordance with the prior art. For this purpose, a given workpiece having base circle radii $r_{bF2}$, base helix angles $\beta_{bF2}$ and a root conical angle $\vartheta_2$ is looked at. If these base parameters are entered into equations (79) and (81), a normal module $m_{n2}$, a helix angle $\beta_2$, and two normal profile angles $\alpha_{nF2}$ can thus be determined. If $\vartheta_2$ is, however, replaced with an alternative conical angle $\hat{\vartheta}_2$ alternative parameters $\hat{m}_{n2}$, $\hat{\beta}_2$, and $\hat{\alpha}_{nF2}$ can be determined. Using a theoretical rack determined by these alternative parameters, a conical gearing can be produced that has the same basic parameters $r_{bF2}$ and $\beta_{bF2}$, but a different root conical angle. A tool suitable for this process can be determined from equations (79) to (81) that apply analogously to the tool, from the relation (R3) and from the fact that the normal profile angle and the normal module of the theoretical racks of the tool and of the workpiece have to be the same. The desired root conical angle $\vartheta_2$ can, however, now be realized using the process presented in this invention. For this purpose, a straight-line progression of the root circle radius is predefined that is given by a straight line tilted by $\vartheta_2$ with respect to the axis of rotation of the workpiece. For this purpose, the center spacing has to be adapted in dependence on the axial feed position $z_{V2}$ of the workpiece with respect to an uncorrected machining and the axial cross angle $\gamma$ has to be adapted in accordance with FIG. 5B, which has the result in accordance with FIG. 6B of a change of the profile angle of the theoretical rack and, as shown in FIG. 24, of a changed removal in the root. Whether the removal in the root increases or decreases from toe to heel with respect to the process in accordance with the prior art can be controlled by whether an alternative conical angle $\hat{\vartheta}_2$ is selected that is smaller or larger than $\vartheta_2$ and by whether the axial cross angle is compensated via the left part ($\Delta\gamma<0$) or the right part ($\Delta\gamma>0$) of the function in FIG. 5B to compensate the changed center distance. If, for example, the alternative conical angle $\hat{\vartheta}_2$ is selected such that the center distance from toe to heel has to be increased and if the increase of the center distance is compensated via the right part of the function of FIG. 5B, this produces an increase of the axial cross angle from toe to heel, which in turn produces a decrease of the profile angle in accordance with the function in FIG. 6b and thus more removal in the root in accordance with FIG. 24. FIG. 25 illustrates the dependence of the profile angle on the change of the center distance for the two variants $\Delta\gamma<0$ and $\Delta\gamma>0$. It is shown that the amount of the gradient of the two functions is large for small changes $\Delta d$ and is small for large changes $\Delta d$. This can be used also to influence the progression of the profile angle between the toe and heel in addition to the profile angle thereat. If, for example, in the observed example the center distance has, for example, to be changed by 0.5 mm and if the range from 1.5 mm to 2.0 mm is used for this purpose, an approximately linear change of the profile angle over the width of the workpiece results in accordance with FIG. 25. If, however, the range between 0 mm and 0.5 mm is used, a non-linear parabola-like change is produced. Which range is used can be controlled via the tooth thickness of the tool. If a tooth thickness of the tool is selected that differs from that in accordance with the prior art, a change of the axial cross angle is necessary to achieve the desired tooth thickness at the workpiece, whereby the utilized range can be determined from FIG. 25.

If the root geometry of a conical workpiece changing continuously over the width of the workpiece is predefined, the alternative conical angle $\hat{\vartheta}_2$ and one or more of the following influences can be determined by means of curve fitting, for example, such that the desired root geometry is optimally approximated: 1) Shape of the tip of the tool; 2) sign of $\Delta\gamma$; 3) range of the function from FIG. 25.

The alternative conical angle $\hat{\vartheta}_2$ and one or more of the 3 influences can also be determined such that the behavior in use, in particular the root load bearing capacity of the workpiece, is optimized. For this purpose, a removal simulation can be used that determines the arising root geometry changing continuously over the width of the workpiece and to use the result in a program for determining, in particular calculating and/or simulating, the use behavior, in particular the root load bearing capacity.

The just presented possibility of designing the process with an alternative conical angle $\hat{\vartheta}_2$ and to realize the desired root conical angle $\vartheta_2$ via the presented process not only produces a change of the profile angle of the theoretical rack over the width of the workpiece, but also has the result that $\hat{\alpha}_{nF2}$ deviates from the process in accordance with the prior art and the profile angle can thus be influenced over the whole width of the workpiece. This influencing of the profile angle produces changed generating circles and thus changed generating conditions that in particular have an effect at the non-involute regions of the workpiece, in particular at the root and tip regions and influence the possibilities of the geometries that can be established in generating. Some geometries can thus only be realized at the root and tip of the workpiece with profile angles of the theoretical rack that are in a specific range. How the profile angle affects the geometries that can be generated can be determined using a production simulation that in particular also takes account of the non-involute regions. The invention thus also provides determining the alternative conical angle $\hat{\vartheta}_2$ and thus the profile angles $\hat{\alpha}_{nF2}$ on the left and right flanks such that the desired geometries can be achieved at the non-involute regions, in particular at the root and at the tip.

Since the profile angles of the theoretical rack depend on the axial cross angle γ, the additional conditions in γ and/or d and/or $z_{V2}$ also mean such additional conditions in this invention that are also additional conditions in the profile angles of the theoretical rack. Those additional conditions are thus also covered, for example, that require a profile angle in a specific range to generate specific geometries in the non-involute region.

Combination with Diagonal Generating Methods

Some embodiments of the invention require a machining in the diagonal generating method. In these embodiments, the diagonal ratio is generally restricted downwardly, i.e. a minimal shift distance is required; the diagonal ratio can in contrast be freely selected upwardly. In all other embodiments, a machining in the diagonal generating method is admittedly not necessary, but is possible without problem. The diagonal ratio can in all cases be both constant and non-constant.

If the process is carried out in the diagonal generating method, tools can be used that have a modification variable over the width. Such modified tools are used in topological generating grinding, for example. DE 10 2015 000 907 and DE 10 2015 008 956 of the same applicant that are included in full in the subject of the present application, describe methods that utilize the fact in diagonal generating grinding that it is possible to map straight lines on the tool to straight lines on the workpiece or, if a variable diagonal ratio is used, to map straight lines on the tool to curves on the workpiece. These methods can be combined with the process presented in this invention, but is must be noted that the association of the points on the tool to points on the workpiece also changes by a change of the axial cross angle. Straight lines on the tool are thereby no longer exactly mapped to straight lines on the workpiece with a constant diagonal ratio when the axial cross angle is changed in dependence on $z_{V2}$. If the changes of the center distance and of the axial cross angle in dependence on $z_{V2}$ are known, the association of the points on the tool with points on the workpiece can with relations (R6) and (R7, with the dependence of the coefficient in these relations of γ and d having to be taken into account.

A special application case of the combination with diagonal generating methods results when an additional condition at least dependent on γ and/or d and $z_{V2}$ is to be satisfied, in particular when a free progression of the root circle radius or of the tip circle radius at the workpiece should be achieved and simultaneously a specific displacement of the profile modification, in particular a profile modification that is not displaced over the width of the workpiece. If an additional condition is satisfied using the process presented here, this automatically produces a displacement of the profile modification over the width of the workpiece on both flanks. This displacement generally, however, does not correspond to the desired displacement. If the process is carried out as a diagonal generating method, a tool can be used on which the profile modification is displaced over the tool length just such that the correct displacement of the profile modification on the workpiece is formed while taking account of the machining kinematics. If the machining process used is generating grinding with a dressable worm, the worm is to be dressed accordingly. DE 10 2015 000 907 describes a method of dressing a worm with a dressing wheel that permits a diameter on the dressing wheel to be mapped to a diameter or generating path on the worm and to select this association freely over the worm width. Depending on the application case, the dressing can be carried out on one flank or on two flanks. Whether the dressing can be carried out on two flanks depends on whether an association of diameters on the dressing wheel with generating angles on both flanks of the worm can be achieved during two-flank dressing that a displacement of the profile modification over the width of the workpiece on both flanks in the later generating grinding that is within the desired tolerance.

This process can also be implemented using a tool having a previously determined progression of the tip circle radius or root circle radius such that the root circle radius or tip circle radius at the workpiece is formed both from the machining kinematics and from the geometry of the tool. This is in particular advantageous when an additional condition is utilized that is independent of the root circle and of the tip circle since in this manner, root circle or tip circle, a displacement of the profile modification and the additional condition can be satisfied.

The diagonal generating method is also in particular advantageous when, for technological reasons, for example to avoid too high a wear of the tool, different regions of the tools should be brought into engagement during a stroke.

Demands on Preferably Usable Tools

If a tool in accordance with the prior art is used, the base gap angle can only be increased via a change of the axial cross angle Δγ as can be seen in FIG. 5A and thus the tooth thickness of the workpiece can only be reduced. To ensure that the base gap angle both can be decreased and increased over Δγ and thus the tooth thickness can be increased and decreased using a tool, a tool can be utilized whose tooth thickness is smaller in comparison with that of a tool in accordance with the prior art. This means that the tool is designed for a different axial cross angle γ differing from the prior art. If the axial cross angle is then changed in the direction of the axial cross angle in accordance with the prior art, this produces a larger tooth thickness of the workpiece. If the process is used in the variant in which the axial cross angle is changed during a machining stroke, which region the change of the axial cross angle Δγ lies in can be influenced via the tooth thickness. The smaller the tooth thickness of the tool, the larger Δγ has to be become in amount to achieve the same effect. If the machining first requires, for example in dependence on $z_{V2}$, a reduction in the tooth thickness from the upper edge toward the gearing center and then an increase of the tooth thickness from the gearing center up to the lower edge, as is the case, for example, with a tooth trace crowning, this can be realized using a tool having a reduced tooth thickness remote from Δγ=0 and a direction change of Δγ, but also using a tool having a correspondingly matched tooth thickness around Δγ=0 without a direction reversal of Δγ being realized. The latter variant can be advantageous since a possible present backlash of the axle or axles used to implement the axial cross angle is not important.

A further aspect that is to be taken into account in tools that are preferably to be used and that have a defined blade, in particular hobs and skiving hobs, is that a change of the free angle can occur due to the change of the pivot angle that can have a negative effect on the service life of the tool. Tools are therefore preferably to be used whose relief grinding is designed such that a sufficiently large free angle is present at the hob tooth at all axial cross angles to be set in the process. The free angles being adopted can be determined, for example, within the framework of a production simulation and can thus be adapted accordingly. The free angle should preferably be larger than 0.5°, further preferably larger than 2°, for all axial cross angles to be set in the process.

Further Aspects of the Tooth Trace Modifications

The form of the tooth trace modifications that can be generated purely over the machining kinematics are described by equation (69). If the tooth trace modification is given by a function $\overline{F}_{KFt}(z_F)$, with the modification being achieved on a given generating path $w_{0F}$, $F_{KFt}$ can be determined by $$F_{KFt}(w_{0F}\tan\rho_{KF}+z_F)=\overline{F}_{KFt}(z_F) \tag{82}$$

The tooth trace modifications can be freely selected on the left and right flanks and can in particular be tooth trace modifications, tooth trace crownings, tooth trace hollow crownings and/or end reliefs.

Deviations in the tooth trace can occur in the machining. Such deviations are compensated via a tooth trace correction in the gear manufacturing machine. The tooth trace modifications looked at here are to be understood as the sum of the desired tooth trace modifications and the optionally required tooth trace correction.

The tooth trace modification can be constant, can in particular be zero, on one or both flanks. A workpiece can thus also be produced without a tooth trace modification by the process presented here, while satisfying the additional condition.

A specific application case of the invention provides, preferably on a machining of the root, predefining the progression of the root as a straight line tilted by the root conical angle with respect to the axis of rotation in order thus to produce a gearing whose progression of the root circle radius remains uninfluenced by the tooth trace modification. This furthermore has the result that the tooth trace modification is substantially realized by a change of the axial cross angle and not by a change of the center distance. This can be of advantage when the axle or the axles that are used for setting the axial cross angle can be set more exactly than the axle or axles that are used to set the center distance.

Points Deserving Protection

Important aspects of the present invention will be presented in the following which are the subject matter of the present application both per se and in combination with one another and in combination with the aspects presented in the previous description. The independent aspects that will be shown in the following can in particular be combined with one another and with the aspects shown in the preceding description and/or as alternatives in a single gear manufacturing machine. In particular those aspects that are shown with respect to the dressing of a grinding worm can be used for providing a grinding worm that is used in an aspect for gear manufacturing machining of a workpiece.

Setting the Axial Cross Angles in Dependence on an Additional Condition:

1. A process for gear manufacturing machining a workpiece by tool on a gear manufacturing machine, wherein the workpiece is machined by a generating machining process in which the tool rolls off the workpiece for the gear manufacturing machining at a predefined center distance and axial cross angle, wherein the gear manufacturing machining preferably takes place on two flanks; and wherein a desired tooth trace shape and/or tooth thickness of the gearing is generated by the generating machining process, characterized in that an additional condition can be predefined and the center distance and the axial cross angle are determined in dependence on the desired tooth trace shape and/or on the tooth thickness of the gearing and on the additional condition.

2. A method in accordance with aspect 1, wherein an axial cross angle is selected in dependence on the additional condition that depends on an axial cross angle predefined by the helix angle of the tool and of the workpiece; and wherein the center distance is set such that the desired tooth trace shape and/or tooth thickness is/are generated despite the deviating helix angle, with the center thickness and the deviation between the axial cross angle to be set and the axial cross angle predefined by the helix angle of the tool and of the workpiece preferably being determined in dependence on the additional condition and on the desired tooth trace shape and/or tooth thickness; and/or wherein the center distance is determined such that the additional condition is satisfied, with the axial cross angle being set in dependence on the center distance such that the desired tooth trace shape and/or tooth thickness is generated.

3. A process in accordance with aspect 1 or aspect 2, wherein the center distance, the axial cross angle and a correction of the generating coupling are determined in dependence on the desired tooth trace shape and/or tooth thickness and the additional condition; and/or wherein a tooth trace modification is predefinable as a desired tooth trace shape; wherein the tooth thickness and/or the tooth trace modification is/are preferably predefinable independently for the left and right flanks; and/or wherein the center distance and/or a correction of the generating coupling is/are preferably determined as a function of the workpiece width position.

4. A process in accordance with one of the preceding aspects, wherein the additional condition relates to the geometry of the gearing, with it preferably being a specification with respect to the shape of the gearing in the active part and/or in the inactive part of the gearing, with the specification preferably relating to the root geometry, in particular the root radius and/or the progression of the root and/or the tip geometry, in particular the tip radius and/or the progression of the tip, and/or the position of a modification generated on the active tooth flank of the workpiece by a modification on the tool; and/or wherein two or more additional conditions are predefinable, and in particular a first specification with respect to the shape of the gearing is determined in the inactive part of the gearing and a second specification with respect to the shape of the gearing in the active part of the gearing is determined, in particular a specification with respect to the root radius or the tip radius and a specification with respect to the position of a modification generated on the active tooth flank of the workpiece by a modification on the tool; and wherein the center distance and the axial cross angle and, optionally, a correction of the generating coupling are preferably determined by means of curve fitting such that the two more additional conditions are satisfied in an optimum approximation.

5. A process in accordance with one of the preceding aspects, wherein the root is also machined together with the active tooth flank in at least one machining stroke, with the tooth thickness generated in this machining stroke and the root radius generated in this machining stroke being separately predefinable; and/or wherein the material removal in the region of the root and of the tooth flank can be set separately, with the tooth thickness generated in this machining step and the root radius generated in this machining step preferably being generated by a suitable setting of the axial cross angle and the center distance between the tool and the workpiece, with the material removal on the right flank and on the left flank preferably being separately predefinable by a suitable setting of the axial cross angle and the center distance between the tool and the workpiece and of a correction of the generating coupling.

6. A process in accordance with one of the preceding aspects, wherein the workpiece is machined by a plurality of machining strokes, with the root also being machined together with the active tooth flank in at least one machining stroke, and with the setting of the axial cross angle and the center distance between the tool and the workpiece taking place such that the material removal in the region of the root is smaller during the last machining stroke than in a preceding machining stroke, with the material removal in the region of the root in all the preceding machining steps preferably being larger than or equal to the material removal in the region of the root in the last machining stroke, and/or with no material removal preferably taking place in the root region in the last machining stroke.

7. A process in accordance with one of the preceding aspects, wherein the root is also machined together with the active tooth flank in at least one machining stroke; and wherein the root is not also machined in at least one other machining stroke, with no modification caused by a variation of the movement axles preferably being generated in the one machining stroke, and/or with a modification of the active tooth flank caused by a variation of the movement axles being generated in the other machining stroke, while the tool remains out of engagement with the root, with the center distance and/or the axial cross angle and/or a correction of the generating coupling for generating a tooth trace modification of the active tooth flank preferably being changed in dependence on the workpiece width position in the other machining stroke.

8. A process in accordance with one of the preceding aspects, wherein the tool is a grinding worm and is dressed using a combination dressing tool that simultaneously dresses at least one left tooth flank and at least one right tooth flank and one tip; wherein a desired root radius and a desired tooth trace shape and/or tooth thickness of the gearing to be generated on the workpiece are generated by a suitable setting of the center distance and of the axial cross angle and, optionally, a correction of the generating coupling between the tool and the workpiece in the machining of the workpiece.

9. A process in accordance with one of the preceding aspects, wherein the tool has a modification that is applied to the active tooth flank of the workpiece in the gear manufacturing machining, with the position of the modification on the active tooth flank of the workpiece being predefinable and/or variable and/or being set via the setting of the axial cross angle and of the center distance between the tool and the workpiece.

10. A process in accordance with aspect 9, wherein a tool is used whose modification was designed for a different desired workpiece geometry; wherein the position of the modification on the workpiece is adapted to the new desired workpiece geometry via the setting of the axial cross angle and the center distance between the tool and the workpiece; and/or wherein the tool is dressed using a dressing tool that has a profile modification and preferably simultaneously dresses at least one left tooth flank and one right tooth flank, with the profile modification of the dressing tool being transferred to the tool by the dressing and with the position of the modification on the workpiece being adapted to the desired workpiece geometry via the setting of the axial cross angle and of the center distance between the tool and the workpiece.

11. A process in accordance with one of the preceding aspects, wherein the axial cross angle remains constant over the workpiece width for at least one machining stroke.

12. A gear manufacturing machine having a tool holder and a workpiece holder as well as NC axes for setting the relative position between the tool and the workpiece for the gear manufacturing machining of a workpiece held in the workpiece holder by a tool held in the tool holder, having a control for controlling the NC axes for carrying out a generating machining process in which the tool for the gear manufacturing machining rolls off on the workpiece,
wherein the control has an input function by which a desired tooth trace shape and/or tooth thickness and an additional condition are predefinable;
and wherein the control has a machining function that sets the center distance and the axial cross angle between the workpiece and the tool in the generating machining such that the machined workpiece has the desired tooth trace shape and/or tooth thickness and satisfies the additional condition, with the tooth thickness generated in a machining stroke and the root radius generated in this machining stroke preferably being separately predefinable by the input function; and/or wherein the material removal on the right flank and on the left flank and in the root are separately predefinable.

13. A gear manufacturing machine in accordance with aspect 12 for carrying out a process in accordance with one of the preceding aspects.

14. A calculation apparatus and/or software for calculating the relative position between the tool and the workpiece required for the carrying out of a generating machining, having an input function by which a desired tooth trace shape and/or tooth thickness and an additional condition are predefinable; and having a determination function that determines the center distance and the axial cross angle between the workpiece and the tool in the generating machining such that the machined workpiece has the predefined tooth trace shape and/or tooth thickness and satisfies the additional condition.

15. A calculation apparatus and/or software in accordance with aspect 14 for calculating the relative position between the tool and the workpiece required for carrying out a process in accordance with one of the preceding aspects.

Variable Setting of the Axial Cross Angle

1. A process for the gear manufacturing machining of a workpiece by a tool on a gear manufacturing machine, wherein the workpiece is machined by a generating machining process in which the tool rolls of on the workpiece for the gear manufacturing machining at a predefined center distance and axial cross angle, characterized in that the axial cross angle is changed during the machining of a workpiece.

2. A process in accordance with aspect 1, wherein the workpiece is machined in a plurality of machining strokes and the axial cross angle is selected differently for a first machining stroke than for a second machining stroke, in particular to set the material removal separately in the region of the root and in the region of the tooth flank, with the axial cross angle preferably being constant for the respective machining stroke.

3. A process in accordance with aspect 1 or aspect 2, wherein the axial cross angle is varied in dependence on the workpiece width position during a machining stroke.

4. A process in accordance with aspect 2 or aspect 3, wherein the axial cross angle and the center distance are changed during the machining of a workpiece, with the workpiece preferably being machined in a plurality of machining strokes and with the axial cross angle and the center distance being selected differently for a first machining stroke than for a second machining stroke; and/or wherein the axial cross angle and the center distance are preferably changed in dependence on the workpiece width position during a machining stroke;

and/or wherein the center distance, the axial cross angle and a correction of the generating coupling are changed during the machining of a workpiece, with the workpiece preferably being machined in a plurality of machining strokes and with the axial cross angle, the center distance and the correction of the generating coupling being selected differently for a first machining stroke than for a second machining stroke; and/or wherein the axial cross angle, the center distance and the correction of the generating coupling are changed in dependence on the workpiece width position during a machining stroke.

5. A process in accordance with one of the preceding aspects, wherein an additional condition dependent on the workpiece width position is predefinable and the center distance and the axial cross angle and, optionally, a correction of the generating coupling are determined in dependence on the additional condition; wherein a tooth thickness and/or a tooth trace modification is/are predefinable in dependence on the workpiece width position and the center distance and the axial cross angle and, optionally, a correction of the generating coupling are determined in dependence on the additional condition and on the predefined tooth thickness and/or tooth trace modification; and/or wherein two additional conditions dependent on the workpiece width position are preferably predefinable, and in particular a specification with respect to the shape of the gearing in the inactive part of the gearing and a specification with respect to the shape of the gearing in the active part of the gearing, in particular a specification with respect to the root radius or the tip radius and a specification with respect to the position of a modification generated on the active tooth flank of the workpiece by a modification on the tool, with the center distance and the axial cross angle and, optionally, a correction of the generating coupling being determined by means of curve fitting such that the two additional conditions are satisfied in an optimum approximation.

6. A process in accordance with one of the preceding aspects, wherein the additional condition relates to the change of the geometry of the gearing in the tooth width direction, with it preferably being a specification with respect to the shape of the gearing in the inactive part and/or in the active part of the gearing dependent on the workpiece width position, with the specification preferably relating to a root geometry dependent on the workpiece width position, in particular a root radius depending on the workpiece width position and/or the shape of the root, and/or a tip geometry depending on the workpiece width position, in particular a tip radius dependent on the workpiece width position, and/or the progression of the tip, and/or a position of a modification generated on the active tooth flank by the tool dependent on the workpiece width position.

7. A process in accordance with one of the preceding aspects, in particular a gear hobbing process, for machining and/or generating a conical and/or asymmetrical gearing, wherein a non-meshing tool is preferably used for the machining and the conical angle underlying the machining and the helix angle of the theoretical rack used for generating the gearing is selected as optimum for the geometry of the active regions of the tooth flank, with the differences of the geometry of the root hereby generated being at least partly compensated by the setting of the center distance and the axial cross angle and, optionally, a correction of the generating coupling, with the conical angle of the root in particular being set to a desired value by the setting of the center distance and of the axial cross angle and, optionally, of a correction of the generating coupling.

8. A process in accordance with one of the preceding aspects for machining and/or generating a conical gearing, wherein the conical angle of the adjustment movement in the machining is selected as unequal to the desired conical angle of the root, and wherein the desired conical angle of the root is generated by adapting the center distance and the axial cross angle and, optionally, a correction of the generating coupling, with the geometry of the tool preferably being selected such that the desired geometry results on the active regions of the tooth flank.

9. A process in accordance with one of the preceding aspects, wherein the tool has a modification that is applied to the active tooth flank of the workpiece during the gear manufacturing machining; wherein the position of the modification on the active tooth flank of the workpiece is predefinable in dependence on the workpiece width position and wherein the modification is generated via a change of the axial cross angle and of the center distance between the tool and the workpiece and, optionally, a correction of the generating coupling in dependence on the workpiece width position at the predefined position, in particular for generating a triangular end relief on the workpiece; and/or wherein the root is preferably not also machined.

10. A process in accordance with aspect 9, wherein the gear manufacturing machining takes place in a diagonal generating method and the tool has at least two different tip radii over the shift width used for a machining stroke, wherein the tip radii of the tool are preferably selected such that the root is not also machined or such that the root is also machined and is given a desired progression by the selection of the tip radius of the tool; wherein the tip radius is preferably suitably determined while taking account of the center distance predefined by the position of the modification and of a desired root radius in dependence on the tool width position; and/or wherein the tooth trace modification and the root radius and the position of the modification are predefinable in dependence on the workpiece width position.

11. A process in accordance with aspect 10, wherein the tool has a plurality of recurring shift regions that are each used for a machining stroke, with the progression of the tip radii for the shift regions preferably being identical.

12. A process in accordance with aspect 9, wherein the workpiece is machined on two flanks, with the position of the modification being able to be predefined and/or generated in a part region of each flank independently of the other flank; wherein the position of the contact lines on the right flank and on the left flank is preferably selected such that the tool is only in engagement with the respective flank in the machining of these part regions; and wherein the tooth thickness of the gearing of the workpiece is in particular reduced and/or the profile angle of the tool is varied to increase the interval of the contact lines; and/or profile modifications displaced in dependence on the workpiece width position can be predefined and generated independently of one another on both flanks.

13. A gear manufacturing machine, in particular for carrying out a process in accordance with one of the preceding aspects, comprising a tool holder and a workpiece holder as well as NC axes for setting the relative position between the tool and the workpiece for the gear manufacturing machining of a workpiece held in the workpiece holder by a tool held in the tool holder;

and comprising a control for controlling the NC axes for carrying out a generating machining process in which the tool for the gear manufacturing machine rolls off on the workpiece, characterized in that
the control has a machining function by which the axial cross angle is changed during the machining of a workpiece in the generating machining process,
with the gear manufacturing machine preferably having an input function by which the tooth thickness generated during a machining stroke and/or the tooth trace modification and the root radius generated during this machining stroke are predefinable separately and/or by which the material removal in the region of the root and in the region of the tooth flank are predefinable separately and/or by which an additional condition dependent on a workpiece width position is predefinable.

14. A calculation apparatus and/or software for calculating the relative position between the tool and the workpiece required for the carrying out a generating machining,
having an input function by which the tooth thickness generated during a machining stroke and/or the tooth trace modification and the root radius generated during this machining stroke are predefinable separately and/or by which the material removal in the region of the root and in the region of the tooth flank are predefinable separately and/or by which an additional condition dependent on a workpiece width position is predefinable;
and having a determination function that correspondingly determines the center distance and the axial cross angle between the workpiece and the tool during the generating machining.

15. A calculation apparatus and/or software in accordance with aspect 14 for calculating the relative position between the tool and the workpiece required for carrying out a process in accordance with one of the preceding aspects.

Dressing Process for a Grinding Worm Having Different Tip Radii

1. A process for dressing a grinding worm that can be used for the gear manufacturing machining of a workpiece by a generating grinding process, characterized in that the grinding worm is dressed such that the tip radius of the grinding worm varies over the worm width.

2. A process in accordance with aspect 1, wherein a desired progression of the tip radius of the grinding worm is predefined and/or determined and is generated by the dressing process, with the desired progression of the tip radius of the grinding worm preferably being determined in dependence on the diagonal ratio that is to be used in the diagonal generating process and in dependence on the progressions of the axial cross angle and the center distance in the workpiece width position used during generating grinding; and/or wherein the tip radius is preferably determined such that the tip of the gearing of the grinding worm remains out of engagement with the gearing to be machined or such that the tip of the gearing of the grinding worm comes into engagement with the gearing to be machined during the generating grinding and generates a desired progression of the root radius of the gearing on the workpiece; and/or wherein the grinding worm is dressed such that the tip radius of the grinding worm has a progression recurring a multiple of times over the worm width.

3. A process in accordance with aspect 1 or aspect 2, wherein a tip dressing tool is moved along the grinding worm in the direction of the worm width; wherein the distance from the axis of rotation of the grinding worm being changed in dependence on the worm width position; wherein the tip dressing tool is preferably a tip dressing plate; and/or wherein the grinding worm is set into rotation for dressing; and/or wherein the relative movement between the tip dressing tool and the grinding worm is preferably generated by traveling the grinding worm; and/or wherein the distance from the axis of rotation of the grinding worm preferably has a progression recurring a multiple of times over the worm width.

4. A process in accordance with aspect 1 or aspect 2, wherein a tip dressing tool is used that has a contour varying over the worm width, with the tip dressing tool preferably being a tip dressing plate and/or with the grinding worm being set into rotation for dressing.

5. A process in accordance with aspect 4, wherein the width of the tip dressing tool corresponds to the width of the grinding worm to be dressed and the dressing of the grinding worm takes place over its width in a dressing procedure, with the contour of the tip dressing tool preferably having a progression recurring a multiple of times over the worm width.

6. A process in accordance with aspect 4, wherein the width of the tip dressing tool is smaller than the width of the grinding worm to be dressed and the dressing of the grinding worm takes place over its width by multiple dressing procedures with an offset in the grinding worm width direction; wherein a progression of the tip radius of the grinding worm recurring a multiple of times over the worm width preferably being generated by the contour of the tip dressing tool applied with an offset in the grinding worm width direction; and/or wherein the multiple dressing procedures each take place with the same mutual offset.

7. A process in accordance with aspect 1 or aspect 2, wherein a tip dressing wheel is used; wherein the center distance between the grinding worm and the tip dressing wheel is changed in dependence on the worm width position; and wherein the center distance between the grinding worm and the tip dressing wheel preferably has a progression recurring multiple times over the worm width.

8. A process in accordance with aspect 7, wherein a tip dressing wheel having dressing regions for a plurality of threads is used to dress a plurality of threads of the grinding worm simultaneously, wherein the periodicity of the progression of the center distance is smaller than or equal to the tooth interval of the grinding worm and the tip dressing wheel is in engagement with consecutive threads; or wherein the periodicity of the progression of the center distance is preferably larger than the tooth interval of the grinding worm and the tip dressing wheel is in engagement with non-consecutive threads.

9. A process for dressing a grinding worm that is usable for gear manufacturing machining a workpiece by a generating grinding process, in particular in accordance with aspect 1, aspect 2 or aspect 7, wherein a combination dressing tool having dressing regions for the tooth flanks of the grinding worm and for the tip of the grinding worm is used; wherein the dressing of the tips of the grinding worm and the dressing of the tooth flanks of the grinding worm, however, take place in separate machining strokes; and wherein the dressing of the tips preferably takes place using a different axial cross angle between the dressing tool and the grinding worm than the dressing of the tooth flanks such that the tooth flanks are out of engagement with the dressing tool during the dressing of the tips.

10. A process for dressing a grinding worm that is usable for gear manufacturing machining a workpiece by a generating grinding process, in particular in accordance with aspect 1, aspect 2 or aspect 7, wherein a dressing tool is used that dresses a plurality of teeth of the grinding worm simultaneously; wherein the regions of the dressing tool that dress the root surface in a machining stroke are used for dressing the tips in another machining stroke; wherein the tooth flanks are preferably dressed in the machining stroke in which the root surface is also dressed; and/or wherein work is preferably carried out using a different axial cross angle between the dressing tool and the grinding worm for the two machining strokes; and/or wherein the regions of the dressing tool that dress the root surface in a machining stroke have a flat or inwardly arched profile.

11. A process in accordance with one of the preceding aspects, wherein the dressing of the tips of the grinding worm and the dressing of the tooth flanks of the grinding worm take place in separate machining steps.

12. A process for gear manufacturing machining a workpiece by a grinding worm on a gear manufacturing machine, wherein the workpiece is machined by a generating grinding process in which the grinding worm rolls off on the workpiece for the gear manufacturing machining using a predefined center distance and axial cross angle, characterized in that a grinding worm is used whose tip radius varies over the worm width and that was preferably dressed by a process in accordance with one of the aspects 1 to 11, with the gear manufacturing machining preferably taking place by a diagonal generating process, with the grinding worm preferably having a plurality of recurring shift regions that are each used for a machining stroke, with the progression of the tip radii for the shift regions preferably being identical, and/or with the axial cross angle preferably being varied during the machining of a workpiece, with the axial cross angle further preferably being varied in dependence on the workpiece width position during a machining stroke.

13. A process in accordance with aspect 12, wherein the grinding worm has a modification that is applied to the active tooth flank of the workpiece in dependence on the workpiece width position during the gear manufacturing machining, with the position of the modification on the active tooth flank of the workpiece being predefinable in dependence on the workpiece width position and with the modification being generated at the predefined position via a change of the axial cross angle and of the center distance between the grinding worm and the workpiece in dependence on the workpiece width position; wherein the gear manufacturing machining preferably takes place in a diagonal generating process and the grinding worm has at least two different tip radii over the shift width used for a machining stroke, with the tip radii of the grinding worm preferably being selected such that the root of the workpiece is not also machined or such that the root of the workpiece is also machined and receives a desired progression due to the selection of the progression of the tip radii of the grinding worm, with the progression of the tip radii preferably being suitably determined in dependence on the workpiece width position while taking account of the center distance predefined by the position of the modification and of a desired root radius; and/or wherein the tooth trace modification and the root radius and the position of the modification on the workpiece are predefinable in dependence on workpiece width position and the tips of the grinding worm are correspondingly dressed.

14. A dressing machine having a tool holder for holding a grinding worm and having a dressing tool holder for holding a dressing tool; having NC axes for generating a relative movement between the dressing tool and the grinding worm; having an input function for predefining a progression of the tip radii of the grinding worm variable over the worm width; and having a dressing function that controls the NC axes of the dressing machine in dependence on the specification to generate the variable progression of the tip radii during dressing, in particular for carrying out a process in accordance with one of the aspects 1 to 11, with it preferably being a combination machine having a workpiece holder, wherein the combination machines preferably has an input function and/or a control function for carrying out a process in accordance with aspect 12 or aspect 13.

15. A grinding worm for the gear manufacturing machining of a workpiece by a generating grinding process, in particular a grinding worm dressed by a process in accordance with one of the aspects 1 to 11, and/or for use in a process in accordance with aspect 12 or aspect 13, characterized in that the tip radius of the grinding worm varies over the worm width.

16. A dressing tool for use in a process in accordance with one of the aspects 4 to 6 or 9 or 10, in particular a tip dressing tool having a contour varying over the worm width or a combination dressing tool in which the regions for dressing the tooth flanks are configured for a different helix angle than the regions for dressing the tips, or a dressing tool that dresses a plurality of teeth of the grinding worm simultaneously, with the regions of the dressing tool that dress the root surface having a flat or inwardly arched profile.

Further Independent Aspects:

Specific choice of the axial cross angle for a machining stroke

Change of the axial cross angle during the machining

Change of the axial cross angle between two machining strokes

Change of the axial cross angle in dependence on the axial feed position $z_{V2}$ of the workpiece during a machining stroke Specification of the tooth thickness of the workpiece and at least one of the parameters:

root radius of the workpiece tip radius of the workpiece position of the profile modification on the left flank of the workpiece position of the profile modification on the right flank of the workpiece for at least one machining stroke Two-flank dressing of a grinding worm together with the worm tips and/or worm root in the same stroke using the same dressing tool and subsequent generating grinding of the workpiece in combination with the specification of the tooth thickness and the root radius or tip radius at the workpiece (realization via γ and d during grinding)

Two-flank dressing of a grinding worm with a profile modification and subsequent generating grinding of the workpiece in combination with the specification of the tooth thickness and the position of the profile modification on a flank on the workpiece (realization via γ and d during grinding)

Specification of the tip clearance or root clearance of the tool instead of the root radius or tip radius of the workpiece Optimization calculation to set, in addition to the tooth thickness, at least two of the parameters:

root radius of the workpiece tip radius of the workpiece position of the profile modification on the left flank of the workpiece position of the profile modification on the right flank of the workpiece for at least one machining stroke Realizing the breaking up of the generating coupling via a correction of the angle of rotation of the tool or of the workpiece.

Specification of the removal on the left flank, on the right flank and in the root and/or tip of the workpiece for at least one machining stroke Specification of a free tooth trace modification on the left flank and/or right flank of the workpiece and of an additional condition for at least one machining stroke in dependence on at least γ and/or d as well as $z_{V2}$.

Specification of a free tooth trace modification for the left flank and/or right flank of the workpiece as well as of a progression of the root diameter or tip diameter of the workpiece in dependence on the workpiece width position Specification of a free tooth trace modification for the left flank and/or right flank of the workpiece as well as of a displacement of the profile modification on the left flank or right flank of the workpiece in dependence on the workpiece width position Optimization calculation to satisfy at least two additional conditions at least approximately in addition to the free tooth trace modification for the left flank and/or right flank of the workpiece.

Utilization of the profile angle and/or of the tooth thickness of the tool for transposing the displacement of the profile modification on the left and right flanks toward one another in the workpiece width position, in particular for the simultaneous optimization of the displacement of the profile modification on the left and right flanks and/or for realizing a single-flank machining at the upper and/or lower ends of the workpiece.

A tool with a progression of the tip radius over at least a part of the tool length such that the enveloping body of the tool contacts the progression of the root radius of the workpiece tangentially during the machining or such that a desired minimal tip clearance of the tool is observed at all times and the utilizable root circle of the workpiece is also machined.

A tool with a progression of the tip radius recurring periodically over a least a part of the tool length.

A process for dressing a grinding worm having a predefined progression of the tip radius using
 a tip dressing roller or
 a dressing plate or needle plate A process for dressing a grinding worm having a periodically recurring predefined progression of the tip radius using a multi-ribbed tip dressing roller.

A multi-ribbed tip dressing roller

A dressing tool having a tip dressing function, single-ribbed or multi-ribbed, as well as a worm geometry suitable for this purpose, in particular the tooth thickness and the profile angle A process for dressing a plurality of threads, preferably all of the threads, of a grinding worm having a periodically recurring predefined progression of the tip radius and for dressing the flanks of the worm, using a multi-ribbed dressing tool having a tip dressing function A multi-ribbed tip dressing roller or a multi-ribbed dressing tool having a tip dressing function for dressing every Vth worm thread and a process for dressing therewith A multi-ribbed dressing tool having a tip dressing function at which not every rib is provided with a profile for dressing the worm tips at the outside diameter A combination dressing tool for dressing the flanks of the worm or of the worm tips in a dressing stroke and a process for dressing the flanks and the worm tips using said dressing tool A dressing plate that has the shape of the enveloping gearing over at least a part of the worm length A process for the approximate production of a gearing using a non-meshing tool Software for selecting a tool from a database for the optimum approximate production of a gearing A process for producing a conical workpiece having an alternative conical angle $\hat{\vartheta}_2$ and implementing the root conical angle via a free specification of the progression of the root radius An optimization calculation for determining the alternative conical angle $\hat{\vartheta}_2$ and one or more of the influences: 1) shape of the tip of the tool; 2) sign of Δγ; 3) range of the function from FIG. 25 for the optimum approximation of the generated root geometry to the desired root geometry or for optimizing the use behavior of the workpiece, in particular of the root load carrying capacity and/or of the oil flow.

Combining the process with a diagonal generating process having a constant or non-constant diagonal ratio using a tool that has a modification variable over the width, in particular a modification that can be at least approximately described in the generating pattern at least locally in a first direction of the tool by a constant and/or linear and/or quadratic function.

Combining the process with a diagonal generating process and a tool with a displacement of the profile modification such that an additional condition at least dependent on γ and/or d as well as $z_{V2}$ can be satisfied and a specific displacement of the profile modification is achieved on at least one flank An additional condition can be a free progression of the root radius or of the tip radius at the workpiece A tool can additionally have a progression of the tip radius or root radius such that the additional condition—displacement of the profile modification and progression of the root radius or tip radius at the workpiece—can be achieved A tool for carrying out the process with an adapted tooth thickness A tool with a defined blade having a sufficient free angle for all axial cross angles used Software for carrying out the process, in particular for installation on a gear manufacturing machine

The invention claimed is:

1. A process for machining a workpiece with a tool on a gear manufacturing machine to manufacture a gearing on the workpiece, comprising:
 specifying at least one out of a desired tooth trace shape and a tooth thickness of teeth of the gearing on the workpiece;
 specifying, in addition to the at least one out of the desired tooth trace shape and tooth thickness, an additional condition relating to at least one out of a profile shape of the gearing, a root clearance of the tool, and a tip clearance of the tool;
 determining, in dependence on the additional condition and the at least one out of the desired tooth trace shape and tooth thickness, a center distance, the center distance being a minimal distance between an axis of rotation of the tool and an axis of rotation of the workpiece, and an axial cross angle between the axis of rotation of the tool and the axis of rotation of the workpiece; and
 machining the workpiece with the tool using a generating machining process, wherein the tool is positioned relative to the workpiece with the determined center distance and the axial cross angle between the axis of rotation of the tool and the axis of rotation of the workpiece.

2. The process in accordance with claim 1, wherein the center distance is determined in dependence on the additional condition such that the step of machining the workpiece generates the gearing on the workpiece with at least one out of a profile shape of the gearing, a root clearance of the tool and a tip clearance of the tool that satisfies the additional condition, and the axial cross angle is determined in dependence on the center distance such that the step of machining the workpiece generates the gearing on the workpiece with at least one out of the desired tooth trace shape and the tooth thickness.

3. The process in accordance with claim 1, wherein, in the step of determining at least one out of the desired tooth trace shape and the tooth thickness, the center distance, the axial cross angle, and a correction of a generating coupling between a rotation of the tool and a rotation of the workpiece during the step of machining the workpiece are determined in dependence on the additional condition and on at least one out of the desired tooth trace shape and the tooth thickness.

4. The process in accordance with claim 1, wherein the additional condition is a specification relating to at least one out of a geometry of a root of the gearing of the workpiece, a geometry of a tip of the gearing of the workpiece and a position of a modification generated on an active tooth flank of the gearing of the workpiece by a modification on the tool.

5. The process in accordance with claim 1, wherein in the step of machining the workpiece, a root of the gearing of the workpiece is machined together with an active tooth flank of the gearing of the workpiece in at least one machining stroke, and wherein at least one out of the following applies:
in addition to the tooth thickness, a root radius generated in the machining stroke is separately specified as the additional condition;
in addition to a material removal in a region of the tooth flank a material removal in a region of the root is separately specified as the additional condition.

6. The process in accordance with claim 1, wherein in the step of machining the workpiece, the workpiece is machined in a plurality of machining strokes, with a root of the gearing of the workpiece machined together with an active tooth flank of the gearing of the workpiece in at least one out of the plurality of machining strokes, wherein at least one of the following conditions apply:
the axial cross angle and the center distance is determined for each of the plurality of strokes such that a first material removal in a region of the root generated in a first machining stroke out of the plurality of machining strokes is smaller than a second material removal generated in a second machining stroke out of the plurality of machining strokes, the second machining stroke preceding the first machining stroke,
the axial cross angle and the center distance is determined for each of the plurality of strokes such that a respective material removal in a region of the root generated in a last machining stroke out of the plurality of machining strokes is smaller than a material removal generated in any machining strokes out of the plurality of machining strokes preceding the last machining stroke, or
no material removal is generated in the region of the root in the last machining stroke out of the plurality of machining strokes.

7. The process in accordance with claim 1, wherein in the step of machining the workpiece comprises:
machining a root of the gearing of the workpiece together with an active tooth flank of the gearing of the workpiece in at least a first machining stroke, wherein in the first machining stroke, no tooth trace modification is generated on the active tooth flank; and
machining an active tooth flank of the gearing of the workpiece in at least a second machining stroke, wherein at least one out of the center distance and the axial cross angle and a generating coupling between a rotation of the tool and a rotation of the workpiece is varied to generate a tooth trace modification of the active tooth flank, wherein the root of the gearing of the workpiece is not machined in the second machining stroke.

8. The process in accordance with claim 1, wherein the tool is a grinding worm, wherein the method comprises:
dressing the tool using a combination dressing tool that simultaneously dresses at least one left tooth flank and one right tooth flank and one tip of the gearing of the tool;
specifying, in addition to the at least one out of the desired tooth trace shape and the tooth thickness of the gearing, a desired root radius as the additional condition.

9. The process in accordance with claim 1, wherein the tool has a modification, wherein in the step of machining the workpiece, the modification of the tool generates a modification on an active tooth flank of the gearing of the workpiece, wherein in addition to the at least one out of the desired tooth trace shape and tooth thickness, a position of the modification generated on the active tooth flank of the workpiece is specified as a second additional condition, and wherein the center distance and the axial cross angle are determined in dependence on the position of the modification on the active tooth flank of the workpiece.

10. The process in accordance with claim 9, wherein the modification of the tool was designed for a first workpiece geometry; wherein the position of the modification on the active flank of the workpiece is specified to generate a second workpiece geometry.

11. The process in accordance with claim 1, wherein the axial cross angle remains constant over a workpiece width for at least one machining stroke.

12. The process in accordance with claim 1, wherein in the step of machining the workpiece, the gearing on the workpiece is simultaneously machined on two flanks.

13. The process in accordance with claim 3, wherein at least one out of the following applies:
the tooth trace shape is specified independently for a left and a right flank of the gearing of the workpiece;
at least one out of the center distance and the correction of the generating coupling between the rotation of the tool and the rotation of the workpiece is determined as a function of a position in a direction parallel to the axis of rotation of the workpiece.

14. The process in accordance with claim 4, wherein the geometry of the root includes at least one out of a root radius and a progression of the root and wherein the geometry of the tip includes at least one out of a tip radius and a progression of the tip.

15. The process in accordance with claim 1, wherein in addition to the at least one out of the desired tooth trace shape and the tooth thickness, two or more additional conditions with respect to the shape of the gearing of the workpiece are specified, wherein the two or more additional conditions include at least one out of:
a first specification with respect to at least one out of the shape of the gearing in an inactive part of the gearing, the root clearance of the tool, and the tip clearance of the tool and a second specification with respect to the shape of the gearing in an active part of the gearing, a first specification with respect to at least one out of a root radius of the gearing, a tip radius of the gearing, the root clearance of the tool, and the tip clearance of the tool and a second specification with respect to a position of a modification generated on the active tooth flank of the workpiece by a modification on the tool.

16. The process in accordance with claim 1, wherein the gearing of the workpiece extends at a first helix angle relative to a direction of the axis of rotation of the workpiece and the tool has a gearing extending at a second helix angle relative to a direction of the axis of rotation of the tool, wherein the first and the second helix angle define a second axial cross angle between the axis of rotation of the tool and an axis of rotation of the workpiece, wherein the cross angle is determined in dependence on the additional condition and the at least one out of the desired tooth trace shape and the tooth thickness is different from the second axial cross angle, wherein the center distance is set such that the at least one out of the desired tooth trace shape and the tooth thickness is generated despite using the axial cross angle different from the second axial cross angle.

17. The process in accordance with claim 15, wherein the center distance, the axial cross angle, and a correction of the generating coupling are determined by means of curve fitting such that the two or more additional conditions are satisfied in an optimum approximation.

* * * * *